United States Patent [19]
Akiyama et al.

[11] Patent Number: 6,122,241
[45] Date of Patent: *Sep. 19, 2000

[54] OPTICAL PICK-UP DEVICE FOR PROCESSING CENTRAL AND PERIPHERAL OPTICAL SIGNAL COMPONENTS

[75] Inventors: Hiroshi Akiyama; Masahiko Nakayama, both of Yokohama, Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/593,903

[22] Filed: Jan. 30, 1996

[30] Foreign Application Priority Data

| Jan. 31, 1995 | [JP] | Japan | 7-013947 |
| May 16, 1995 | [JP] | Japan | 7-117466 |
| May 16, 1995 | [JP] | Japan | 7-117467 |
| Jul. 24, 1995 | [JP] | Japan | 7-186932 |
| Jul. 24, 1995 | [JP] | Japan | 7-186933 |
| Sep. 25, 1995 | [JP] | Japan | 7-246446 |

[51] Int. Cl.[7] ................................................ G11B 7/08
[52] U.S. Cl. .................. 369/112; 369/44.23; 369/120
[58] Field of Search ........................... 369/44.23–44.24, 369/103, 109, 111, 112, 120–122

[56] References Cited

U.S. PATENT DOCUMENTS

| 4,831,613 | 5/1989 | Kanda | 369/109 |
| 5,161,139 | 11/1992 | Inoue et al. | 369/44.23 |
| 5,231,621 | 7/1993 | Matsui et al. | 369/44.32 |
| 5,491,675 | 2/1996 | Kay | 369/44.23 |
| 5,544,143 | 8/1996 | Kay et al. | 369/112 X |
| 5,610,895 | 3/1997 | Izumi et al. | 369/112 |
| 5,619,482 | 4/1997 | Tezuka et al. | 369/44.23 |
| 5,623,462 | 4/1997 | Tezuka et al. | 369/44.23 |

OTHER PUBLICATIONS

Yamanaka et al., Temperature Distribution Analysis on Optical Disk by Superresolution Spot, Optics, vol. 21, No. 5, 1992/5, pp. 342–345.

Applied Physics, vol. 61, No. 3, 1992, pp. 250–253.

Primary Examiner—W. R. Young
Attorney, Agent, or Firm—Cooper & Dunham LLP

[57] ABSTRACT

An optical pick-up device for at least one of recording, reproducing and deleting data on a recording medium includes a light source emitting a light, an objective lens focusing the light from the light source at a predetermined position of a data track of the recording medium and a light receiving element detecting a reflected light from the recording medium. A light receiving means divides the reflected light from the recording medium in a data track direction and detects a part of the reflected light. The reflected light is divided onto the light receiving element into a central component and peripheral components and an original signal is reproduced from at least one of a difference between the peripheral components and the difference between the peripheral components and a central component.

28 Claims, 42 Drawing Sheets

NA = sin α

CONTRAST

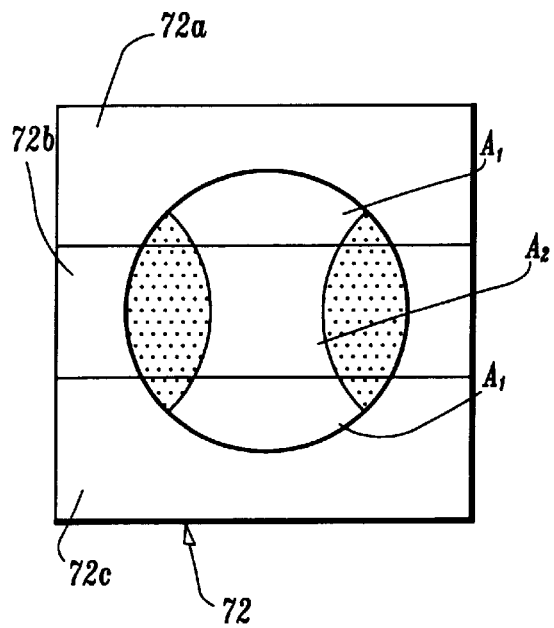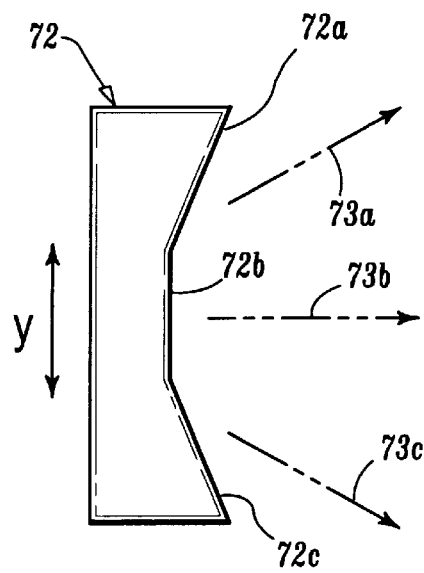
FIG. 28A  FIG. 28B
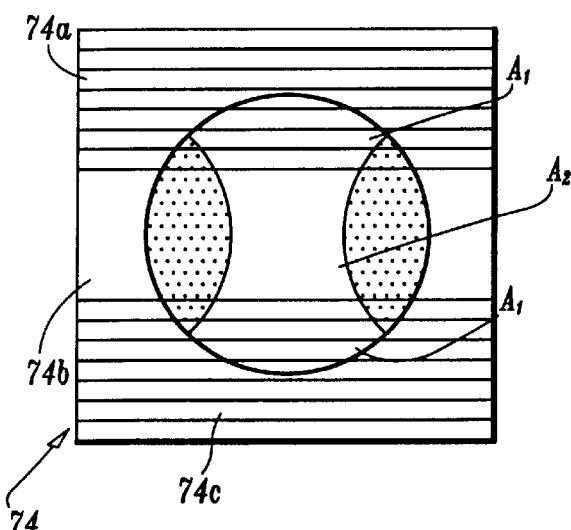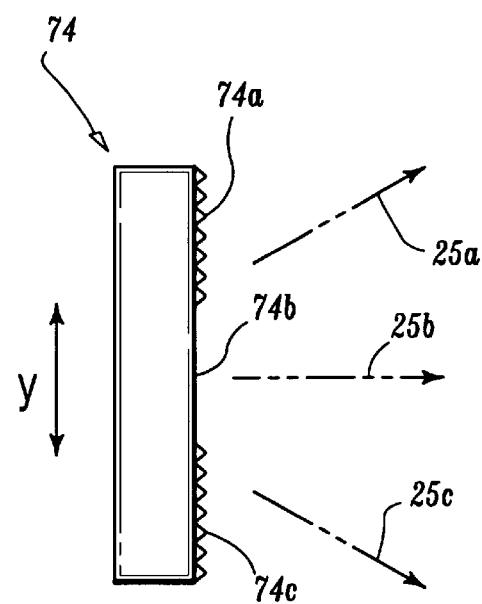
FIG. 29A  FIG. 29B

FIG. 51A
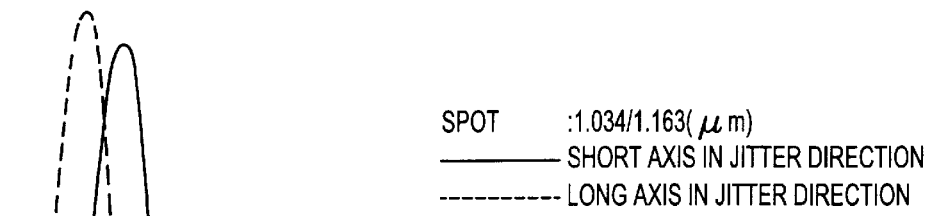
SPOT : 1.034/1.163 (μm)
——— SHORT AXIS IN JITTER DIRECTION
------- LONG AXIS IN JITTER DIRECTION
FIG. 51B
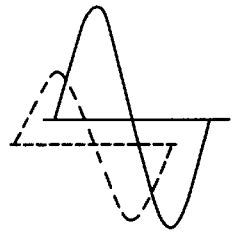
FIG. 51C  FIG. 51D
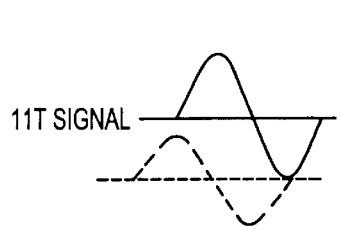  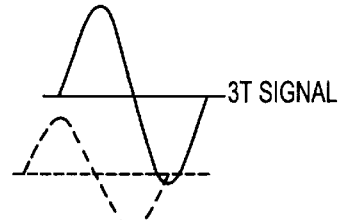
11T SIGNAL                3T SIGNAL
FIG. 52
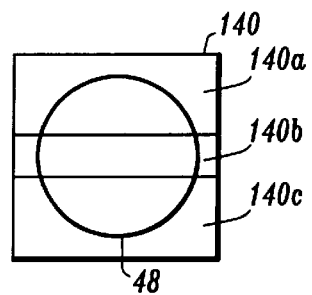

FIG. 53
|  | 11T | | 3T | |
| --- | --- | --- | --- | --- |
|  | TOTAL | PART | TOTAL | PART |
| STROKE (dB) | -28.847 | -32.339 | -24.585 | -25.170 |
| SIGNAL p-p (uW) | 474.089 | 95.400 | 172.912 | 139.580 |
| NOISE p-p (uW) | 17.119 | 2.305 | 10.200 | 7.697 |
FIG. 54
|  | 11T | | 3T | |
| --- | --- | --- | --- | --- |
|  | TOTAL | PART | TOTAL | PART |
| STROKE (dB) | -28.867 | -47.676 | -30.442 | -30.988 |
| SIGNAL p-p (uW) | 512.601 | 65.268 | 110.370 | 84.746 |
| NOISE p-p (uW) | 18.468 | -0.270 | 3.317 | 2.392 |
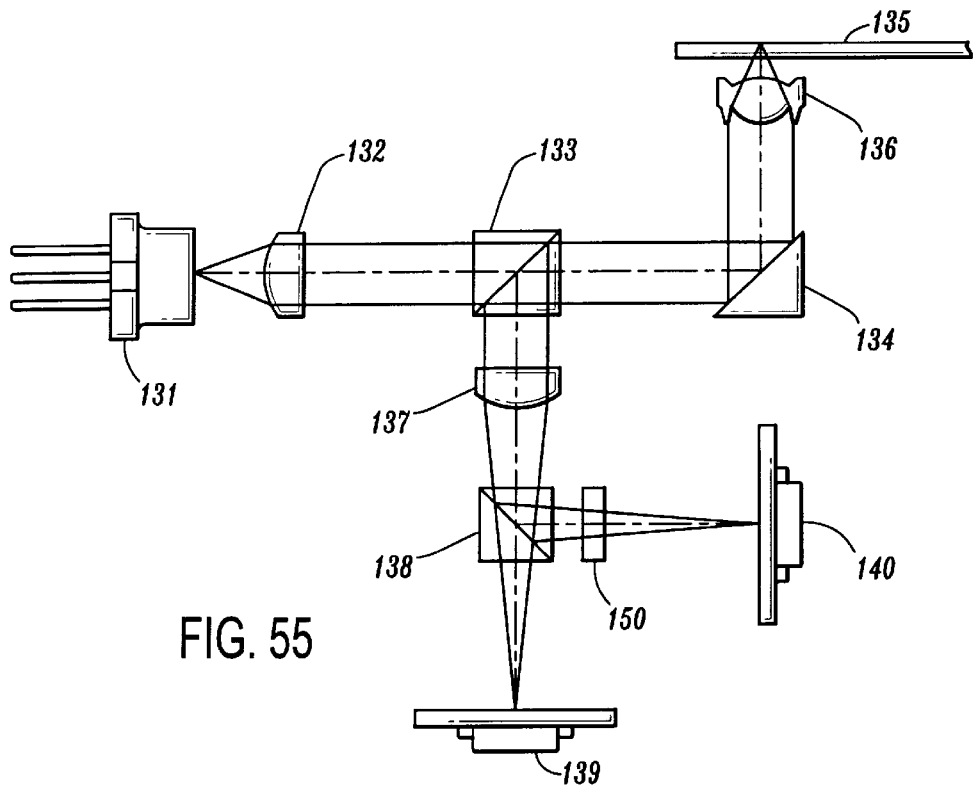
FIG. 55
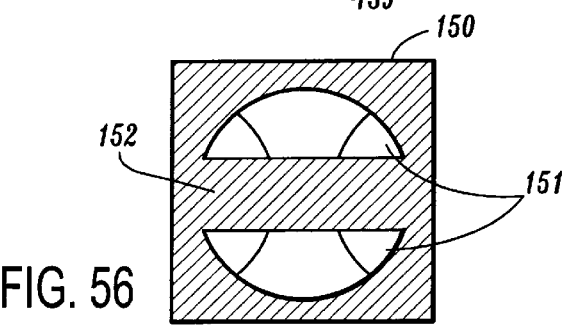
FIG. 56

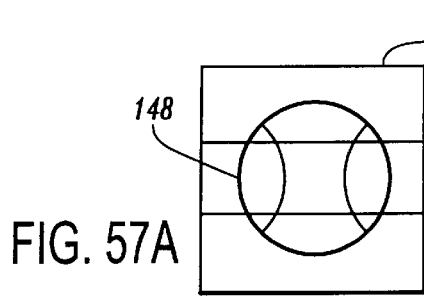 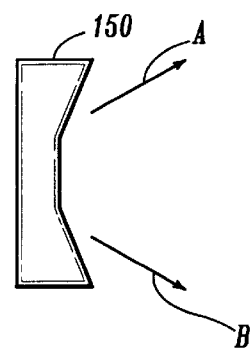
FIG. 57A  FIG. 57B
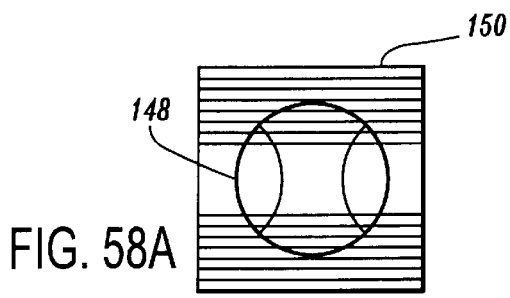 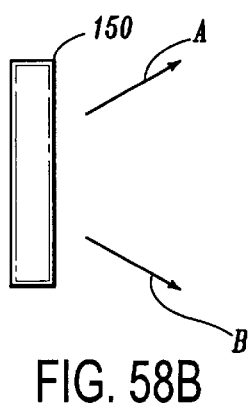
FIG. 58A  FIG. 58B
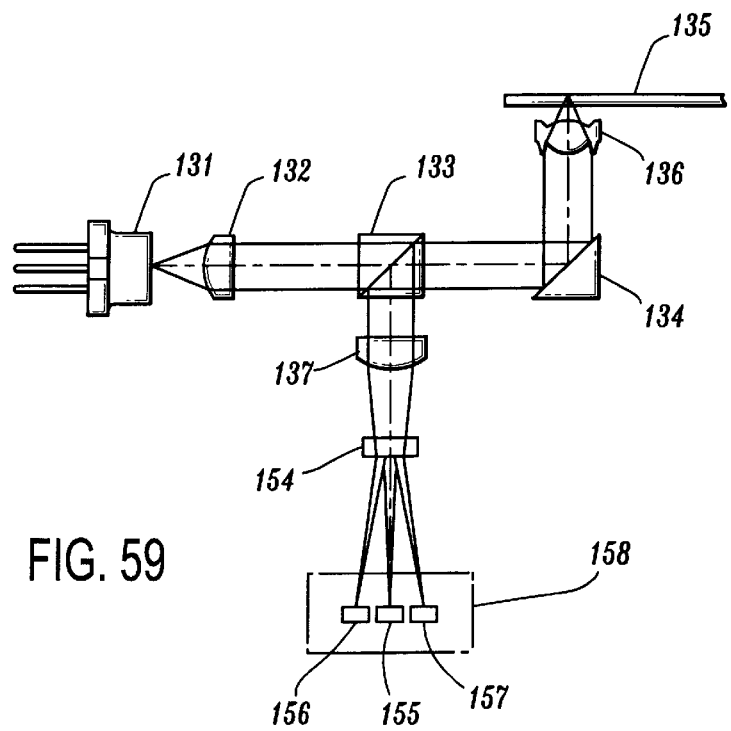
FIG. 59

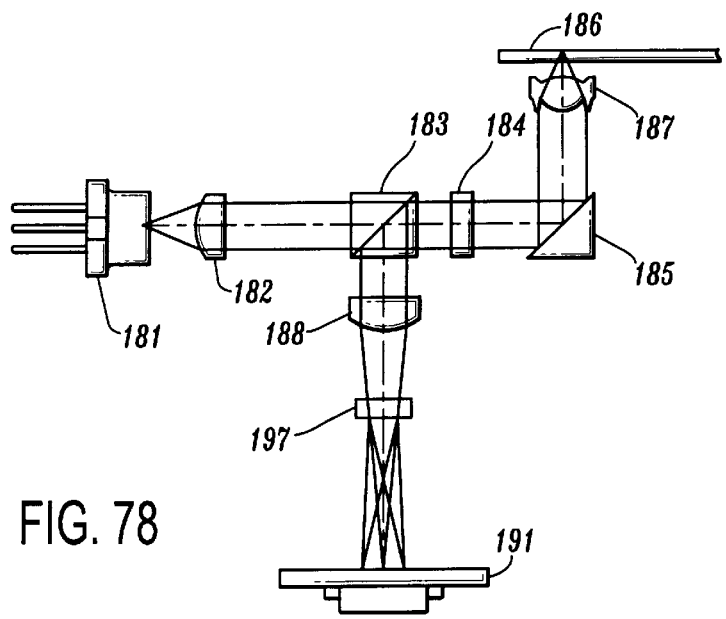
FIG. 78
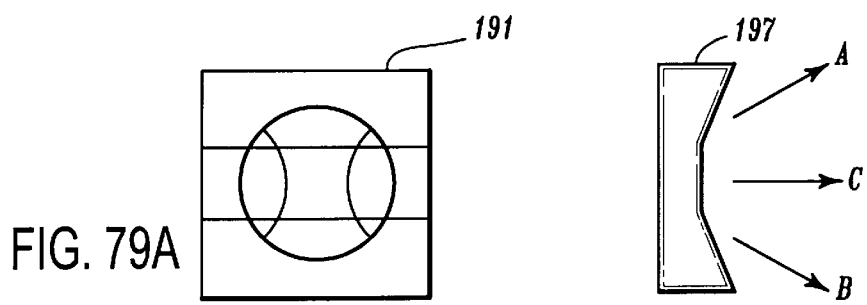
FIG. 79A
FIG. 79B
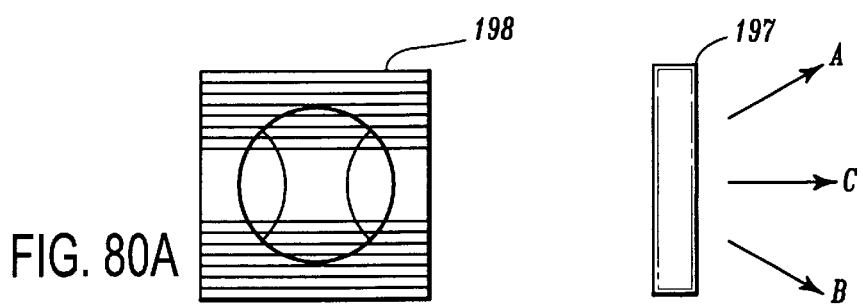
FIG. 80A
FIG. 80B

OPTICAL PICK-UP DEVICE FOR PROCESSING CENTRAL AND PERIPHERAL OPTICAL SIGNAL COMPONENTS

BACKGROUND OF THE INVENTION

1. Field of the Invention

The present invention generally relates to an optical pick-up device, and more particularly to an optical pick-up device in which data is recorded and/or reproduced and/or deleted on a recording medium.

2. Description of the Related Art

FIG. 1 shows a conventional optical-pick-up device. In the optical-pick-up device, a light emitted from a semiconductor laser (LD) 1 as a laser light source is parallelized by a collimating lens 2. After the parallel light passes a beam splitter 3, the light is deflected upwardly by a deflection prism 4. After the deflected light passes through a quarter-wavelength plate 5, the light is focused on a recording surface of an optical disc 7 as an optical data recording medium by an objective lens 6. A reflected light A from the optical disc 7 is parallelized by the objective lens 6 and changed in a deflection direction by the deflective prism 4. After the light passes the deflection prism 4, the light is reflected by the beam splitter 3 and introduced to a signal detection optical system 8. The reflected light A from the optical disc 7, which is introduced in the signal detection optical system 8, is focused by a detection lens 9. A part of the light passing a beam splitter 10 is introduced to a light receiving element 11 and reflected to a light receiving element 12. The light receiving element 11 is divided into six light receiving faces a–f and the light receiving element 12 is divided into three light receiving faces g, h, i. In the above device, a data signal Rf, which is a signal recorded on a recording face, a focus error signal Fe (beam-size method) and a track error signal Te are obtained by the following formulae.

$$Rf=a+b+c+d+e+f+g+h+i$$

$$Fe=(a+d+c+f+h)-(b+e+g+i)$$

$$Te=(a+b+c)-(d+e+f)$$

FIGS. 2A and 2B show conventional signal detection optical systems 8. In a signal detection optical systems 8 shown in FIG. 2A, the reflected light A focused by the detection lens 9 is given an astigmatism by an astigmatism lens 13 and introduced to a light receiving element 14. The light receiving element 14 is divided into four light receiving faces a–d. In the above system, a data signal Rf, a focus error signal Fe and a track error signal Te are obtained by the following formulae.

$$Rf=a+b+c+d$$

$$Fe=(a+c)-(b+d)$$

$$Te=(a+d)-(b+c)$$

The formulae are determined by an astigmatism method.

In the signal detecting optical system 8 shown in FIG. 2B, the reflected light A focused by the detected dens 9 is filtered by the knife edge prism 15. An unfiltered light is introduced to the light receiving element 16 and a filtered light is introduced to the light receiving element 17. The light receiving element 16 is divided into two light receiving faces a, b and the light receiving element 17 is divided into two light receiving faces c, d. The data signal Rf, the focus error signal Fe and the track error signal Te are determined as follows.

$$Rf=a+b+c+d \text{ or } Rf=c+d$$

$$Fe=a-b$$

$$Te=c-d$$

The above formula is determined by a knife edge method.

Hereinafter, the deflection on the recording face of the optical disc 7 is described, referring to FIGS. 3 and 4. A light spot P focused by the objective lens 6 is diffracted by pit lines of the optical disc 7 of a regular CD. FIG. 4A shows a ROM disc face on which recesses and projections are formed in advance. In this case, the recess is a pit portion and the projection is a non-pit portion. A light reflected by the pit portion and a light reflected by the non-pit portion have different phase, which leads to an interference therebetween. The phase difference δ therebetween is defined by the following formula, in which h represents a pit height, n represents a reflective ratio of the base and λ represents a wavelength of the laser light.

$$\delta=2\pi nh/\lambda$$

When the data is recorded based on the phase change as shown in FIG. 4B, a light reflected by the mark portion 22a and a light reflected by the non-mark portion 22b, each of which has different phases, generates the interference therebetween.

When a reflected light A, which is diffracted by the pit lines of the optical disc 7, returns to the objective lens 6 having a numerical aperture NA, the deflected light of a zero-order light 20a and a first-order light 20b is absorbed. After that, the light is introduced to the light receiving elements 11, 12 of the optical system shown in FIG. 2. A light amount in an overlapping area in which the zero-order light 20a and the first-order light 20b interfere is changed to detect the pit. In this case, the pit is detected as the data signal. The pit in this context includes the phase pit due to the recesses and projections of the recording face and the dot difference in the reflective index from the mirror face. When the zero-order light 20a and the first-order light 20b is introduced to light receiving elements 11, 12 according to the mechanism described above, the data signal Rf can be determined as a total light amount, according to the above formula.

When the pit is smaller, the diffraction angle θ becomes larger. When the pit is smallest, the overlapping area of the zero-order light 19a and the first-order light 19b becomes smaller. In this case, the pit is difficult to be detected. That is, a change in a short pit signal appears at a periphery of a far field pattern (FFP) of the detected light when the pit gets smaller and highly-condensed, instead a change in a long pit signal appears at a central portion of the detected light FFP since the deflected angle θ is small.

In the conventional optical pick-up device shown in FIG. 1, the data signal Rf (Cf. the above formula) recorded in the optical disc 7 is determined based on the total light amount of the overlapping area of the zero-order light 20a and the first-order light 20b, in which the light amount is changed due to the pit shape, and the zero-order light 20a, which includes a relatively large amount of noise. However, only by detecting a change in the total amount of light, when the recording medium has the small pits and a high density, the overlapping area becomes small compared to the area of the zero-order light 20a, and a ratio of the noise element becomes larger. Thus, the S/N ratio thereof is lowered.

In the CD as the recording medium, the shortest signal corresponding to the shortest pit is a 3T signal, and the longest signal corresponding to the longest pit is an 11T signal, in which T represents the fundamental clock period. In this case, in order to read the pit recorded at a high density with a high S/N ratio, the resolving power must be improved by increasing the amplitude of the 3T signal or the S/N ratio must be improved by reducing the noise of the 3T signal. In order to improve the amplitude detected from the shortest pit, a spot radius of the light spot P for reading is reduced to improve the resolving power of the spot. It is an indispensable project to provide a LD handling a shorter wave and an objective lens having a higher NA, which cannot be accomplished soon. In the method in which the noise in the 3T is reduced, the zero-order light 20a to be a noise in the reflected light A is reduced. However, in the conventional signal detecting method, a data signal Rf is determined by a variation of the total amount of received light. Therefore, when data is recorded at a high density in the CD, the noise can not be reduced. Thus, the S/N ratio is lowered and the signal cannot be detected accurately.

Recently, in order to provide a high-density recording and reproduction, a new technique called super-dissolution has been developed and an optical pick-up device having a higher dissolving power than the conventional one shown in FIG. 1 has been proposed (Optics, Vol. 21, No. 5, 1992/5, Page 342–345, Journal of Television Society, Vol. 48, No. 5, P 557–560). In the device using the super-dissolution, the small light spot over a deflection limit can be provided by changing a light intensity and a phase of the central portion of the beam before focussing. Since the light spot forms a relatively strong side lobe, the side lobe element included in the reflected light is shaded by a slit when the signal is reproduced. Only the separated main lobe element is received to obtain the reproduction signal. However, in the device using the super-dissolution for a high density record, light utilization efficiency is lowered by the slit for shading. A spot diameter of the slit is less than 100 $\mu$m and accuracy in positioning of the slit is not realized when the device is made small.

Also, in signal reproduction methods, a new medium (super-dissolution optical magnetic disc) can be used (Applied Physics, Vol. 61, No. 3, 1992, Page 250–253). However, it is still in the research stage and is not practical.

SUMMARY OF THE INVENTION

Accordingly, it is a general object of the present invention to provide a novel and useful optical pick-up device in which a reproductive signal can be detected in response to the highly-integrated data on the recording medium with a high-resolution and which can be produced easily and economically.

Accordingly, it is a general object of the present invention to provide a novel and useful optical pick-up device in which a signal can be detected accurately with a reduced S/N ratio.

The above object of the present invention is achieved by an optical pick-up device including a laser light source emitting a laser light, an objective lens focusing the laser light from the laser light source on a pit of a track of an optical data recording medium, the optical pick-up device reproducing data recorded on the optical data recording medium by detecting a reflected light from the optical data recording medium, and data signal reproducing means for reproducing the data from a difference between a first optical area and a second optical area in the reflected light, the first optical area corresponding to an overlapping area of a zero-order light and a first-order light in a track direction and the second optical area corresponding to the zero-order light in which the first-order light is excluded.

According to the invention, a noise component in the signal can be reduced without reducing an amplitude of the signal. Thus, the S/N ratio can be improved. Also, the signal can be detected accurately in a high-density recording medium. Further, compared to the conventional system in which a data signal is detected based on a total light amount, a resolving power is improved and an end portion of the pit can be accurately detected. Thus, the signal always can be accurately detected. Moreover, since a circuit included therein is simple, the device can be produced economically.

The above object of the present invention is also achieved by an optical pick-up device including a laser light source emitting a laser light, an objective lens focusing the laser light from the laser light source on a pit of a track of an optical data recording medium, the optical pick-up device reproducing data recorded on the optical data recording medium by detecting a reflected light from the optical data recording medium, and data signal reproducing means for reproducing the data from a difference between a first optical area and a second optical area in the reflected light, the first optical area being both side portions of a luminous flux divided into three parts in a track direction and the second optical area being a central portion between both side portions. According to the invention, the noise component of the signal can be further reduced without reducing the amplitude of the signal. Thus, the S/N ratio can be further improved.

The above object of the present invention is also achieved by an optical pick-up device including a laser light source emitting a laser light, an objective lens focusing the laser light from the laser light source on a pit of a track of an optical data recording medium, the optical pick-up device reproducing data recorded on the optical data recording medium by detecting a reflected light from the optical data recording medium, and data signal reproducing means for reproducing the data from a difference between a first optical area and a second optical area in the reflected light, the first optical area being a peripheral portion of the reflected light, the second optical area being a central portion surrounded by the first optical area. According to the invention, the noise component of the signal can be further reduced without reducing the amplitude of the signal. Thus, the S/N ratio can be further improved.

The above object of the present invention is also achieved by an optical pick-up device including a laser light source emitting a laser light, an objective lens focusing the laser light from the laser light source on a pit of a track of an optical data recording medium, the optical pick-up device reproducing data recorded on the optical data recording medium by detecting a reflected light from the optical data recording medium, and data signal reproducing means for reproducing the data from a difference between a first optical area and a second optical area in the reflected light, the first optical area being a peripheral portion of a luminous flux divided in a track direction, the second optical area being a luminous flux from which the first optical area is excluded. According to the invention, the noise component of the signal can be further reduced without reducing the amplitude of the signal. Thus, the S/N ratio can be further improved.

In the above invention, the data signal reproducing means may include a luminous flux dividing means dividing the reflected light from the optical data recording medium into a plurality of areas in a track direction and light receiving means receiving the divided reflected lights separately. According to the invention, each luminous flux is received adjacent to a focussing point so that a light receiving area can be reduced. Thus, the band characteristics can be improved and the data can be read at a high speed with a high resolving power.

In the above invention, the luminous flux dividing means may be a prism. According to the invention, a dividing direction of the luminous flux can be freely set. Thus, flexibility of the design, such as positioning of the light receiving element, can be improved.

In the above invention, the luminous flux dividing means may be a hologram. According to the invention, the luminous flux dividing means can be realized with a simple structure. Also, since the dividing direction of the luminous flux can be freely set, flexibility of the design, such as positioning of the light receiving element, can be improved.

In the above invention, the luminous flux dividing means may include a plurality of luminous flux dividing areas. According to the invention, various signals, such as a data signal, a focus error signal and a track error signal, can be detected by one element. Thus, the number of parts can be reduced and a small-sized device can be produced economically.

The above invention may further include a plurality of light receiving elements, each of which receives the reflected light separately, the plurality of light receiving elements being provided on a single substrate. According to the invention, an assembling operation of the device is easy and the small-sized device can be produced economically.

In the above invention, the laser light source and the light receiving element may be unitarily provide. According to the invention, the number of parts can be reduced and an assembling operation of the device is easy. Thus, the small-sized device can be produced economically.

The above object of the present invention is achieved by an optical pick-up device comprising a laser light source emitting a laser light, an optical data recording medium having a predetermined track on which a pit is formed, and an objective lens for focussing the laser light emitted from the laser light source, wherein the optical pick-up device reproduces recorded data by detecting the reflected light from the optical data recording medium, the optical pick-up device further comprising data signal reproducing means for reproducing a data signal defined by following formulae, $$x^2+y^2 \leq (k \cdot f \cdot NA)^2$$

$$y \geq k \cdot f(\nu\lambda - NA)$$

$$y \leq -k \cdot f(\nu\lambda - NA)$$

of the reflected light expressed by a following formula $$x^2+y^2 = (k \cdot f \cdot NA)^2$$

in which f represents a focal length of the objective lens, NA represents a numerical aperture of the objective lens, $\nu$ represents a space frequency of the shortest pit recorded on the light data recording medium, $\lambda$ represents a wavelength of the laser light source, k represents a constant in proportion with the radius of the beam, the luminous flux in the face at a right angle of the luminous flux of the reflected light is an origin, a y-axis is parallel to the track direction and a x-axis is at the right angle of the y-axis.

According to the invention, the data signal reproducing means detect a luminous flux of the peripheral portion in the track direction (overlapping area of zero-order light and first-order light) which contributes the signal component of the reflected light from the light data recording medium. Thus, a data signal can be obtained from an area where a change in light amount appears in response to the recess and projection formed in the pit. When the pit is the shortest, the signal is detected from the luminous flux (overlapping area of the zero-order light and the first-order light) in which the detected signal is concentrated in response to the detected signal. Therefore, the data signal can be obtained with reducing the noise component but not reducing the amplitude of the signal of the shortest pit. In the luminous flux in the overlapping area of the zero-order light and the first-order light, the position of the end portion of the pit can be obtained, compared to the conventional method in which the data signal is detected from the data signal, since the change in light amount occurs corresponding to the pit end. The signal reproducing system can be produced easily and economically.

The above object of the present invention is achieved by an optical pick-up device comprising a laser light source emitting a laser light, an optical data recording medium having a predetermined track on which a pit is formed, and an objective lens for focussing the laser light emitted from the laser light source, wherein the optical pick-up device reproduces recorded data by detecting the reflected light from the optical data recording medium, the optical pick-up device further comprising data signal reproducing means for reproducing a data signal defined by following formulae, $$x^2+y^2 \leq (k \cdot f \cdot NA)^2$$

$$y \geq k \cdot f(\nu\lambda - NA)$$

$$y \leq -k \cdot f(\nu\lambda - NA)$$

$$x \leq m$$

$$x \geq -m$$

$$0 \leq m \leq f \cdot NA$$

of the reflected light expressed by a following formula $$x^2+y^2 = (k \cdot f \cdot NA)^2$$

in which f represents a focal length of the objective lens, NA represents a numerical aperture of the objective lens, $\nu$ represents a space frequency of the shortest pit recorded on the light data recording medium, $\lambda$ represents a wavelength of the laser light source, k represents a constant in proportion with the radius of the beam, the luminous flux in the face at a right angle of the luminous flux of the reflected light is an origin, a y-axis is parallel to the track direction and a x-axis is at the right angle of the y-axis.

According to the invention, the data signal reproducing means detect the luminous flux of the both end portion (overlapping area of the zero-order light and the first-order light) which contribute the signal component limited not only in the track direction but also in the radial direction. Accordingly, the data signal can be obtained with reducing the noise component and retaining the signal amplitude. Also, the resolving power can be improved and the pit end portion can be obtained more accurately. In the recording medium of high density, the S/N ratio of the shortest pit can be improved and the signal detecting accuracy can be improved.

In the above invention, the data signal reproducing means may include luminous flux dividing means for dividing a reflected light from the light data recording medium into a plurality of luminous fluxes and an undivided light receiving means. According to the invention, the reflected light is divided into a plurality of parts by the luminous flux dividing means. Thus, the light receiving area of the non-divided light receiving means which receives the divided luminous flux can be reduced and the band area can be enlarged larger. Accordingly, the data can be read at a high resolving power at a high speed.

In the above invention, the luminous flux detecting means may separate one of a luminous flux defined by following formulae, $$x^2+y^2 \leq (k \cdot f \cdot NA)^2$$

$$y \leq k \cdot f(84\lambda - NA)$$

$$y \geq -k \cdot f(v\lambda - NA)$$

and a luminous flux defined by following formulae, $$x^2+y^2 \leq (k \cdot f \cdot NA)^2$$

$$y \leq k \cdot f(v\lambda - NA)$$

$$y \geq -k \cdot f(v\lambda NA)$$

$$x \leq m$$

$$x \geq -m$$

$$(0 \leq m \leq fNA)$$

from the reflected light. According to the invention, the luminous flux dividing means divides and separates the luminous flux of the central portion which does not contribute the signal component or a luminous flux of the central portion from which the luminous flux of both sides in the track direction is removed and which does not contribute the signal component. Thus, the data signal is detected from the luminous flux of both sides in the track direction, which contributes the signal component. Also, the servo signal can be detected using a separated luminous flux. Accordingly the servo signal can be detected from the separated servo signal and various signals can be detected by a small-sized device having a simple structure.

In the above invention, the luminous flux dividing means may be a hologram. According to the invention, the reflected light from the light data recording medium is separated by the hologram. Thus, the luminous flux separation can be easily conducted by a simple plate. Also, the separation direction of the luminous flux may be freely set. The small-sized optical pick-up device suitable for mass-production can be provided economically.

In the above invention, the hologram may be a luminous flux separating hologram, the optical pick-up device further comprising a quarter-wavelength plate provided between the polarized light separation hologram and the optical data recording medium. According to the invention, the hologram is a polarized light separation hologram, by which the S polarized light can be transmitted and the P polarized light can be diffracted. Thus, the reflected light from the optical disc, which passes the quarter-wavelength plate can be diffracted. Also, reflected light may be directed to the same direction as that of emitted light. The parts for the emitting light path may be commonly used for the reflected light path. Therefore, the light utilization efficiency can be reduced and the device using a low-power laser source can be provided economically.

The above invention may further include servo signal detecting means for detecting a servo signal from one of a luminous flux defined by following formulae, $$x^2+y^2 \leq (k \cdot f \cdot NA)^2$$

$$y \leq k \cdot f(v\lambda - NA)$$

$$y \geq -k \cdot f(v\lambda - NA)$$

and a luminous flux defined by following formulae, $$x^2+y^2 \leq (k \cdot f \cdot NA)^2$$

$$y \leq k \cdot f(v\lambda - NA)$$

$$y \geq -k \cdot f(v\lambda - NA)$$

$$x \leq m$$

$$x \geq -m$$

$$(0 \leq m \leq fNA).$$

According to the invention, the servo signal detecting means detects the luminous flux of the central portion from which the luminous flux of both ends in the track direction is removed and which does not contribute the signal component or the luminous flux which does not contribute the signal component. Thus, the servo signal can be detected without reducing the amplitude of the signal. That is, various signals can be detected by a simple structure.

In the above invention, the laser light source and the light receiving element may be unitarily provided. According to the invention, since the laser light source ant the light receiving element are arranged unitarily, assembling or adjusting characteristics can be improved. Also, the small-sized optical pick-up device can be provided economically.

The above object of the present invention is also achieved by an optical pick-up device for at least one of recording, reproducing and deleting data on a recording medium comprising a light source emitting a light, an objective lens focusing the light from the light source at a predetermined position of a data track of the recording medium, a light receiving element detecting a reflected light from the recording medium, and light receiving means for dividing the reflected light from the recording medium in a data track direction and for detecting a part of the reflected light. According to the invention, S/N ratio of the amplitude of the shortest signal is improved. The reproductive signal is detected with a high resolving power, corresponding to highly-integrated data on the recording medium. Further, the optical pick-up device is produced easily and economically, compared to a conventional super resolution light spot and a conventional super resolution medium. Moreover, a severe adjustment or a special medium are not required.

The above object of the present invention is also achieved by an optical pick-up device for at least one of recording, reproducing and deleting data on a recording medium comprising a light source emitting a light, an objective lens focusing the light from the light source at a predetermined position of a data track of the recording medium, a light receiving element detecting a reflected light from the recording medium, and light receiving means for detecting a luminous flux of a peripheral portion of the reflected light from the recording medium. According to the invention, the resolving power thereof is further improved.

The above object of the present invention is also achieved by an optical pick-up device for at least one of recording, reproducing and deleting data on a recording medium comprising a light source emitting a light, an objective lens focusing the light from the light source at a predetermined position of a data track of the recording medium, a light receiving element detecting a reflected light from the recording medium, and light receiving means for detecting a reflected light of a peripheral portion in a data track direction from the recording medium. According to the invention, the resolving power thereof is further improved. Also, a deterioration of the amplitude of the shortest signal is prevented.

In the above invention, the recording medium may record data as a phase pits in the recording medium. According to the invention, all advantages described above are achieved.

The above invention may further include dividing means for dividing the reflected light from the recording medium into a plurality of parts in a data track direction, the reflected light divided by the dividing means being received by the light receiving means. According to the invention, the light receiving means can be reduced in size and the band thereof is improved. Also, data can be read at a high resolution at a high speed.

In the above invention, the dividing means may be a prism. According to the invention, the light receiving means can be reduced in size and the band thereof is improved. Also, since a separative direction of the detected light can be determined freely, flexibility of the design such as a position of the light receiving means is improved.

In the above invention, the dividing means may be a hologram. According to the invention, the light receiving means can be reduced in size and the band thereof is improved. Also, since a separative direction of the detected light can be determined freely, flexibility of the design such as a position of the light receiving means is improved. Further, since the hologram is suitable for mass production, the optical pick-up device is produced economically. Also, a hologram having a simple plate structure can perform the same function as a prism of complex structure.

In the above invention, the dividing means may include a luminous flux separation area for obtaining a signal for controlling a light spot on the recording medium. According to the invention, the optical pick-up device can have a decrease in the number of parts, size and a production cost.

In the above invention, a plurality of light receiving elements may be provided on the same board. According to the invention, the optical pick-up device can decrease the number of parts, size and production cost.

In the above invention, the light source and the light receiving element may be unitarily provided. According to the invention, the optical pick-up device can be decreased in size.

The above object of the present invention is also achieved by a optical pick-up device for at least one of recording, reproducing and deleting data on a recording medium comprising a light source emitting a light, an objective lens focusing the light from the light source at a predetermined position of a data track of a recording face of the recording medium, a light receiving element detecting a reflected light from the recording face, data signal detecting means for dividing the reflected light from the recording face into a luminous flux of a peripheral portion in a data track direction and a remainder portion and for detecting a data signal from the luminous flux of the peripheral portion in a data track direction, an element having a polarized light separation layer provided between a position of dividing the reflected light and the recording medium, and a quarter-wavelength plate.

According to the invention, an optical system is provided in which a light utilization efficiency is not lowered due to the polarizing hologram. That is, the polarizing hologram prevents a reduction of the light utilization efficiency due to the transition of the light and a deterioration of the transmitting wave face. Therefore, in both a lighting system for lighting the recording medium and a detecting system in which a data signal is detected by the reflected light from the recording medium, the light utilization efficiency can be improved. When a higher power light spot is required, for example, for a rewriting on the recording face of the recording medium, a lower power semiconductor laser device may be used as the light source. Therefore, the production cost of the optical pick-up device may be reduced. Due to an isolation by the quarter-wavelength plate and the polarized separation layer, influence of a returning light is prevented.

In the above invention, the reflected light is a circular shape defined by, $$x^2+y^2=(k \cdot f \cdot NA)^2$$

the optical pick-up device further comprising dividing means for dividing a part of the reflected light defined by, $$x^2+y^2 \leq (k \cdot f \cdot NA)^2$$

$$y \geq k \cdot f(v\lambda - NA)$$

$$y \leq -k \cdot f(v\lambda - NA)$$

in which f represents a focal length of the objective lens, NA represents a numerical aperture of the objective lens, v represents a spacial frequency of the shortest mark recorded on the recording face, $\lambda$ represents a wavelength of the light emitted from the light source, k represents a constant in proportion to a radius of the luminous flux, an origin is a center of the reflected light on a face on which a light axis of the reflected light crosses at a right angle, a y-axis is parallel to a data tracking direction, and a x-axis crosses at a right angle to the y-axis. According to the invention, a noise reduction effect is improved.

The above object of the present invention is also achieved by an optical pick-up device for at least one of recording, reproducing and deleting data on a recording medium comprising a light source emitting a light, an objective lens focusing the light from the light source at a predetermined position of a data track of a recording face of the recording medium, a light receiving element detecting a reflected light from the recording face, data signal detecting means for dividing the reflected light from the recording face into a luminous flux of a peripheral portion in a data track direction and a remaining portion and for detecting a data signal from the luminous flux of the peripheral portion in a data track direction, and dividing means for dividing a part of the reflected light defined by following formulae, $$x^2+y^2 \leq (k \cdot f \cdot NA)^2$$

$$y \geq k \cdot f(v\lambda - NA)$$

$$y \leq -k \cdot f(v\lambda - NA)$$

$$x \geq m, \ x \leq -m, \ (0 \leq m \leq f \cdot NA)$$

in which f represents a focal length of the objective lens, NA represents a numerical aperture of the objective lens, v represents a spacial frequency of the shortest mark recorded on the recording face, $\lambda$ represents a wavelength of the light emitted from the light source, k represents a constant in proportion to a radius of the luminous flux, an origin is a center of the reflected light on a face on which a light axis of the reflected light crosses at a right angle, a y-axis is parallel to a data tracking direction, and a x-axis crosses at a right angle to the y-axis. According to the invention, a noise reduction effect is further improved.

In the above invention, the dividing means may be a prism. According to the invention, the optical pick-up device is reduced in size and a structure thereof can be simplified. Also, the servo signal is obtained without a reduction of the amplitude of the signal.

In the above invention, the dividing means may be a hologram. According to the invention, since the hologram is suitable for mass production, the optical pick-up device is produced economically. Also, the hologram of a simple plate structure can perform the same function as a prism of a complex structure.

In the above invention, the light receiving element receiving the reflected light and the light source is provided in the same package. According to the invention, the optical pick-up device is decreased in the number of parts, size and production cost. Also, the quality of signal is maintained constant against a change on standing and the change in temperature.

In the above invention, the data signal detecting means may detect the data signal as a difference between a luminous flux of a peripheral portion in a data track direction and a luminous flux of a central portion. According to the invention, a noise reduction effect and S/N ratio of the reproductive signal are improved.

Other objects and further features of the present invention will be apparent from the following detailed description when read in conjunction with the accompanying drawings.

BRIEF DESCRIPTION OF THE DRAWINGS

FIG. 28A is a front view showing the optical pick-up device using a prism as a luminous flux dividing means;

FIG. 28B is a side view showing the optical pick-up device using a prism as a luminous flux dividing means;

FIG. 29A is a front view showing the optical pick-up device using a hologram as a luminous flux dividing means;

FIG. 29B is a side view showing the optical pick-up device using a hologram as a luminous flux dividing means;

FIGS. 51A, 51B, 51C and 51D are graphs showing a waveform of the 3T signal and the 11T signal;

FIG. 52 is a plan view showing a light receiving element of the optical pick-up device;

FIG. 53 is a table showing a stroke, a p-p signal and a noise p-p of the 11T signal and the 3T signal when a short axis of an elliptic light spot is in a jitter direction;

FIG. 54 is a table showing a stroke, a p—p signal and a noise p—p of the 11T signal and the 3T signal when a long axis of an elliptic light spot is in a jitter direction;

FIG. 55 is a schematic illustration showing a eighteenth embodiment of the present invention;

FIG. 56 is a plan view showing an aperture member of the eighteenth embodiment of the present invention;

FIG. 57A is a plan view showing a prism of a nineteenth embodiment of the present invention;

FIG. 57B is a side view showing the prism of the nineteenth embodiment of the present invention;

FIG. 58A is a plan view showing a hologram of an twentieth embodiment of the present invention;

FIG. 58B is a side view showing the hologram of the twentieth embodiment of the present invention;

FIG. 59 is a schematic illustration showing a twenty-first embodiment of the present invention;

FIG. 78 is a schematic illustration showing a thirtieth embodiment of the present invention;

FIG. 79A is a plan view showing a light receiving element of the thirtieth embodiment of the present invention;

FIG. 79B is a side view showing a prism of the thirtieth embodiment of the present invention;

FIG. 80A is a plan view showing a hologram of the thirty-first embodiment of the present invention;

FIG. 80B is a side view showing the hologram of the thirty-first embodiment of the present invention;

DESCRIPTION OF THE PREFERRED EMBODIMENTS

Figure 1:
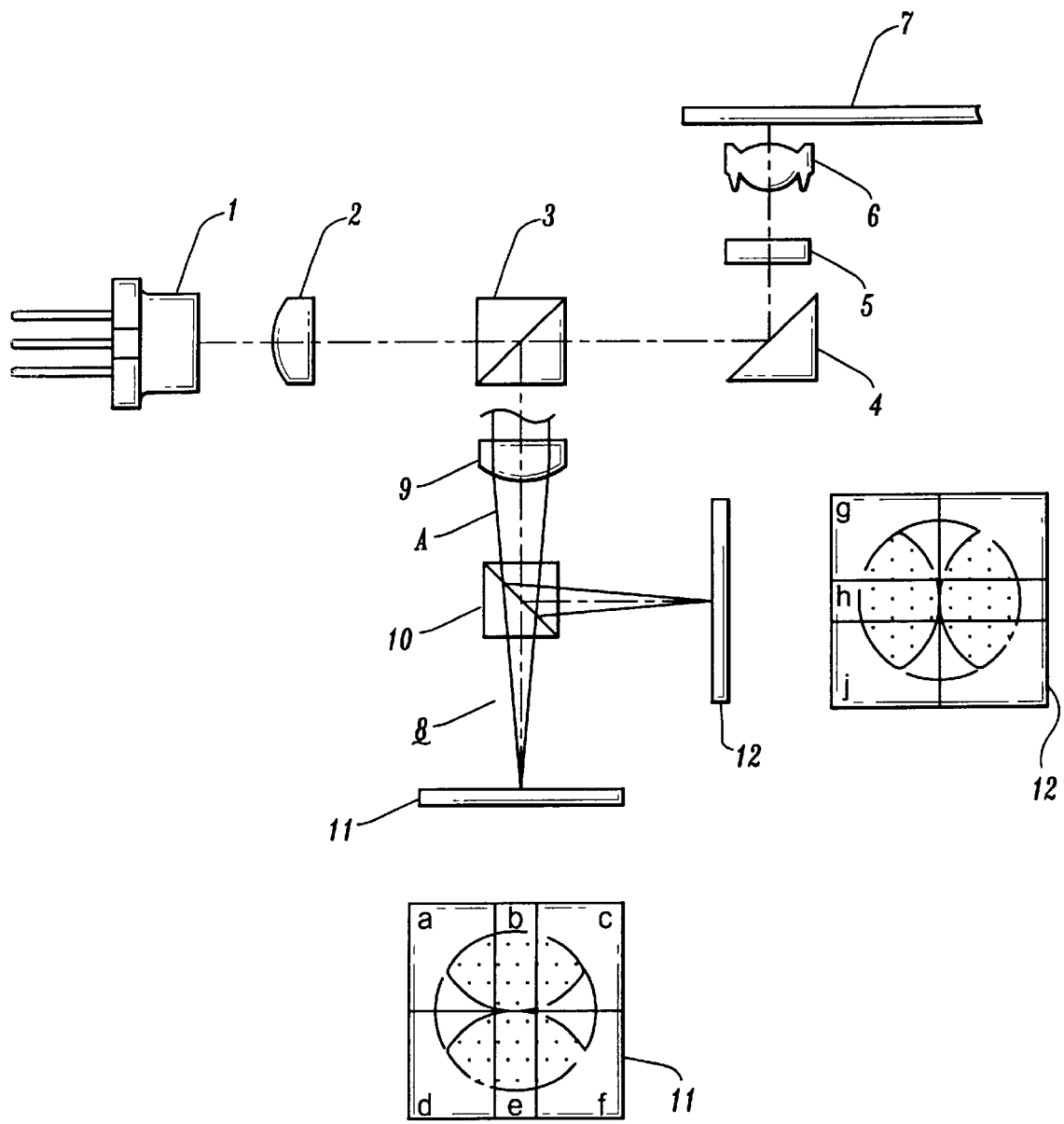
FIG. 1 is a schematic illustration showing a conventional optical pick-up device.
Figure 2A:
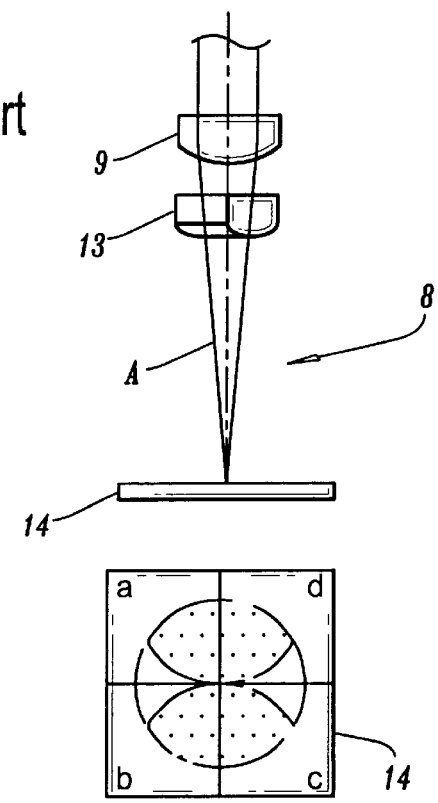
FIG. 2A is a schematic illustration showing an optical system in which the signal is detected by an astigmatism method.
Figure 2B:
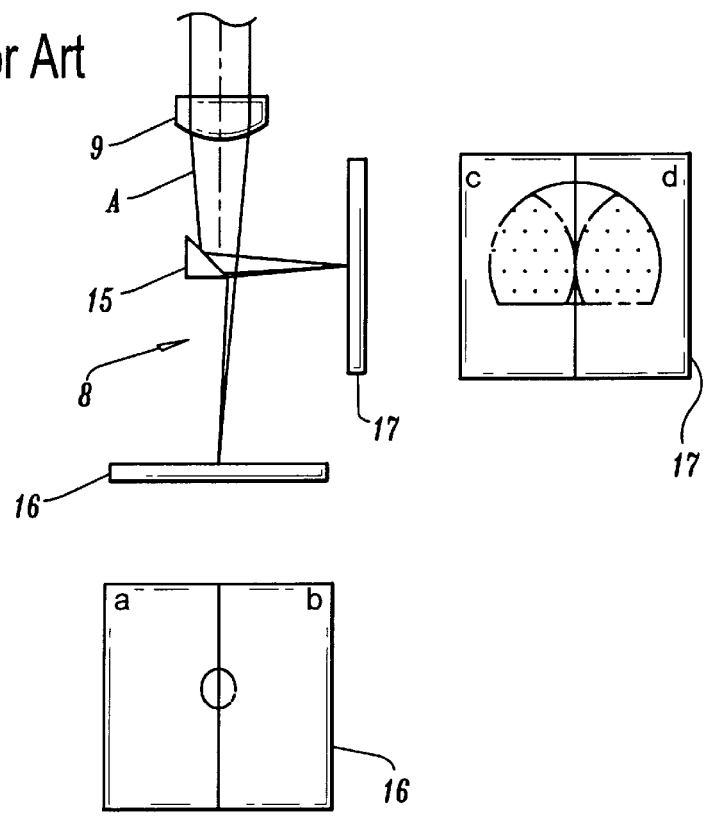
FIG. 2B is a schematic illustration showing an optical system in which the signal is detected by a knife edge method.
Figure 3A:
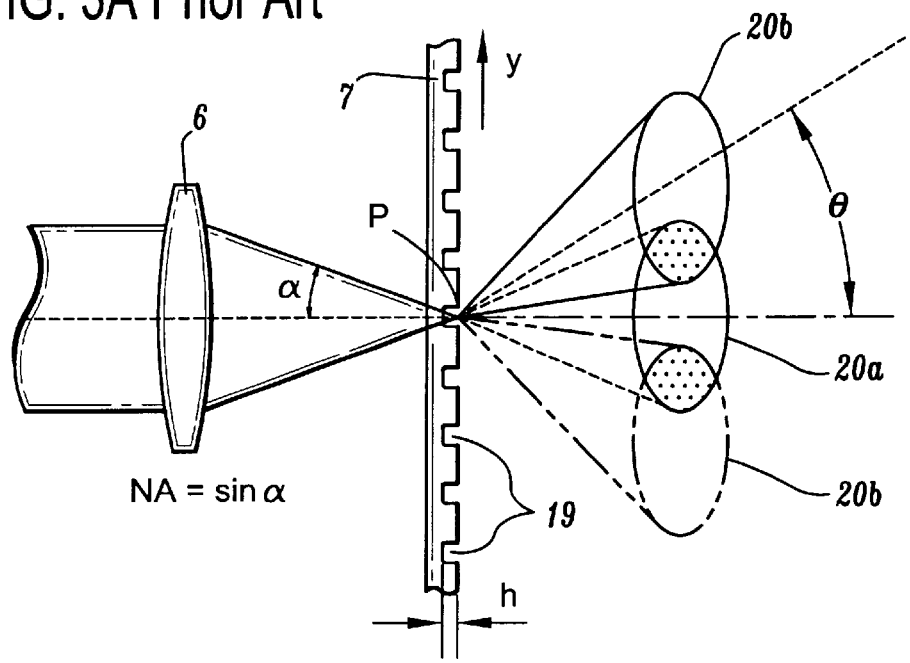
FIG. 3A is a schematic illustration describing a diffraction on the optical disc surface.
Figure 3B:
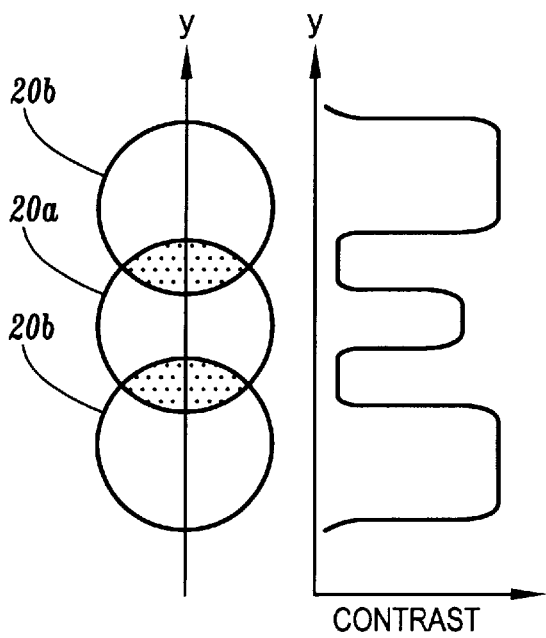
FIG. 3B is a schematic illustration showing a light intensity distribution of a zero-order light and a first-order light.
Figure 4A:
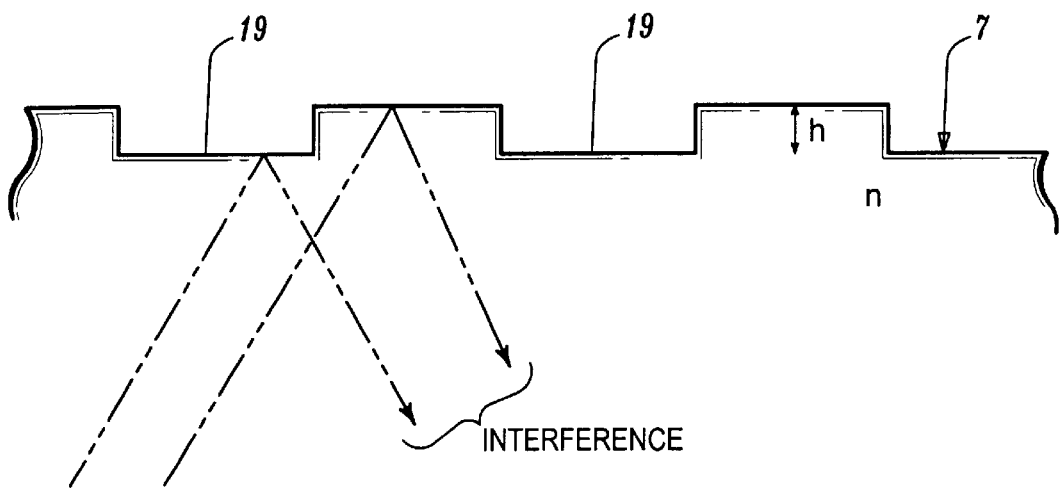
FIG. 4A is a schematic illustration describing a diffraction due to phase pit.
Figure 4B:
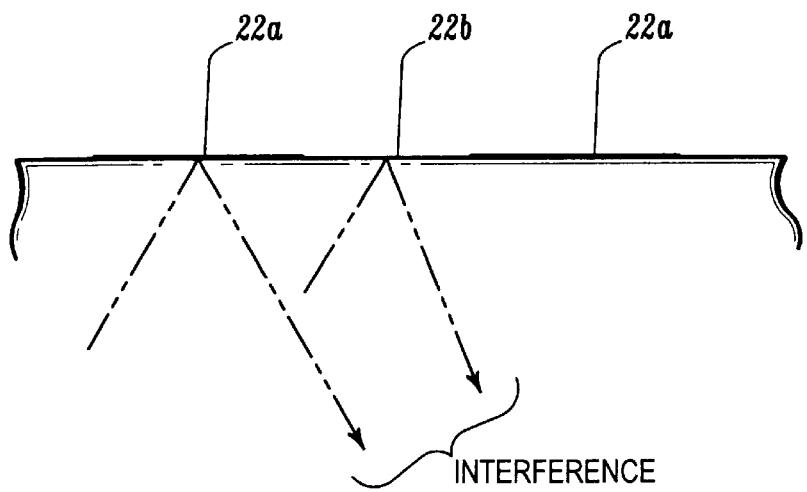
FIG. 4B is a schematic illustration describing a diffraction in a phase-changing type optical disc.

The preferred embodiments of the present invention will now be described in further detail with reference to the accompanying drawings. In the following description, the same features as those previously described will be denoted by the same reference numerals and the description thereof will be omitted.

FIGS. 5–8 show a first embodiment of the present invention. In the following description, the same features as those described in the prior art will be denoted by the same reference numerals and the detained description thereof will be omitted.

Figure 6:
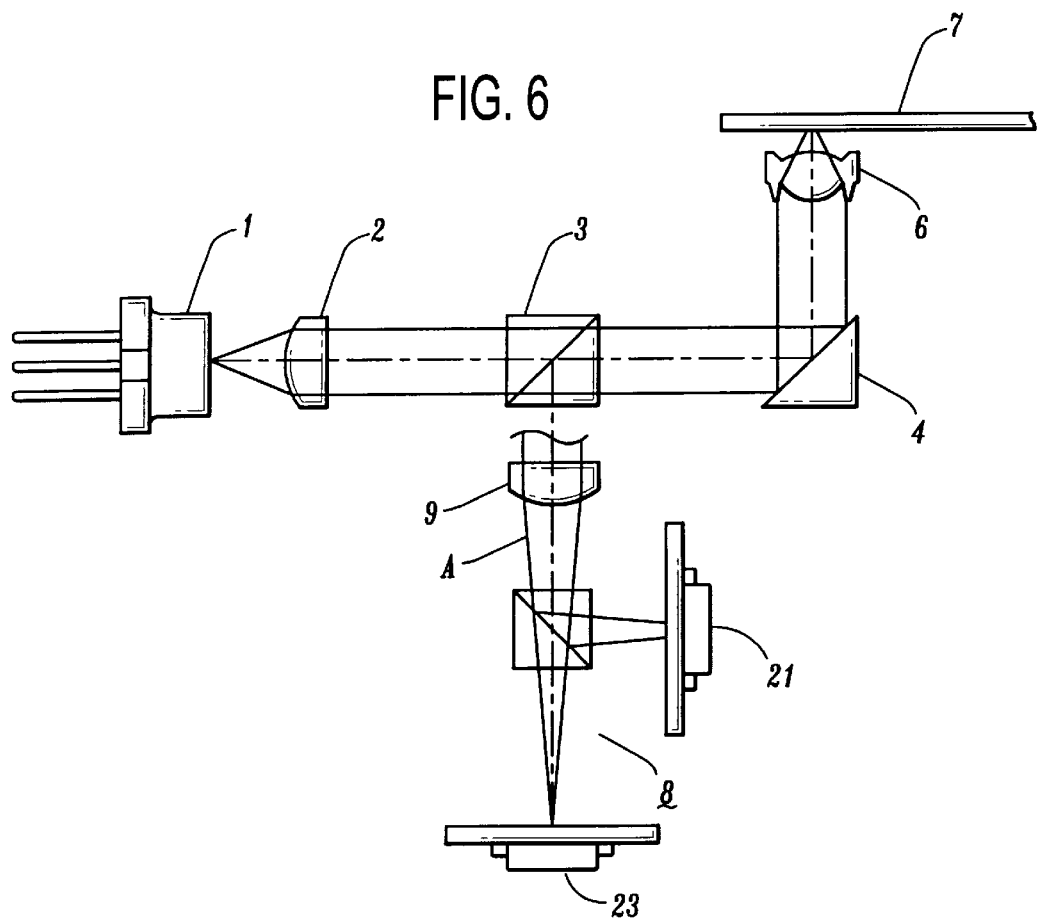
FIG. 6 is a schematic illustration showing an optical pick-up device.

FIG. 6 is a schematic illustration showing a optical pick-up device of the first embodiment of the present invention. In a light path of from a LD 1 to an optical disc 7, a collimating lens 2, a beam splitter 3, a deflection prism 4 and an objective lens 6 are provided. A reflected light A from the optical disc 7 is reflected to a signal detection optical system 8, in which a detection lens 9 and a beam splitter 10 are provided. The reflected light A is reflected to a light receiving element 21 for detecting a data signal by the beam splitter 10. In the light path the reflected light A passes the beam splitter 110, a light receiving element 23 is provided to detect the servo signal which includes a focus error signal and a track error signal.

Figure 5A:
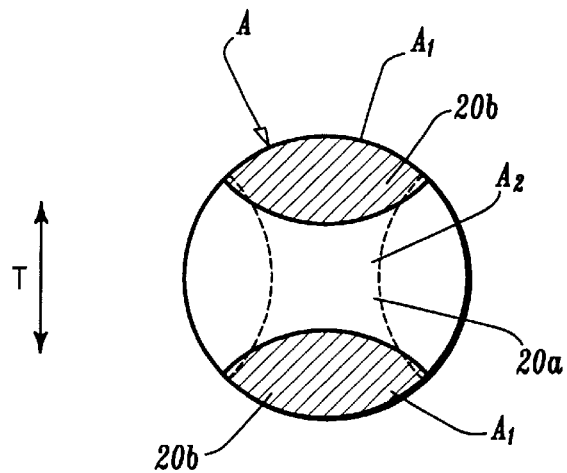
FIG. 5A is a front view showing a reflected light from an optical disc in a first embodiment of the present invention.

The reflected light A includes zero-order light $20a$ and ± first-order light $20b$ (hereinafter, ± is omitted), as shown in FIG. 5A. In the reflected light A, two first optical areas $A_1$ (hatched portion) positioning at both end portions in a track direction is an overlapping area of the zero-order light $20a$ and the first-order light $20b$. A central second optical area $A_2$ includes mainly zero-order light $20a$, but not the first-order light $20b$.

Figure 5B:
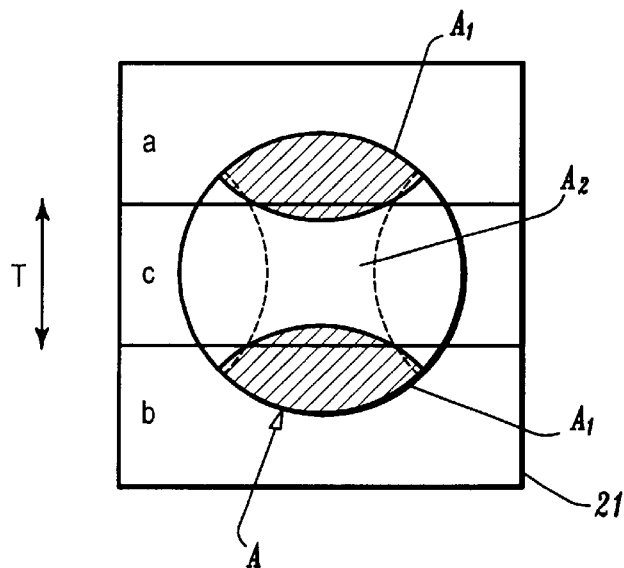
FIG. 5B is a front view showing the reflected light received by a light receiving element divided into three parts in the first embodiment of the present invention.

The light receiving element 21 is divided in a track direction (jitter direction) into three light receiving faces a, b, c, as shown in FIG. 5B. The light receiving faces a, b, c receive the reflected light A reflected by a recording face of the optical disc 7. The light receiving faces a, b receive two first optical area $A_1$ of the reflected light in both end portions in the track direction T. The light receiving face c receives the second optical area $A_2$ of the reflected light A in the center. The data signal reproducing means includes the light receiving element 21 having the light receiving faces a, b, c and a producing means for operating the light received by a light receiving element 21.

Figure 5C:
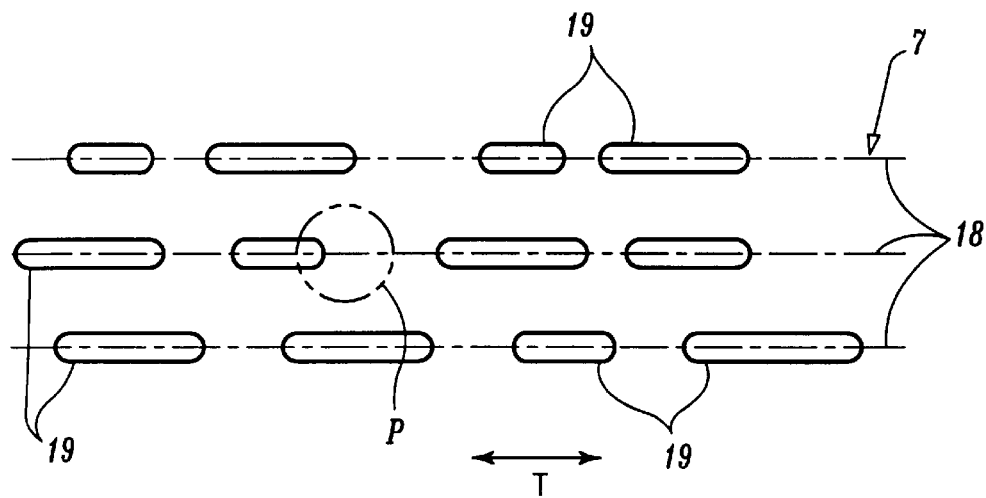
FIG. 5C is a plan view showing the optical disc in which pits of various shape are formed in the first embodiment of the present invention.

In the structure described above, after the light from the LD 1 is parallelized by the collimating lens 2, the light passes the beam splitter 3 and the deflection prism 4. The light is focused on the recording face of the optical disc 7 by the objective lens 6. FIG. 5C shows the recording face of the optical disc 7. On the track 18 on the recording face of the optical disc 7, pit lines, each of which includes pits 19 of various length, are formed in the track direction T. The reflected light A reflected and diffracted by the pit lines includes the zero-order light $20a$ and the first-order light $20b$. After the reflected light is reflected by the beam splitter 3, the light is focused by the detection lens 9 in the signal detection optical system 8. After that, the light is reflected to the light receiving element 21 to detect the data signal Rf.

In this case, in the overlapping first optical area $A_1$ of the reflected light A including the zero-order light $20a$ and the first-order light $20b$, a change in light amount due to an interference of the zero-order light $20a$ and the first-order light $20b$ appears. The size of the overlapping area depends on the pit length in the track direction. That is, when the pit is shorter, the less first-order light appears and an interference area of the zero-order light $20a$ and the first-order light $20b$ is smaller. Accordingly, in the first optical area $A_1$ of the reflected light A, which is an overlapping area corresponding to the recorded pit data, the light amount changes in response to the pit length. Instead, in the second optical area $A_2$, which is a area of the zero-order light $20a$ corresponding to the noise, a change in pit shape does not influence the light amount.

The reflected light A including the first optical area $A_1$ and the second optical area $A_2$ is introduced to the light receiving element 21, which is divided into the light receiving faces a, b, c. In this case, most luminous flux of the first optical area $A_1$ is introduced to the light receiving faces a, b of both side portions and most luminous flux of the second optical area $A_2$ is introduced to the light receiving face c of the central portion. The data signal reproducing means defines the difference between the signal X detected by the light receiving faces a, b corresponding to the first optical area $A_1$ of the detected light A and the signal Y detected by the light receiving face c corresponding to the second optical area $A_2$ of the detected light A in order to reproduce the data signal Rf. In this case, the data signal Rf is determined, according to the following formula.

$$Rf=(a+b)-c$$

According the above device, the signal can be detected without the amplitude of the signal with reduced noise.

In this embodiment, after the reflected light A including the zero-order light and the first-order light is divided into the first optical area $A_1$ and the second optical area $A_2$, the light is received by the light receiving element 21. The difference in the light amount between the luminous flux of the peripheral portion, which is mainly the first optical area $A_1$ including the overlapping area of the zero-order light $20a$ and the first-order light in the track direction T, and the luminous flux of the central portion, which is the second optical area $A_2$ including mainly the zero-order light $20a$ but not the first-order light $20b$ is obtained. The total light amount of the signal is reduced and the data signal can be reproduced without reducing the amplitude of the signal detected in response to the shortest pit. Thus, the noises included in the reflected light A (the noise of LD1, the noise of the light receiving element, the noise of the optical disc) can be reduced and the resolving power can be improved.

Accordingly, the S/N can be improved the signal can be reproduced from the recording medium of a high density.

Next, a second embodiment of the present invention will be described, referring to FIGS. 6–9. In the following description the same features as those previously described will be denoted by the same reference numerals and the description thereof will be omitted.

Figure 7:
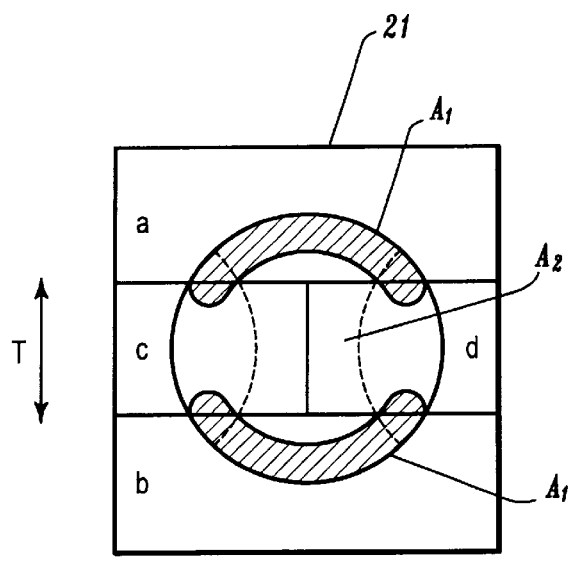
FIG. 7 is a front view showing a reflected light divided in a track direction in a second embodiment of the present invention.

The light receiving element 21 is divided into three in the track direction to form light receiving faces a, b of both end portions. Also, the light receiving element 21 is divided into two in a direction crossing at right angle to the track direction to form light receiving faces c, d of central portion, as shown in FIG. 7. The light receiving element 21 is arrange in the signal detection optical system 8 shown in FIG. 6. In this case, the first optical area $A_1$, which is the luminous flux of the first-order light 20b of both end portions in which a signal corresponding to the shortest pit is concentrated, is received by the light receiving faces a, b. The second optical area $A_2$, which is the luminous flux of the zero-order light 20a of the central portion in which a signal corresponding to the shortest pit is not detected, is received by the light receiving faces c, d. In order to reproduced the data signal Rf, the difference between the signal form the light receiving faces a, b and the one from the light receiving faces c, d. Also, the track error signal Te can be detected based on the data of the light receiving faces c, d. The data signal and the track error signal are obtained, according to the following formulae.

$$Rf=(a+b)-(c+d)$$

$$Te=c-d$$

In the present embodiment, the difference between the first-order light 20b (first optical area $A_1$) of the both end portions and the zero-order light 20a (second optical area $A_2$) of the central portion is obtained to reduce the noise included in the reflected light A without reducing the signal amplitude. Therefore, the S/N can be improved. Also, by providing the light receiving element 23 in the signal detection optical system 8, the focus error signal Fe can be detected by the conventional signal detecting method, such as the astigmatism method and the knife-edge method.

Figure 8A:
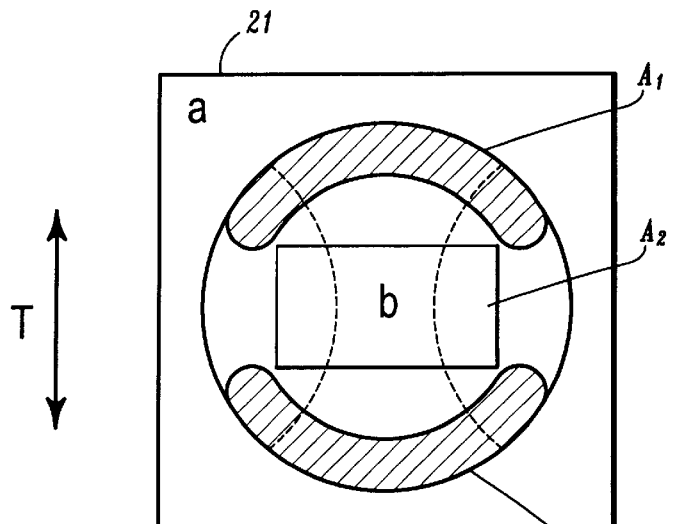
FIG. 8A is a front view showing a reflected light including a peripheral portion and a central portion which are received by a light receiving face whose central area is a rectangular shape.

Next, variations of the above embodiment are described, referring to FIGS. 8 and 9. The light receiving element 21 is divided into a light receiving face a of the peripheral portion and a central light receiving face b of a rectangular shape surrounded by the light receiving face a, as shown in FIG. 8A. The light receiving element 21 is arranged in the signal detection optical system 8 shown in FIG. 6. In this case, in the reflected light from the optical disc 7, the first optical area $A_1$, which is an luminous flux in the peripheral portion where the signal corresponding to the shortest pit is concentrated, is introduced to the light receiving face a of the peripheral portion. The second optical area $A_2$, which is an luminous flux in the central portion where the signal corresponding to the shortest pit is not detected, is introduced to the light receiving face b. By obtaining the difference in a light amount between the signals of the central portion and the peripheral portion of the light receiving faces a, b, the data signal Rf can be reproduced at a high sensitivity with a reduced noise. In this case, the data signal Rf can be determined, according to the following formula.

$$Rf=a-b$$

Figure 8B:
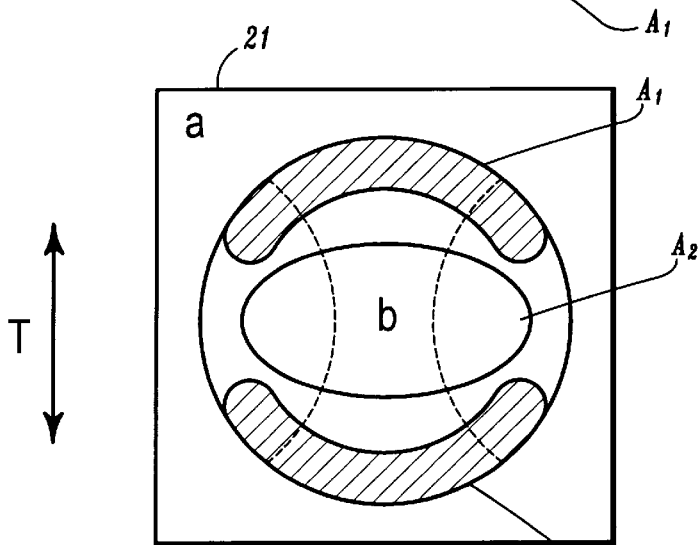
FIG. 8B is a front view showing a reflected light including a peripheral portion and a central portion which is received by a light receiving face whose central area is an elliptic shape.
Figure 8C:
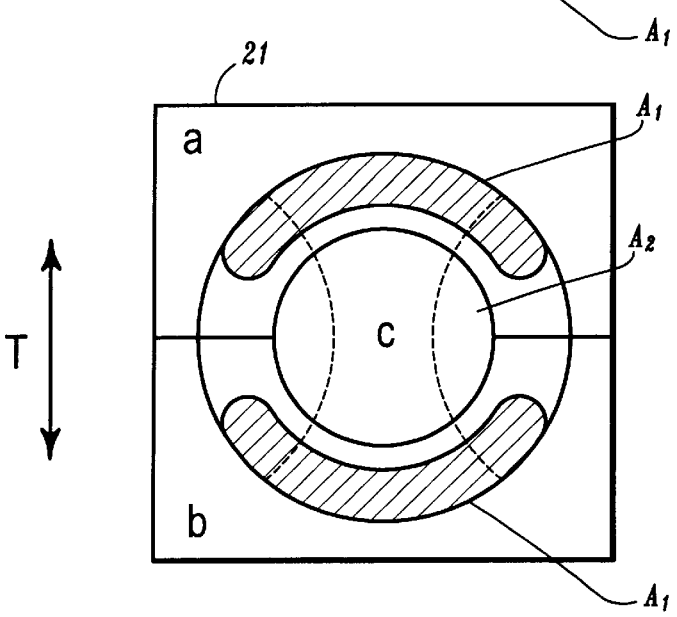
FIG. 8C is a front view showing a reflected light including a peripheral portion and a central portion which is received by a light receiving face whose central area is a circular shape.

When the central light receiving face b is made an elliptical shape shown in FIG. 8B or when the light receiving element 21 is divided into light receiving faces a, b divided in the track direction and the central light receiving face a of a circular shape, the similar advantages can be obtained. In the variation shown in FIG. 8C, the data signal can be obtained, according to the above formula.

Figure 9A:
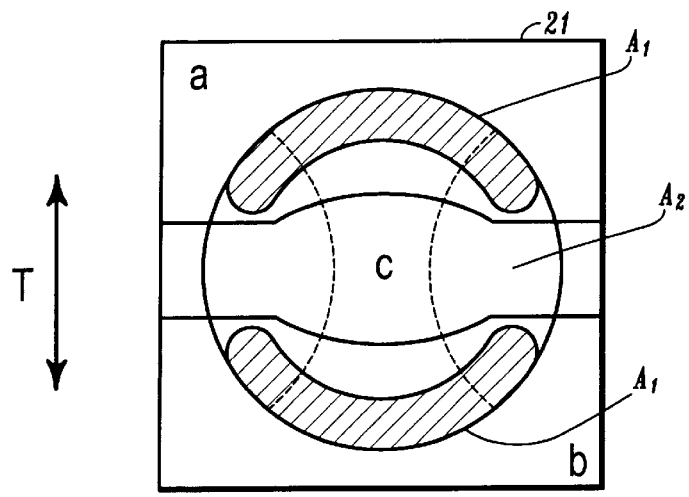
FIG. 9A is a front view showing a reflected light divided in a track direction, whose boundary line is a elliptic shape.
Figure 9B:
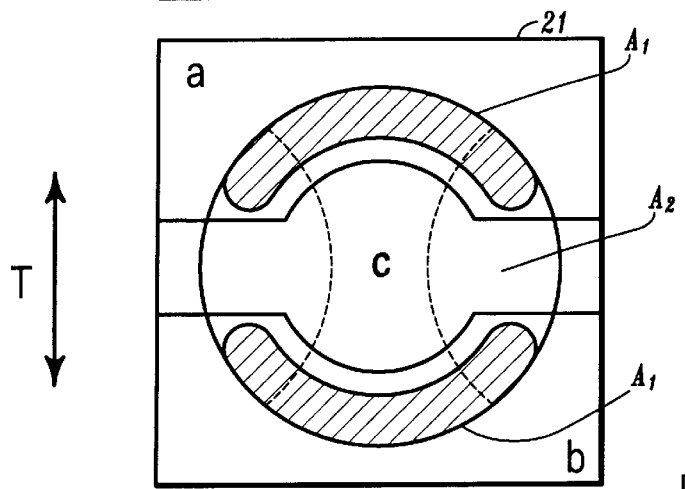
FIG. 9B is a front view showing a reflected light divided in a track direction, whose boundary line is a circular shape.

Also, the light receiving element 21 may be divided a light receiving faces a, b divided in the track direction T and a remaining light receiving face c, as shown in FIGS. 9A and 9B. In the central portion of the light receiving faces a, b is incurvated in the track direction T corresponding to the distribution shape of the 3T signal. The reason for forming the light receiving faces in the incurvated shape and only the luminous flux in the peripheral portion in the track direction T is detected is that the 3T signal does not exist in the end portion in the radial direction which crosses the track direction at right angle, as shown in FIG. 5A.

In the reflected light A from the optical disc 7, the first optical area $A_1$, which is the luminous flux in the peripheral portion where the signal corresponding to the shortest pit is concentrated, is introduced to the light receiving faces a, b of the peripheral portion. The second optical area $A_2$, which is the luminous flux in the central portion where the signal corresponding to the shortest pit is not detected, is introduced to the light receiving face c of the central portion. The data signal can be detected with a high sensitivity with a reduced noise by obtaining the difference in the light amount between the peripheral portion and the remaining portion of the light receiving element 21. The data signal Rf can be determined, according to the following formula.

$$Rf=(a+b)-c$$

Next, a third embodiment of the present invention will be described, referring to FIGS. 10–12. In the following description, the same features as those previously described will be denoted by the same reference numerals and the description thereof will be omitted.

Figure 10:
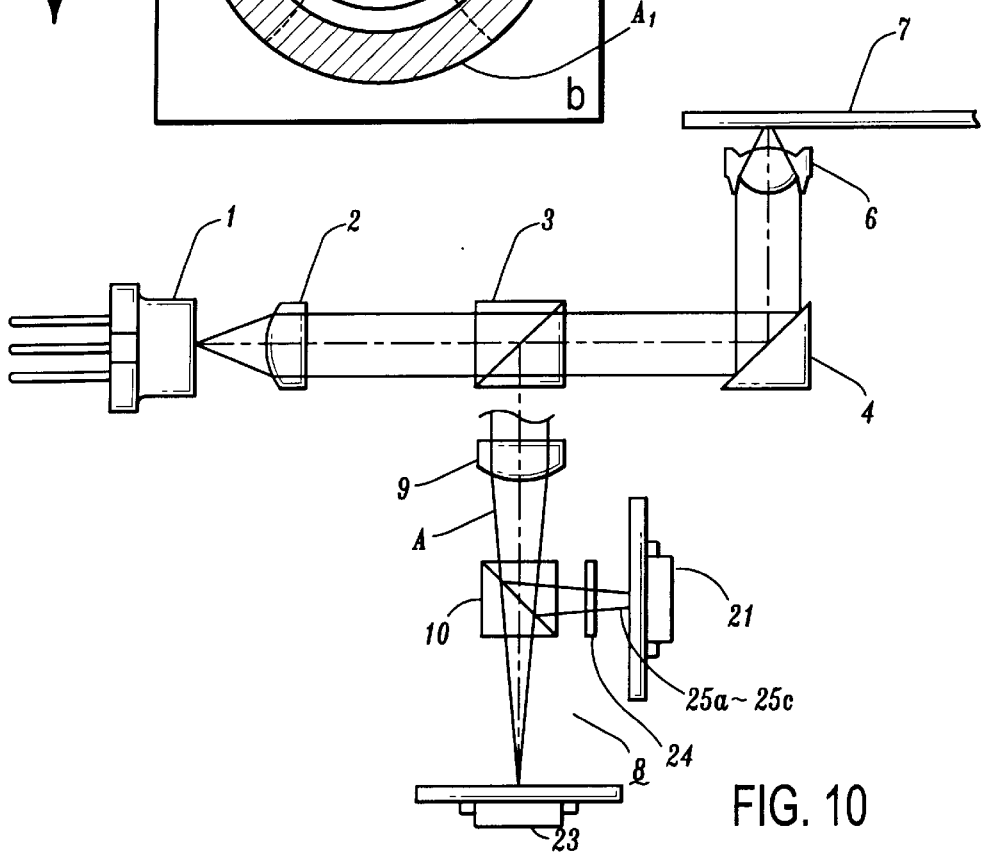
FIG. 10 is a schematic illustration showing a third embodiment of the present invention.
Figure 11A:
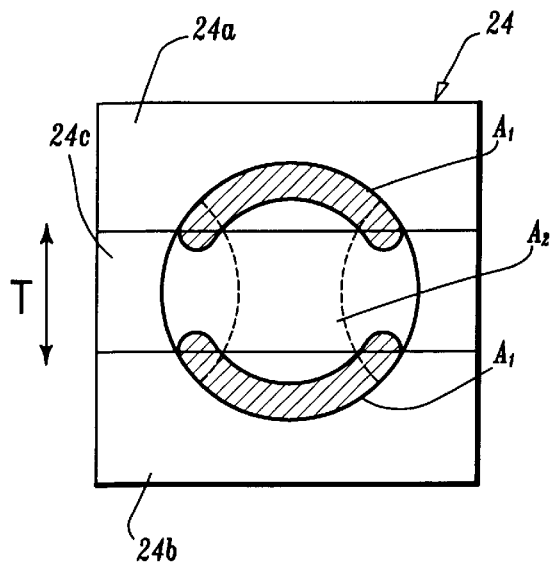
FIG. 11A is a front view showing a prism.

On the light path of the reflected light A reflected by the beam splitter 10, the prism 24 is provided, as shown in FIG. 10. FIG. 11A shows a prism 24 which is divided into three areas 24a, 24b, 24c. The upper and lower areas 24a, 24b are large enough to receive a luminous flux (first-order light 20b) of the first optical area $A_1$ of the reflected light A. The central area 24c is large enough to receive a luminous flux (zero-order light 20a) of the second optical area $A_2$ of the reflected light A. The prism is arranged in the light path so that the prism 24 is divided into three areas 24a, 24b, 24c in the track direction. Also, the light receiving element 21 having three light receiving faces a, b, c is provided to receive three divided luminous flux 25a, 25b, 25c divided by the prism 24. Each of the light receiving faces a, b, c is arranged adjacent to focussing point of each luminous flux 25a, 25b, 25c. As the light receiving means, a plurality of the light receiving element can be used instead of the single light receiving element having a plurality of light receiving faces.

Figure 11B:
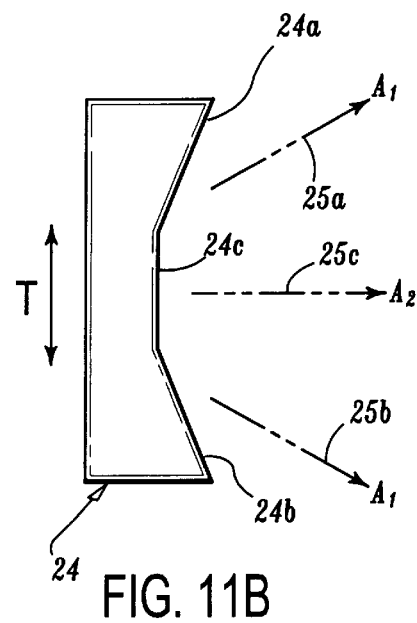
FIG. 11B is a side view showing the prism.

After the prism 24 and the light receiving element 21 are provided in the light path, the reflected light A from the optical disc is introduced to the prism 24. In this case, the first optical area $A_1$ of upper part, which is the luminous flux of the peripheral portion where the signal corresponding to the shortest pit is concentrated, is introduced the upper area 24a. The lower first optical area $A_2$ is introduced to the lower area 24b. The second area $A_2$, which is the luminous flux of the central portion where the signal corresponding to the shortest pit is not detected, is introduced to the central area 24c. Thus, the reflected light passing the prism 24 is divided into the luminous fluxes 25a, 25b (first optical area $A_1$) and the central luminous flux 25c (second optical area $A_2$), as shown in FIG. 11B. The luminous fluxes 25a, 25b, 25c are detected by the light receiving element 21 having the light receiving faces a, b, c separately. That is, the luminous flux 25a is introduced to the light receiving face a, the luminous flux 25b is introduced to the light receiving face b and the luminous flux 25c is introduced to the light receiving face c in order to obtain the data signal Rf, according to the following formula.

$$Rf=(a+b)-c$$

In the method described above, the data signal Rf can be reproduced with the reduced noise. Also, since the luminous fluxes 25a, 25b, 25c are received by the light receiving faces a, b, c of the light receiving element 21 adjacent to the focusing point thereof, the light receiving area is reduced and the band characteristics thereof can be improved.

Figure 12A:
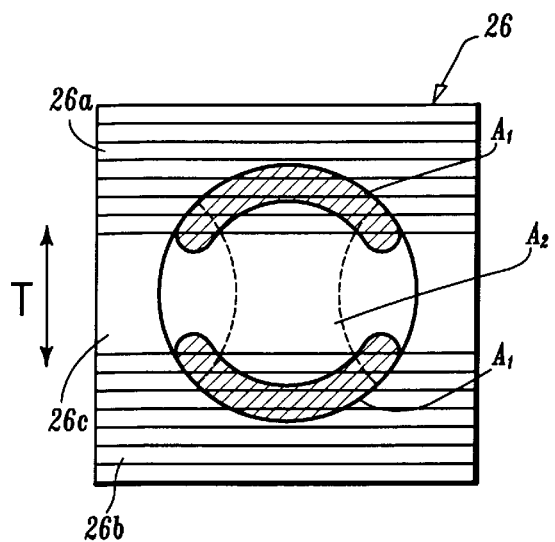
FIG. 12A is a front view showing a hologram.
Figure 12B:
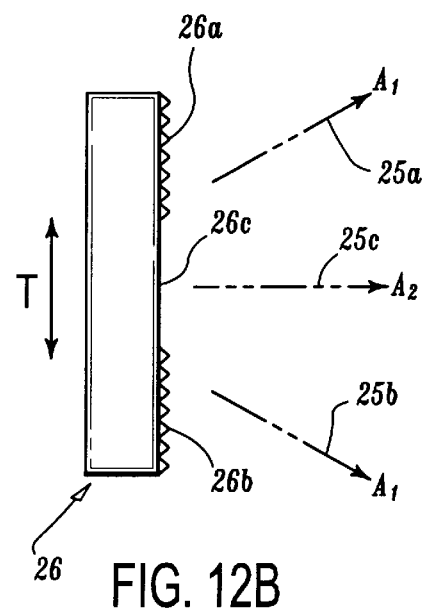
FIG. 12B is a side view showing the hologram.
Figure 13:
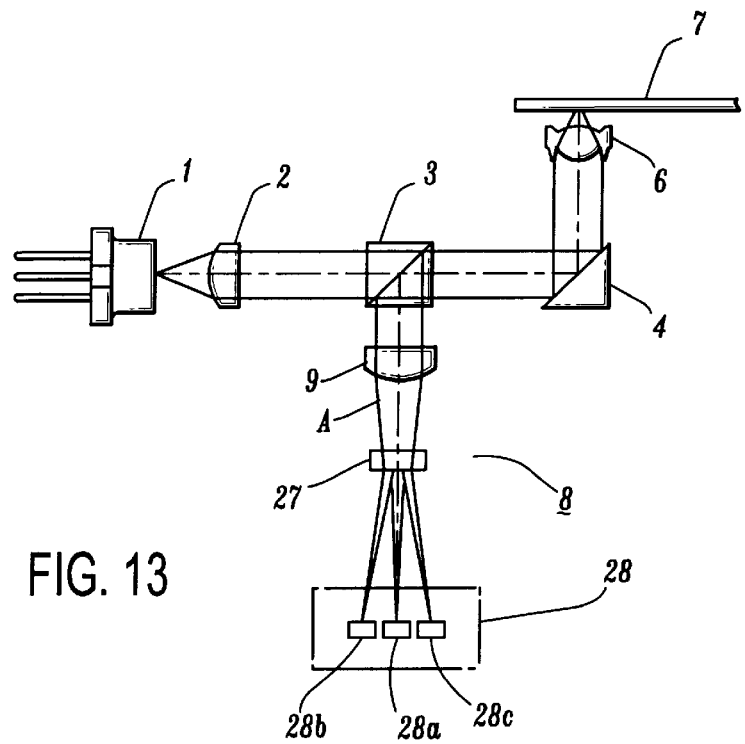
FIG. 13 is a schematic illustration showing a fourth embodiment of the present invention.

As the luminous flux dividing means, a hologram may be used instead of the prism 24, as shown in FIGS. 12A and 12B. The hologram 26 includes an upper area 26a and a lower area 26b in which a grating is formed. In this case, the upper and lower areas 26a, 26b are formed large enough to receive the first optical area $A_1$ of the reflected light. The central area 26c is formed large enough to receive the second optical area $A_2$ of the reflected light A. With a hologram 26 divided into the areas 26a, 26b, 26c in the track direction T in the light path, the reflected light A is divided into the three luminous fluxes 25a, 25b, 25c. Thus, the data signal can be produced with a reduced noise. The data signal Rf is determined, according to the following formula.

$$Rf=(a+b)-c$$

Next, a fourth embodiment of the present invention will be described, referring to FIGS. 13–16. In a following description, the same features as those previously described will be denoted by the same reference numerals and the description thereof will be omitted.

Figure 14A:
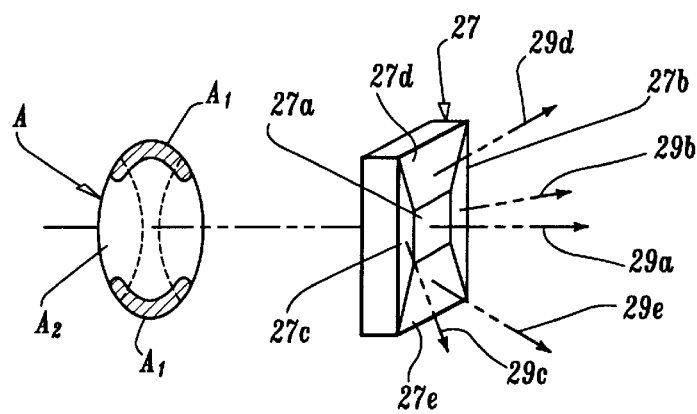
FIG. 14A is a perspective view showing a prism having a plurality of luminous flux dividing areas.
Figure 14B:
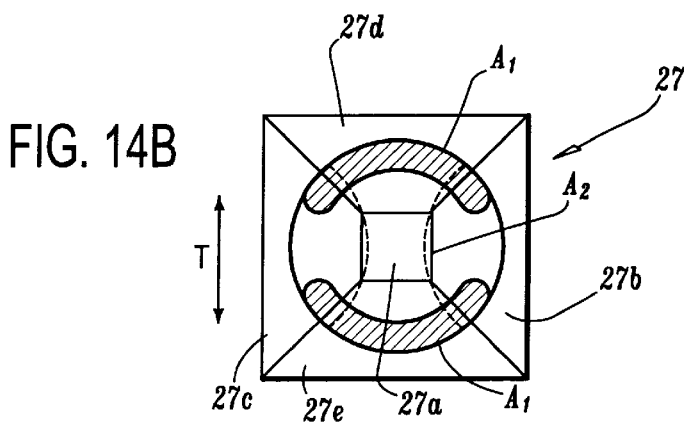
FIG. 14B is front view showing the prism having a plurality of luminous flux dividing areas.

In the signal detection optical system 8 shown in FIG. 12, a prism 27 and a light receiving element 28 receiving a plurality of luminous fluxes separated by the prism 27 are provided. The prism 27 is divided into a plurality of area 27a–27e (luminous flux dividing areas), as shown in FIG. 14A and 14B. Each of the areas has different diffraction angle. When the reflected light A from the optical disc A is introduced to the prism 27, luminous fluxes 29a–29e corresponding to the areas 27a–27e are generated. These luminous fluxes 29a–29e are introduced to the light receiving faces 28a–28e of the light receiving element 28.

When the luminous flux 29d transiting the area 27d or the luminous flux 29e transiting the area 27e is received by the light receiving face d or the light receiving face d, the focus error signal Fe can be detected using the knife-edge method. Also, when the luminous flux 29b, 29c diffracted by the areas 27b, 27c is received by the light receiving faces b, c and the difference between them is obtained, the track error signal Te can be detected. The data signal Rf can be determined by obtaining the difference between the signal of the luminous flux of the peripheral portion (first optical area $A_1$) and that of the luminous flux of the central portion (second optical area $A_2$). The signals Fe, Te, Rf can be determined, according to the following formulae.

$$Fe=d_1-d_2$$

or $$Fe=e_1-e_2$$

$$Te=b-c$$

$$Rf=(d+e)-a,$$

or $$Rf=(b+c+d+e)-a$$

Figure 15:
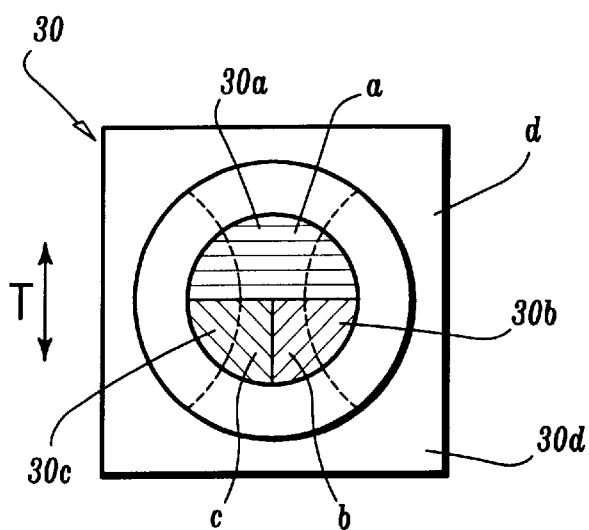
FIG. 15 is a front view showing a hologram having a plurality of luminous flux dividing areas.

$d_1$, $d_2$: light receiving face d divided into two parts $e_1$, $e_2$: light receiving face e divided into two parts As a luminous flux dividing means, a hologram 30 can be used instead of the prism 27, as shown in FIG. 15. The hologram 30 is divided into a plurality of areas 30a–30d (luminous flux dividing areas). In each of the areas 30a, 30b, 30c, a grating is formed. Each of the areas 30a–30d has its own diffraction angle. When the reflected light A is received by the hologram 30, The focus error signal Fe is detected by the knife-edge method, the track error signal Te is detected based on the luminous flux diffracted by the area 30b, 30c and the data signal Rf is detected based on the difference between the luminous flux of the peripheral portion (first optical area $A_1$) and the luminous flux of the central portion (second optical area $A_2$). In this case, for example, when the light receiving element 28 is divided into the light receiving faces a–d, corresponding to the areas 30a–30d of the hologram 30, the data signal Rf can be obtained by the following formula.

$$Rf=d-(a+b+c)$$

Figure 16:
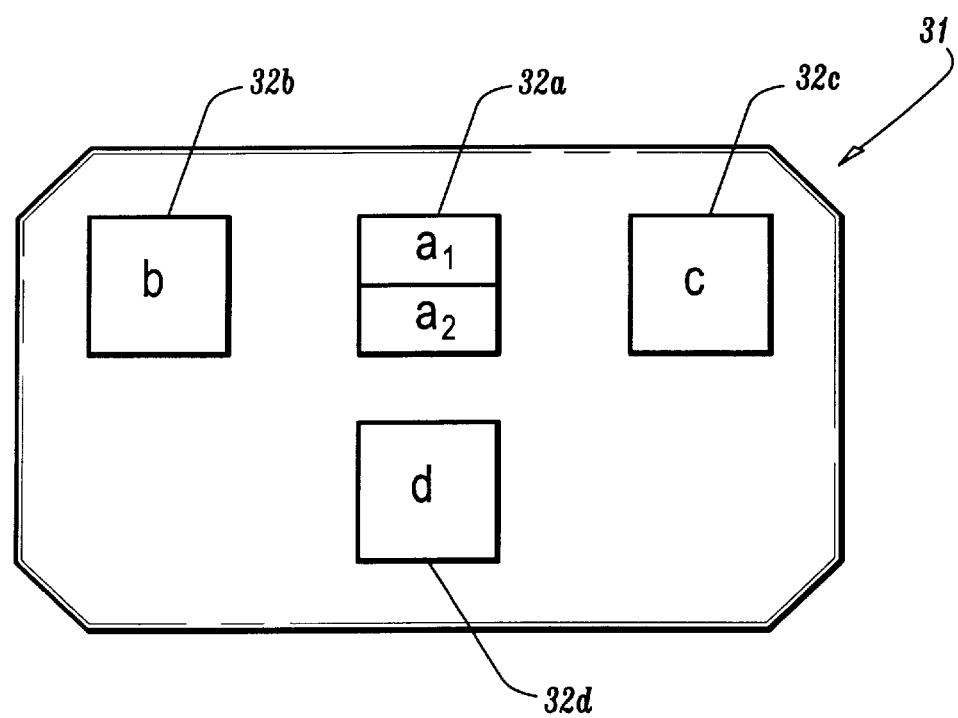
FIG. 16 is a front view showing a plurality of light receiving elements provided on a single substrate.

A plurality of luminous flux divided by a hologram 30 may be separately introduced to light receiving faces $a_1$, $a_2$, b, c, d of four light receiving elements 32a–32d provided on a substrate 31, as shown in FIG. 16. The signals Fe, Te, Rf are determined as follows.

$$Fe=a_1-a_2$$

$$Te=b-c$$

$$Rf=(a_1+a_2+b+c)-d$$

When the light receiving element 32a–32d are provided on the substrate 31, an assembling and an adjustment become easy.

Next, the fifth embodiment of the present invention will be described, referring to FIGS. 17–19. In a following description, the same features as those previously described will be denoted by the same reference numerals and the description thereof will be omitted.

Figure 17:
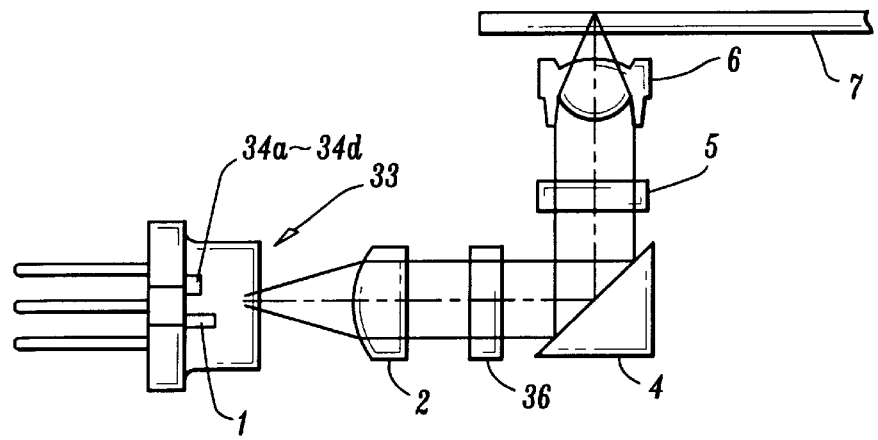
FIG. 17 is a schematic illustration showing a fifth embodiment of the present invention.
Figure 18:
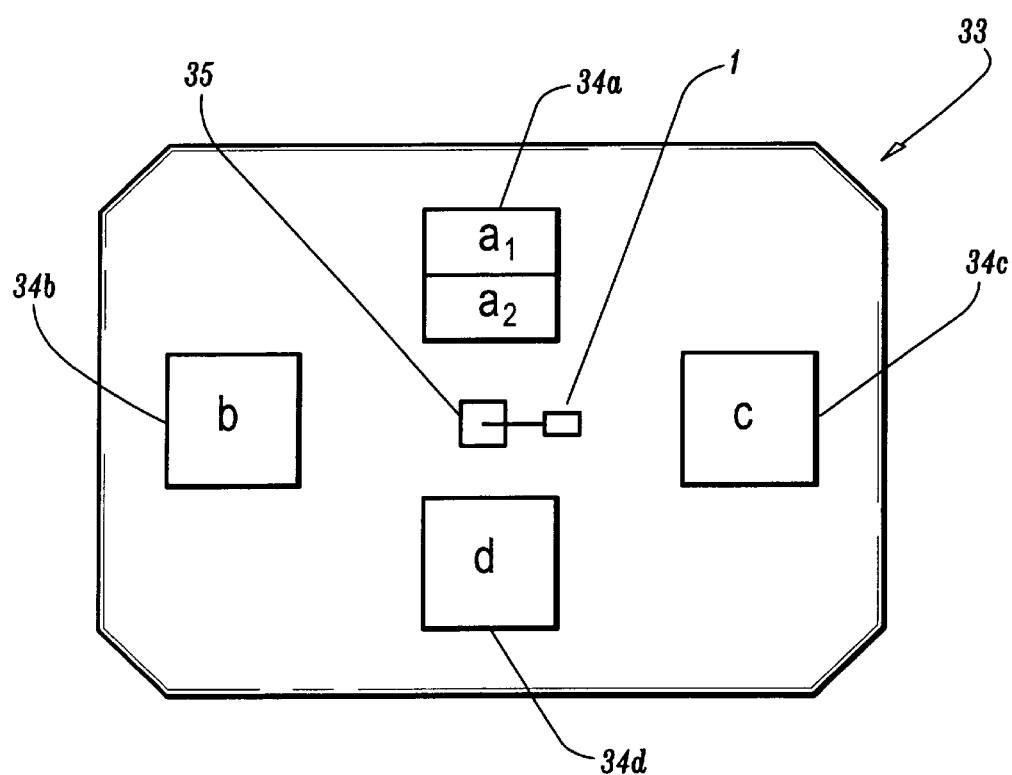
FIG. 18 is a front view showing a laser light source and a light receiving element which are provided unitarily.

In a LD-PD unit 33, the LD 1 and four light receiving element 34a–34d are provided, as shown in FIG. 17. FIG. 18 is a front view showing the LD-PD unit 33. At a central portion of the LD-PD unit 33, LD 1 is provided. Around the LD-PD unit 33, the light receiving element 34a–34d are provided.

A light emitted from the LD 1 of the LD-PD unit 33 is reflected to an outside of the unit by a mirror 35. The light is introduced to a polarized light hologram having a polarized light dividing function, which transmutes the S polarized light and diffracts the P polarized light, through the collimating lens 2. After the light transmutes the polarized hologram 36, the light is diffracted. After the light passes the quarter-wavelength plate 5, the light is focused on the optical disc 7 by an objective lens 6. The reflected light A from the optical disc 7 again passes the quarter-wavelength plate 5 to be converted to the linear polarized light in which a polarizing angle is 90° different from the reflected light. The linear polarized light is diffracted to the light receiving element 34a–34d in the LD-PD unit 33 by the polarized light hologram 36. Thus, the signals Rf, Fe, Te can be detected in the method described in FIG. 16. Accordingly, when the LD 1 and the light receiving element 34a–34d are arranged closely it the LD-PD unit 33, the light path can be made simple and a space for the optical system can be reduced.

Figure 19:
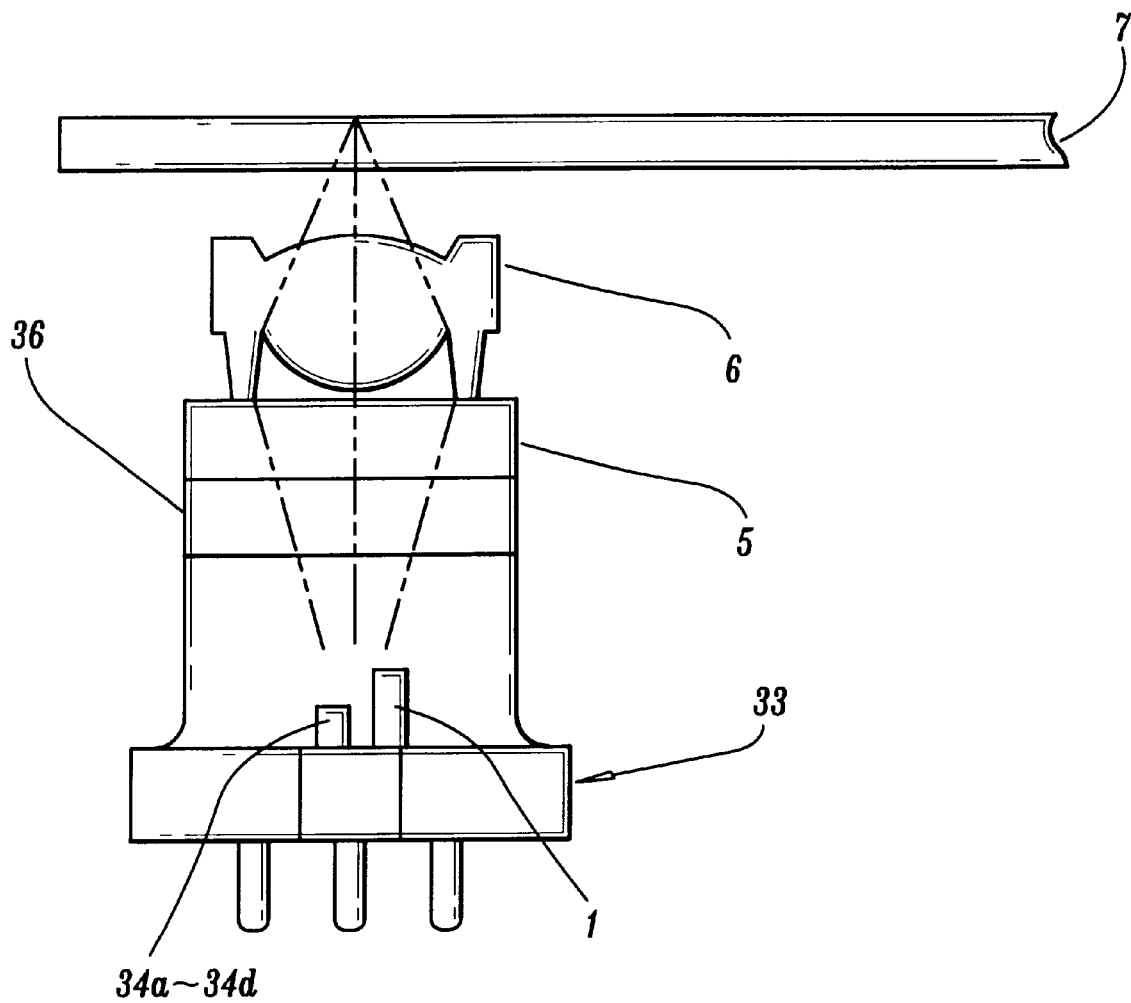
FIG. 19 is a schematic illustration showing a variation of the fifth embodiment of the present invention shown in FIG. 17.

In the device shown in FIG. 19, the collimating lens 2 and the diffraction prism 4 are omitted and each element are provided integrally. According to the device, the number of parts and the size of the device can be reduced.

FIGS. 20–24 show a sixth embodiment of the present invention. In the following description, the same features as those previously described with reference to the prior art are denoted by the same reference numerals and the descriptions thereof are omitted.

Figure 21A:
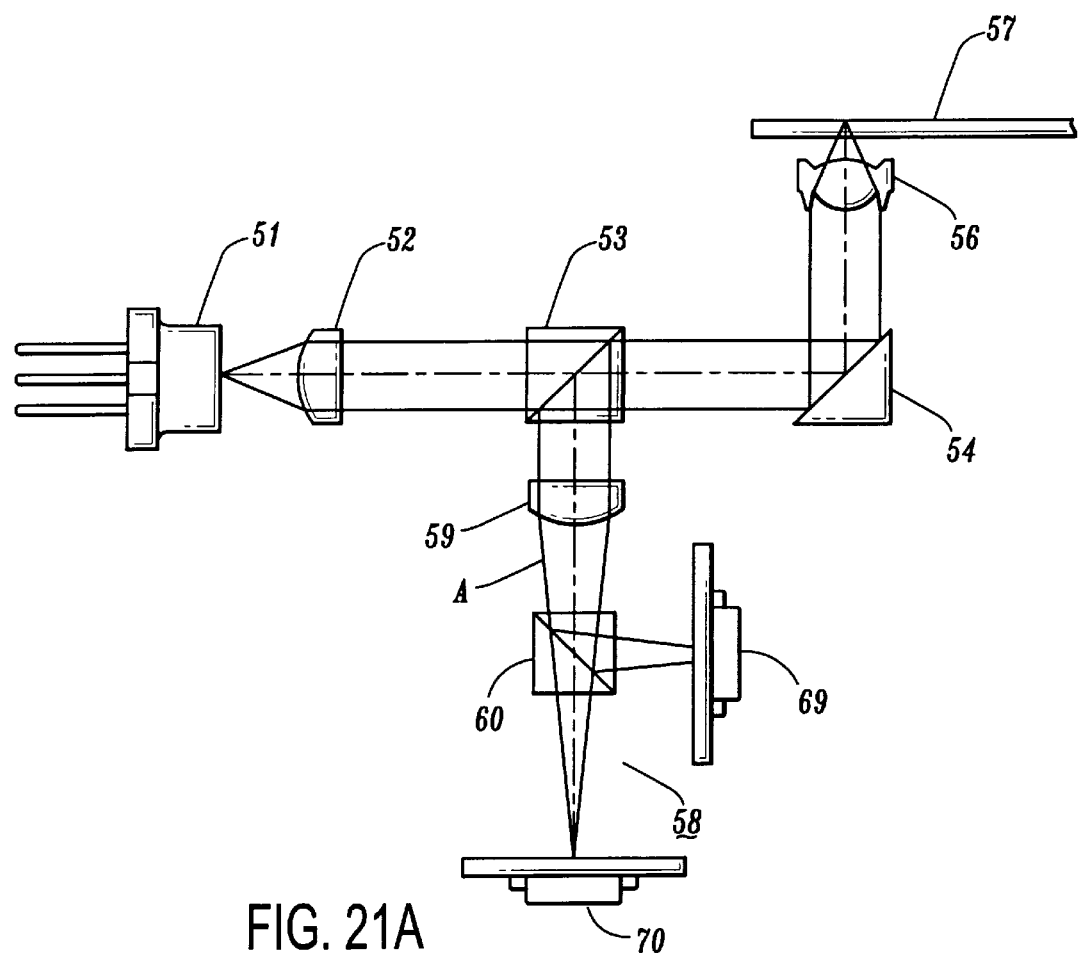
FIG. 21A is a schematic illustration showing an optical pick-up device.
Figure 21B:
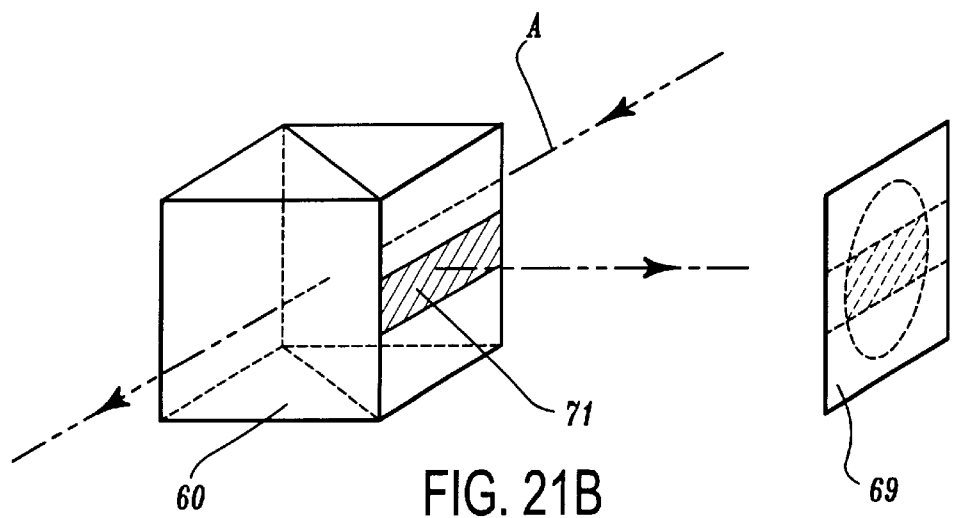
FIG. 21B is a perspective view showing a signal detection optical system.

FIG. 21A is a schematic illustration showing an optical pick-up device of the present invention. A reflected light A from an optical disc 57 is separated by a beam splitter 60 in a signal detection optical system 58. On the same light path, a light receiving element 69 is provided. On one surface of the beam splitter 60, a shading member (light absorbing layer 71) is formed to shade a part of the luminous flux of the reflective light, as shown in FIG. 21B.

Figure 20A:
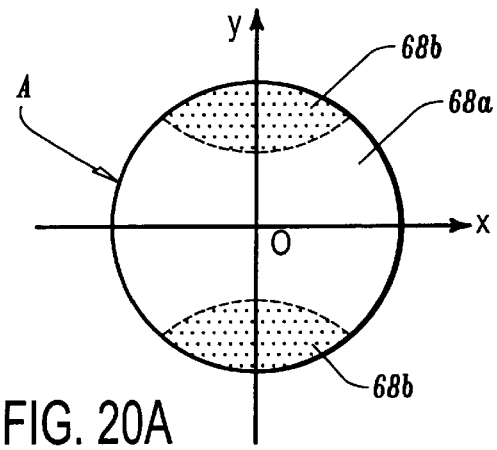
FIG. 20A is a front view showing a reflective light in a sixth embodiment of the present invention.

FIG. 20A shows a beam shape of the reflected light A before transmitting the shading material. The reflected light A consists of a zero-order light 68a and a first-order light 68b (hereinafter, a sign ± is omitted) which appears at both sides in a track direction (jitter direction) y, overlapping the zero-order light 68a.

Figure 20B:
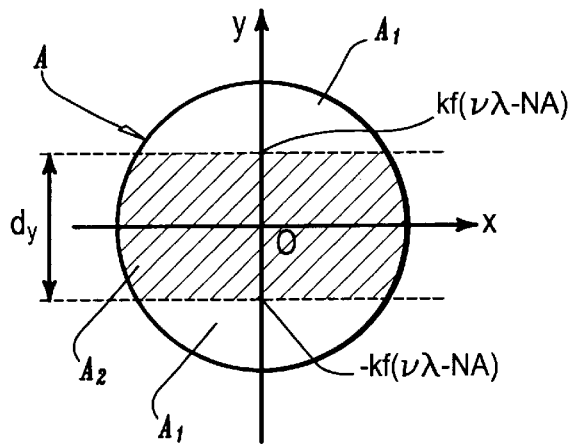
FIG. 20B is a front view showing a divided reflective light in the sixth embodiment of the present invention.
Figure 20C:
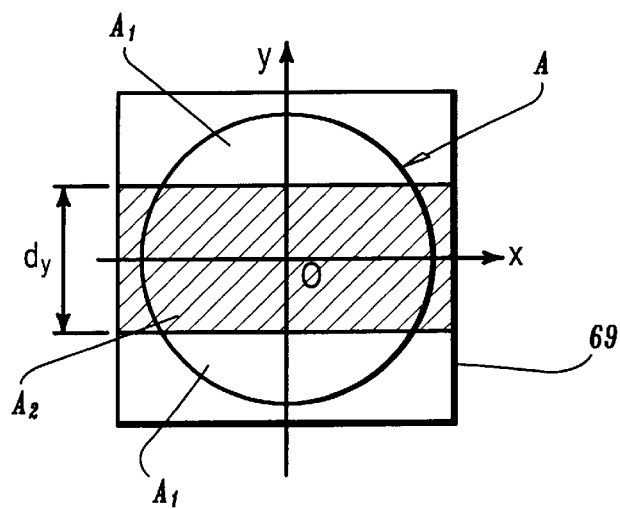
FIG. 20C is a front view showing a reflected light on the light receiving face when it is shaded in the sixth embodiment of the present invention.

FIG. 20B shows the reflected light shaded by the shading member. In this case, a luminous flux of an area $A_1$ divided in the track direction y from the reflected light A. FIG. 20C shows a light receiving element 69 receiving the luminous flux of an area $A_1$ divided from the reflected light A.

In order to provide the shading member, an hatched portion of the light receiving element 69 may be made as a non-sensitive band, which is not sensitive to the light. Alternatively, the hatched portion may be masked. Also, a non-transparent member (not shown) may be provided between the beam splitter 60 and the light receiving element 69.

Hereinafter, a shading width of the central portion of the reflective light A by the band member is defined. The shading width of the central portion is determined by the following formulae in which the shading width in the track direction y is represented by $d_y$, as shown in FIG. 22B, a distance from a light axis of the reflected light A to an end of a first-order light 68b is represented by a, a distance from the optical axis of the angular aperture a to the end of the first-order light 68a is represented by b, a focal length of the objective lens 56 is represented by f and a numerical aperture of the objective lens 56 is represented by NA.

$$b = f \cdot \sin(\alpha)$$
$$= f \cdot NA$$
$$c = f \cdot \sin(\theta)$$
$$= f \cdot v \cdot \lambda$$
$$a = c - b$$
$$= f \cdot (v\lambda - NA)$$

With reference to the above formulae, $d_y$ is defined as follows.

$$d_y = 2a = 2f \cdot (v\lambda - NA)$$

Figure 24:
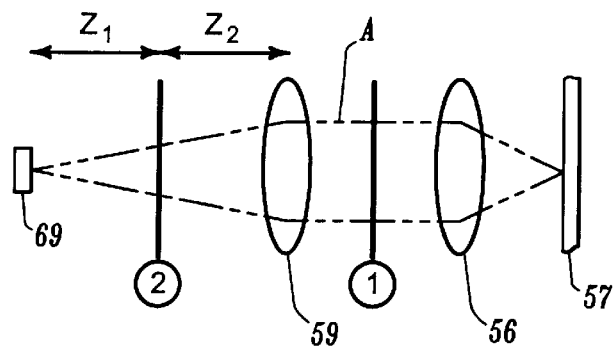
FIG. 24 is a schematic illustration showing a shading member in the light path.

The shading member having a shading width $d_y$ is arranged at one of the shading positions 1, 2, shown in FIG. 24. When the constant in proportion to the beam radius of the reflected light A at the positions 1, 2 is represented by k, a light path length from the shading position 2 to the light receiving element 69 is represented by $z_1$, a light path length from the shading position 2 to the detection lens 59 is represented by $z_2$, k is equal to 1 at the shading position 1. In this case, the beam radius is equal to the numerical aperture of the lens. At the shading position 2, k is expressed as follows.

$$k = z_1/(z_1+z_2)$$

When the origin is a light axis on the surface at a right angle to the light axis of the reflect light A, the shading area of the shading width $d_y$ is expressed as follows.

$$x^2+y^2 \leq (k \cdot f \cdot NA)^2$$
$$y \leq k \cdot f(v\lambda - NA)$$
$$y \geq -k \cdot f(v\lambda - NA)$$

The shading area corresponds to the hatched area shown in FIG. 20B.

For example, the shading width $d_y$ of the shading area is determined to be 1.02 (mm) when the parameters used in FIG. 23 are defined as follows.

$$v = 1.082 \times 10_6 (m^{-1})$$
$$(\text{period: } 0.924 \ \mu m)$$
$$\lambda = 680 \ (nm)$$
$$f = 2.73 \ (mm)$$
$$NA = 0.55$$

Figure 23A:
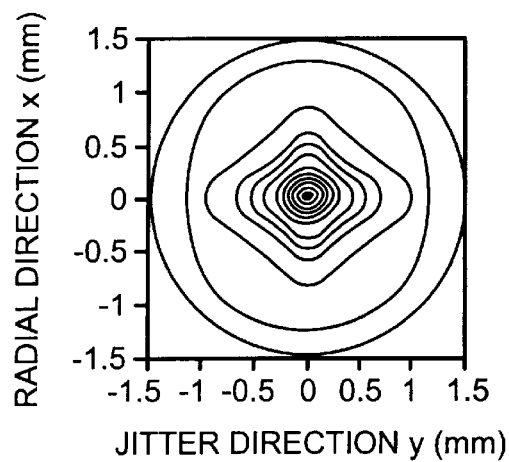
FIG. 23A is a schematic illustration showing a calculated light intensity distribution when the light spot is irradiated on the pit.
Figure 23B:
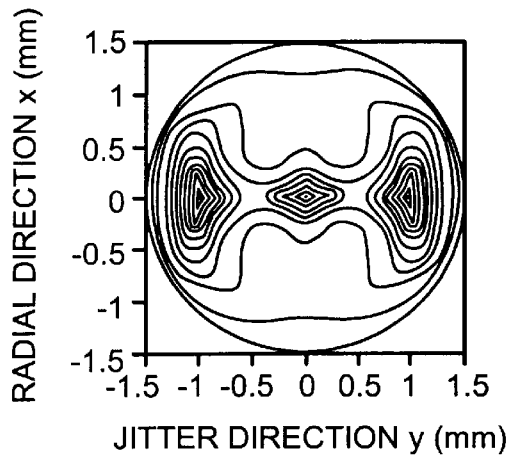
FIG. 23B is a schematic illustration showing a calculated light-intensity distribution when the light spot is irradiated between the pits.
Figure 23C:
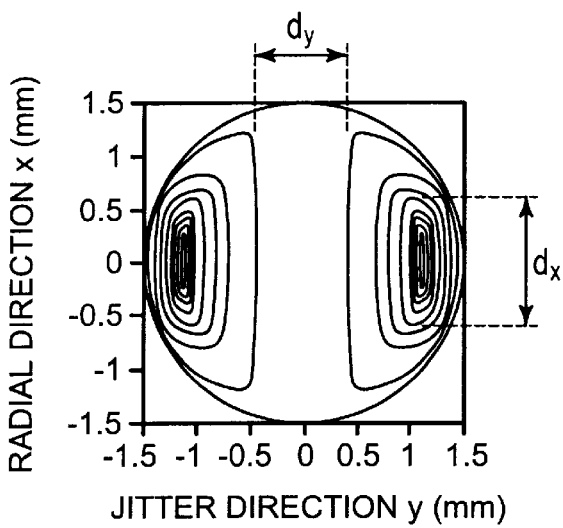
FIG. 23C is a schematic illustration showing a difference in the calculated light intensity distribution between the ones shown in FIGS. 23A and 4B.

In this case, $d_y$ corresponds to the width of the portion in which the signal shown in FIG. 23C is not changed. The shading width $d_y$ of the shading area $A_2$ is defined as follows.

Next, a luminous flux in the area $A_1$ divided in a track direction by the shading area $A_2$ having a shading width $d_y$ is formed.

The reflected light introduced to the signal detection optical system 58 is defined by the following formula in which f represents a focal length of the objective lens 56, NA represents a numerical aperture of the objective lens 56, $v$ represents a spacial frequency of the pit recorded on the optical disc, $\lambda$ represents a wavelength of the LD 51, k represents a constant in proportion to a beam radius of the reflected light, an origin is a light axis of the reflected light A on the face in which the optical axis of the reflected light A crosses at a right angle, the y-axis is parallel to the track direction, and the x-axis is parallel to the y-axis.

$$x^2+y^2 = (k \cdot f \cdot NA)^2$$

When the area defined by the following formulae are formed in the reflected light of the beam shape, a luminous flux of the area $A_1$ is formed (data signal reproducing means).

$$x^2+y^2 \leq (k \cdot f \cdot NA)^2$$
$$y \geq k \cdot f(v\lambda - NA)$$
$$y \leq -k \cdot f(v\lambda - NA)$$

A unhatched area of the reflected light A shown in FIG. 20B is the luminous flux of the $A_1$ area in the track direction, which is defined by the above formula. When the reflected light A is separated at a position ±k·f(νλ−NA) on the y-axis, a luminous flux in the area $A_2$ corresponding to the zero-order light 68a positioned in the central area is removed so that the luminous flux in two areas $A_1$ corresponding to the first-order light in both end portion is formed.

Figure 22A:
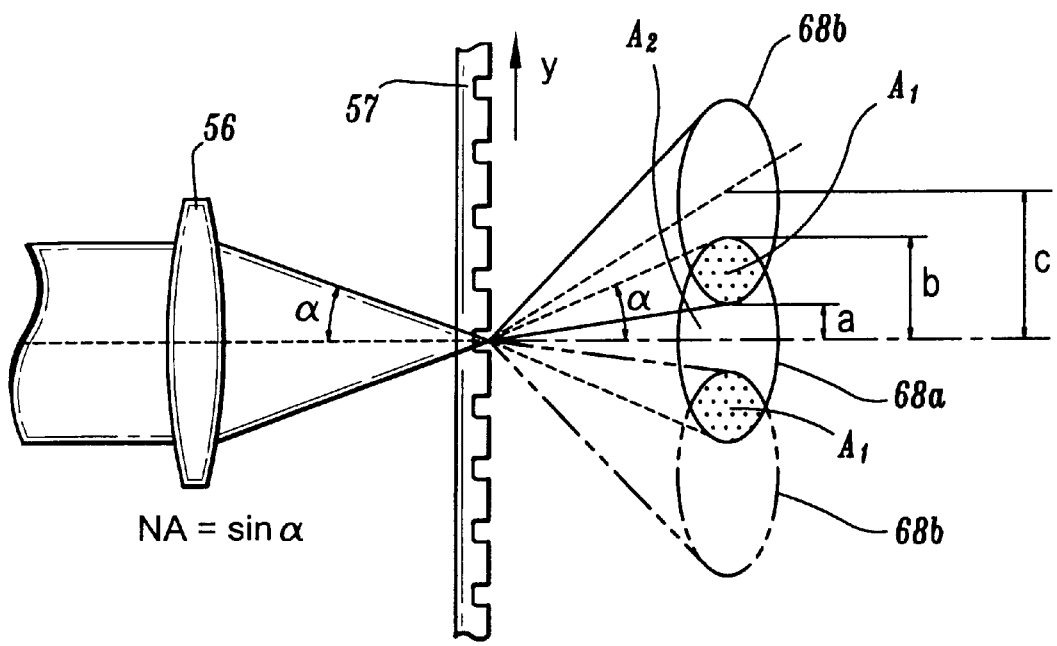
FIG. 22A is a schematic illustration showing a method for determining a shaded width of the shaded area.
Figure 22B:
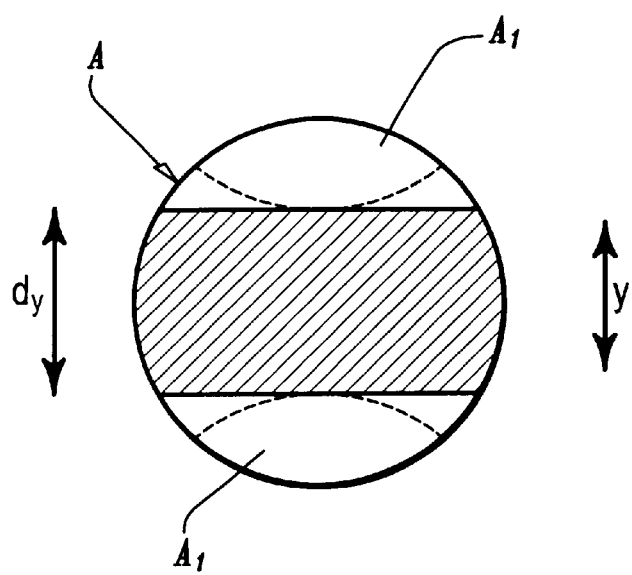
FIG. 22B is an enlarged front view showing a shaded area of the reflective light.

The light spot P focused on the optical disc 57 by an objective lens 56 is reflected and diffracted by to obtain the reflected light A (area A, $A_2$) including a zero-order light 68a and a first-order light 68b, as shown in FIG. 22. The diffraction angle θ is defined by the following formulae, in which ν represents a spacial frequency and λ represents a wavelength of the light spot.

$$\sin(\theta) = \nu\lambda$$

That is, when the optical disc 57 is a medium to high density and the overlapping area (area $A_1$) does not exist, a change in the light amount does not occur in the area $A_1$.

The reflective light A is shaded by a shading member having a shading width $d_y$ and a luminous flux of the area $A_1$ of both sides is received by the light receiving face of the light receiving element 69. The Rf signal which is recorded on the optical disc is obtained from the change in light amount received by the light receiving face of the light receiving element 69, which is a total light amount detected by the two areas $A_1$. When the light receiving element is divided into two parts a, b, the reproduced data signal Rf is defined by a following formula in which a represents a light receiving output corresponding to one of the areas $A_1$ in the track direction y, b represents a light receiving output corresponding to the other area $A_1$ in the track direction y.

$$Rf = a + b$$

According to the present embodiment, the signal is detected without reducing am amplitude of the signal while reducing only noise.

FIG. 23A shows a light intensity distribution of the reflected light A in the light receiving face of the light receiving element 69 when the light spot P is on the pit. The total light amount received is relatively low and a central portion is concentrated. FIG. 23B shows a light intensity distribution of the reflected light A in the light receiving face of the light receiving element 69 when the light spot P is between the pits. The light amount received is relatively high and the light appears at both ends in the jitter direction (track direction) y at a high concentration. FIG. 23C shows a difference between the light intensity distribution shown in FIG. 23C and that shown in FIG. 23B. The areas of both ends shown in FIG. 20B is an overlapping portion of the first-order light 68b and the zero-order light 68a, in which the change in light amount due to the diffraction of first-order light 68b clearly appears. On the other hand, the hatched portion $A_2$ is an area in which a change in light amount does not occur and which corresponds to the noise, since the first-order light and the interference thereof do not exist.

In the present embodiment, the shading area $A_2$ is provided in the reflected light A and the luminous flux in the area $A_1$ in the track direction y is detected by the light receiving element 69 to obtain the data signal Rf. Thus, the noise component (i.e. the noise of LD 51, the noise of the light receiving element 69, the noise of the optical disc) is reduced with the amplitude of the signal being maintained. Accordingly, the S/N ratio obtained from the shortest pit is improved and the signal detection accuracy to the recording medium of high density and resolving power can be improved.

When the shading member is provided in the light path of the reflected light A, the light receiving element 69 having an undivided light receiving face may be used. Thus, the light receiving element may be reduced in size, and the responding speed of the light receiving element 69 is improved. Also, the device may be produced economically since the signal reproducing system using a shading member may be provided by a simple circuit. Further, as the shading area $A_2$ of the shading width $d_y$ is provided by a non-sensitive band, which is not sensitive to light, the luminous fluxes which do not contribute to the signal component may be removed with a simple structure.

Next, referring to FIG. 25, the seventh embodiment of the present invention will be described. In the following description, the same features as those previously described will be denoted by the same reference numerals and the description thereof will be omitted.

Figure 25A:
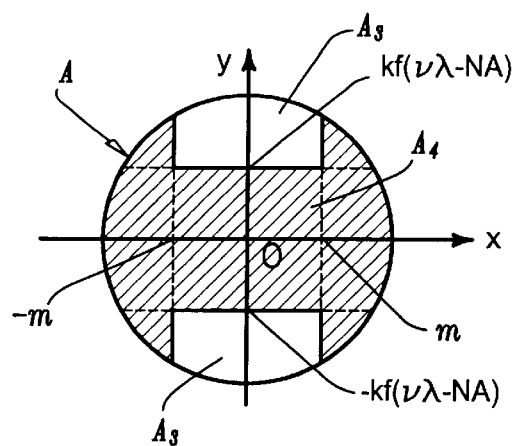
FIG. 25A is a front view showing a divided reflected light in a seventh embodiment of the present invention.

In this embodiment, the shading width of the shading area for shading the reflected light A is changed. As shown in FIG. 25A, the reflected light A is shaded by the shading area $A_4$, which is hatched. The shading area $A_4$ is provided by a non-sensitive band provided on the light receiving face of the light receiving element 69, a mask placed on the light receiving face or a shading member provided in the light path 69. The area defined by the following formulae in the reflected light A is specified to obtain the luminous flux in the area $A_3$ to be a signal component.

$$x^2 + y^2 \leq (k \cdot f \cdot NA)^2$$

$$y \geq k \cdot f(\nu\lambda - NA)$$

$$y \leq -k \cdot f(\nu\lambda - NA)$$

$$x \leq m$$

$$x \geq -m$$

$$0 \leq m \leq f \cdot NA$$

The luminous flux in the area $A_3$ is defined not only in a tracking direction y but also in the radial direction x (data signal reproducing means).

Figure 25B:
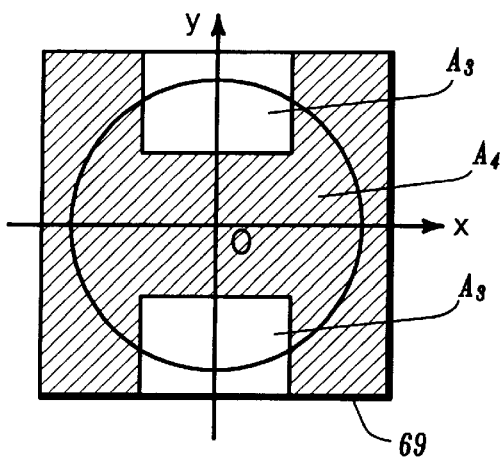
FIG. 25B is a front view showing a reflected light irradiated on the shaded light receiving surface.

The reflected light A is restricted not only in the track direction but also in the area $A_3$ in the radial direction x, as described above. As can be seen from the light intensity distribution shown in FIG. 23, the change in light amount corresponding to the pit end mainly occurs in the track direction y but not in the radial direction x. When variables such as ν, λ, f and NA are applied, a shading width $d_x$ in the radial direction x will be 1.2 mm. When the reflective light A is shaded by the shading width dy, dx, the luminous flux in the area $A_3$ for detecting data signals is detected by the light receiving element 69, as shown in FIG. 25B. Accordingly, the noise component can be reduced with the amplitude of the data signal being maintained.

Next, referring to FIGS. 26–29, an eighth embodiment of the present invention will be described. In the following description, the same features as those previously described will be denoted by the same reference numerals and the description thereof will be omitted.

Figure 26A:
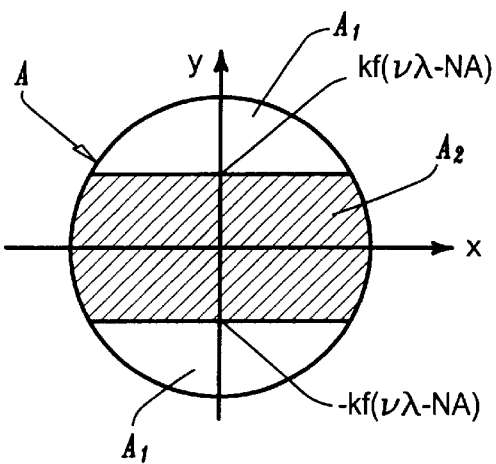
FIG. 26A is a front view showing a reflected light divided in a jitter direction in a eighth embodiment of the present invention.
Figure 27:
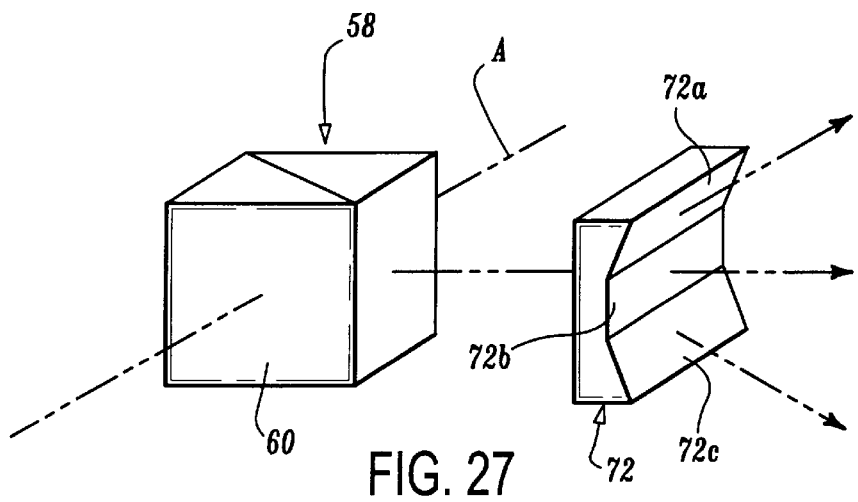
FIG. 27 is a perspective view showing a signal detecting optical means.

The prism 72 as luminous flux dividing means is provided in a light path reflected by the beam splitter 60, as shown in FIG. 27. FIG. 28A shows the prism 72. The prism 72 is divided into three areas 72a, 72b, 72c. Surfaces of the area 72a, 72b of both ends are inclined to the surface of the central area 72b. When the reflected light A is received by the prism 72 divided into three areas, the reflected light A is divided into three luminous fluxes 73a, 73b, 73c, as shown in FIG. 28B. In this case, the luminous flux 73b formed in the area 72b corresponds to the area $A_2$ shown in FIG. 26A. The luminous flux corresponding to the area $A_2$ is defined by following formulae.

$$x^2+y^2 \leq (k \cdot f \cdot NA)^2$$

$$y \leq k \cdot f(v\lambda - NA)$$

$$y \geq -k \cdot f(v\lambda - NA)$$

The luminous flux 73b of the area $A_2$ separated by the above formulae includes a track data, which appears in a radial direction x. When the luminous flux is introduced to the light receiving face divided into two areas, the track error signal Te can be detected. Also, the focus signal Fe can be detected based on the luminous flux 73b of the track error signal. A method for detecting a servo signal will be described later. The data signal Rf is determined as a summing signal of the luminous fluxes 73a, 73c.

FIG. 29A shows a variation of the luminous flux dividing means in which the prism 52 is replaced by a hologram 74. The hologram 74 is divided into three area 74a, 74b, 74c in a track direction y. In both end areas 74a, 74c, the holograms are provided. In the central area 74b, the prism is provided. When the reflected light A is received by the hologram 74, the light is divided into three luminous fluxes 75a, 75b, 75c. The servo signal and the data signal Rf can be detected by using a luminous fluxes 75b corresponding to the area $A_2$ shown in FIG. 26A. By using the hologram 74, a device suitable for mass production can be provided economically, as described above.

Figure 26B:
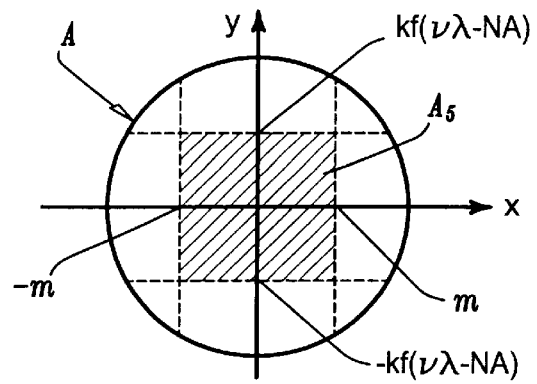
FIG. 26B is a front view showing a reflected light divided in a jitter direction and a radial direction in the eight embodiment of the present invention.

In this embodiment, the prism 72 or the hologram 74 is divided into three areas, and the servo signal is detected by the luminous fluxes 73b, 75b, corresponding to the area $A_2$ shown in FIG. 26. However, the present invention is not limited to the above. For example, the prism 72 or the hologram 74 may be divided into a plurality of parts and the luminous flux corresponding to the area $A_5$ shown in FIG. 26B may be formed. For example, the luminous flux corresponding to the area $A_5$ may be defined by following formulae.

$$x^2+y^2 \leq (k \cdot f \cdot NA)^2$$

$$y \leq k \cdot f(v\lambda - NA)$$

$$y \geq -k \cdot f(v\lambda - NA)$$

$$x \leq m$$

$$x \geq -m$$

$$0 \leq m \leq f \cdot NA$$

The servo signal may be detected with high sensitivity.

Next, referring to FIGS. 30–35, a ninth embodiment of the present invention will be described. In the following description, the same features as those previously described will be denoted by the same reference numerals and the description thereof will be omitted.

Figure 30:
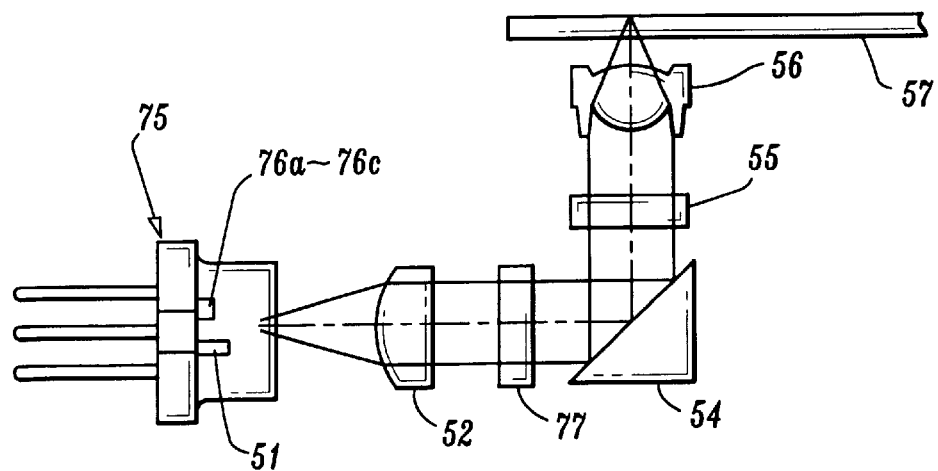
FIG. 30 is a schematic illustration showing an optical pick-up device of a ninth embodiment of the present invention.
Figure 31:
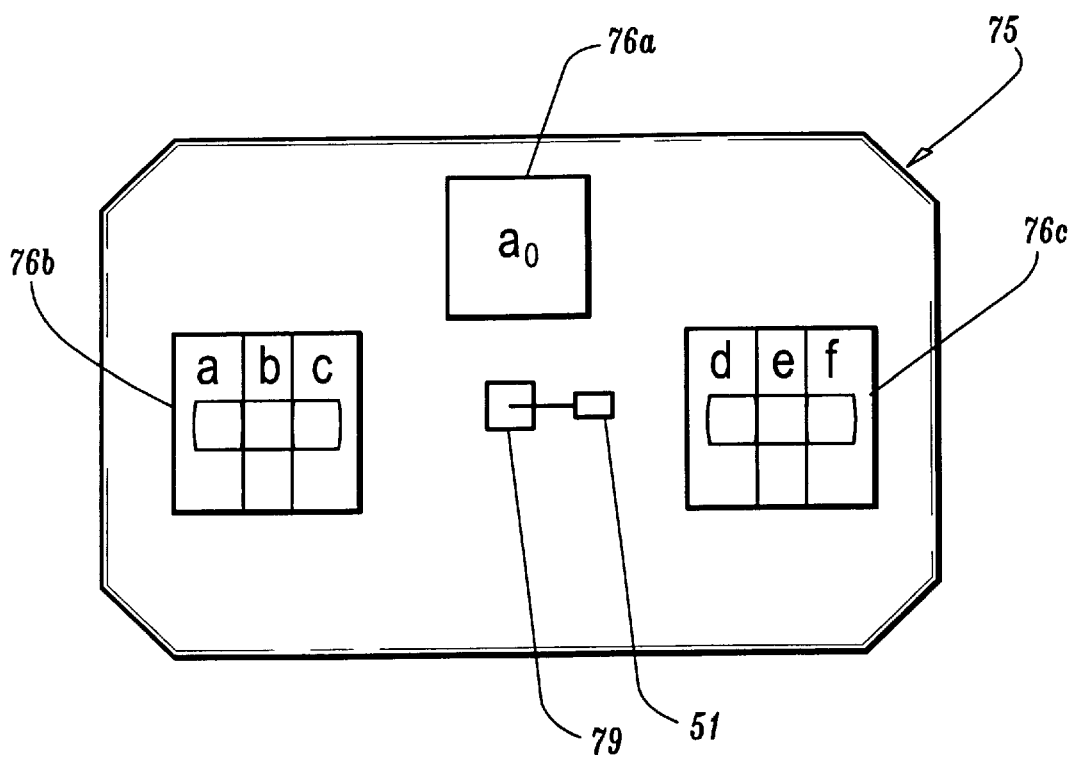
FIG. 31 is a front view showing a LD-PD unit.
Figure 32:
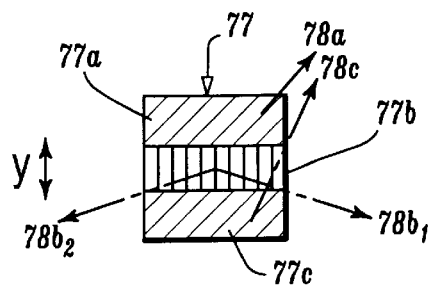
FIG. 32 is a front view showing a deflected separating hologram.

FIG. 31 is a front view showing a LD-PD unit 75. In the middle of a substrate (i.e. silicone) in the LD-PD unit 75, a LD 51 is provided. Around the LD 51, light receiving elements 76a–76c are provided. The light receiving element 76a is provided on the non-divided light receiving face $a_0$. The light receiving element 76b is provided on a light receiving face divided into three parts a, b, c. The light receiving element 76c is provided on a light receiving face divided into three parts d, e, f. In the light path next to the LD-PD unit 75, a polarized light separation hologram 77 is provided, as shown in FIG. 30. The polarized light separation hologram 77 is divided into three areas 77a, 77b, 77c each of which has a different grating angle, as shown in FIG. 32. For example, the polarized light separation hologram 77 may have a polarized light separation function in which a S deflected light passes and a P deflected light is diffracted. On the light path between the polarized light separation hologram 77 and the optical disc 57, a quarter-wavelength plate 55 is provided.

In the reflected light A received by the polarized separation hologram 77, the luminous fluxes 78a, 78c separated by both end portions 77a, 77c are received by the light receiving element 76a. The luminous flux $78b_1$ (i.e. negative first-order light) separated by the central portions 77b is received by the light receiving element 76b. Another luminous flux $78b_2$ (i.e. positive first-order light) is received by the light receiving element 76c. The servo is detected by the luminous fluxes 78a, $78b_1$, $78b_2$, 78c separated by the areas 77a, 77b, 77c.

In the above structure, the light emitted from the LD 51 in the LD-PD unit 75 is reflected to the outside of the unit by a mirror 79. After the light passes through the collimating lens 52, the light is received by the polarized light separation hologram 77. After the light passes through the polarized light separation hologram 77, the light is reflected by the deflection prism 54. After the light passes through a quarter-wavelength plate 55, the light is focused on the optical disc 57 by the objective lens 56. The reflected light A from the optical disc 57 travels the same light path in an opposite direction. By the light passing through the quarter-wavelength plate 55, the light is converted to the linear polarized light whose deflection angle is 90° different from that of the emitting light. The luminous fluxes 78a–78c diffracted by the polarized light separation hologram 77 travels through a light path which is different from that of the emitted light, and is introduced to the light receiving elements 76a–76c in the LD-PD unit 75.

Figure 33:
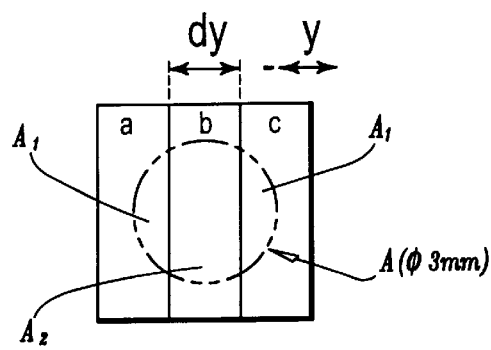
FIG. 33 is a front view showing a light receiving element having a light receiving face divided into three parts.
Figure 34:
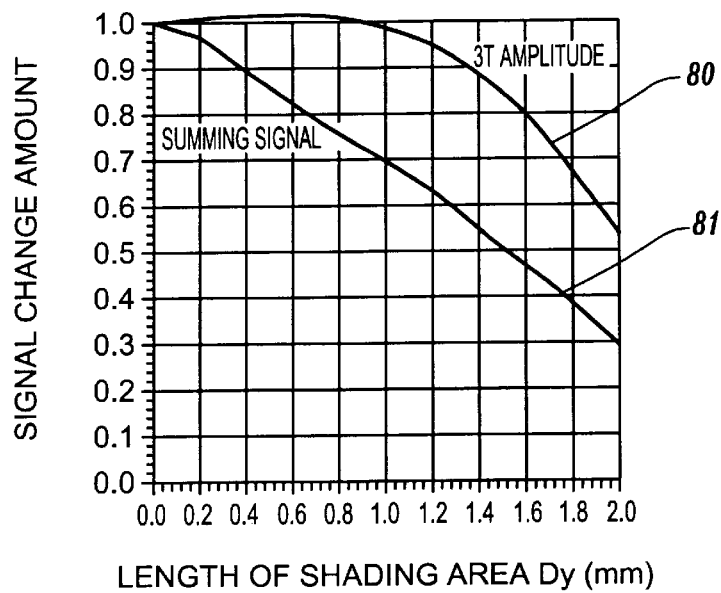
FIG. 34 is a graph showing a signal amplitude to the shaded width.

In FIGS. 33 and 34, among the light receiving faces a, b, c of the light receiving element, which are divided into three parts in the track direction y, the light receiving face b receives the area $A_2$ (Cf. FIG. 26A). FIG. 34 is a graph showing a change of the 3T signal and the summing signal, both of which are defined by the following formulae, to the length of the shading width $d_y$ when the light receiving face b is a shaded area b.

3T signal=$a+c$

Summing signal=$a+b+c$

When the shading width $d_y$ is the one calculated in the sixth embodiment, a light amount received by a light receiving face b reaches approximately 30% of the whole light amount. Therefore, the servo signal may be easily detected by using the luminous flux $A_2$ received by the light receiving face b.

The focus error signal Fe and the track error signal can be detected from the light receiving element 76b, 76c in which the luminous fluxes $78b_1$, $78b_2$, corresponding to the area $A_2$, are received. The data signal Rf is determined by the light receiving element 76a which receives the luminous fluxes 78a, 78c corresponding to the area $A_1$.

$$Fe=(a+c+e)-(b+d+f)$$

$$Te=(a-c) \text{ or } Te=(d-f)$$

$$Rf=a_0=78a+78c$$

In this case, the focus error signal Fe is determined by the beam size method. The primary amplifier of a data signal detection system may be provided in order to reduce the noise.

In this invention, the light is isolated by a quarter-wavelength plate 55 and the light to the optical disc 57 has the same direction as the reflected light from the optical disc 57 by a polarized light separation hologram 77. Therefore, the LD 51 and the light receiving elements 76a–76c are closely arranged. According to the invention, the number of parts can be reduced and the light utilization efficiency can be improved. That is, a small-sized, high performance optical pick-up device is provided.

Figure 35:
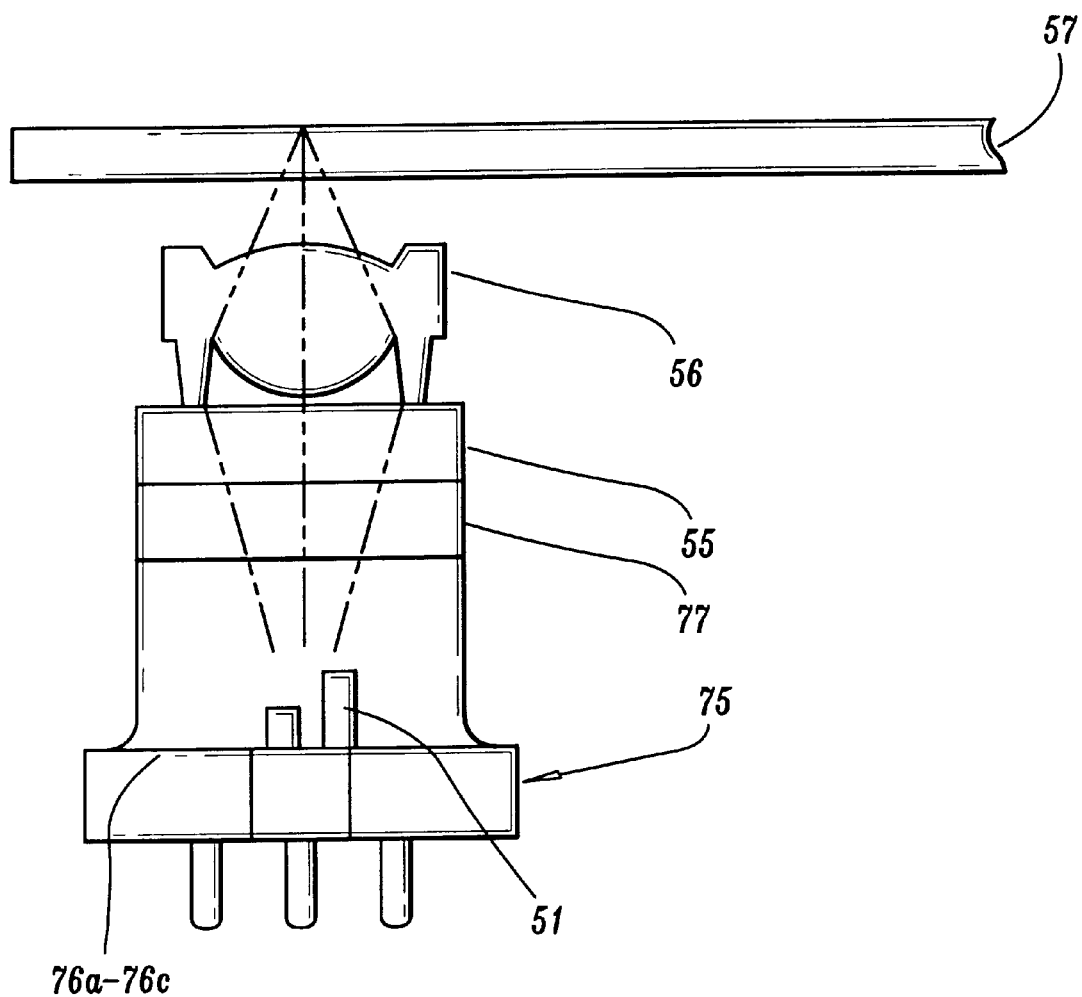
FIG. 35 is a schematic illustration showing an optical pick-up device.

In the device shown in FIG. 35, the collimating lens 52 and the deflection prism 54 is omitted and each element is assembled integrally. According to the device, the number of parts and the size thereof can be reduced.

The optical data recording medium having pits is not limited to a medium having recesses and projections in the peripheral portion, but includes an overwriting type CD or a phase-changing type disc in which peripheral portion and the reflective ratio is different.

Figure 36:
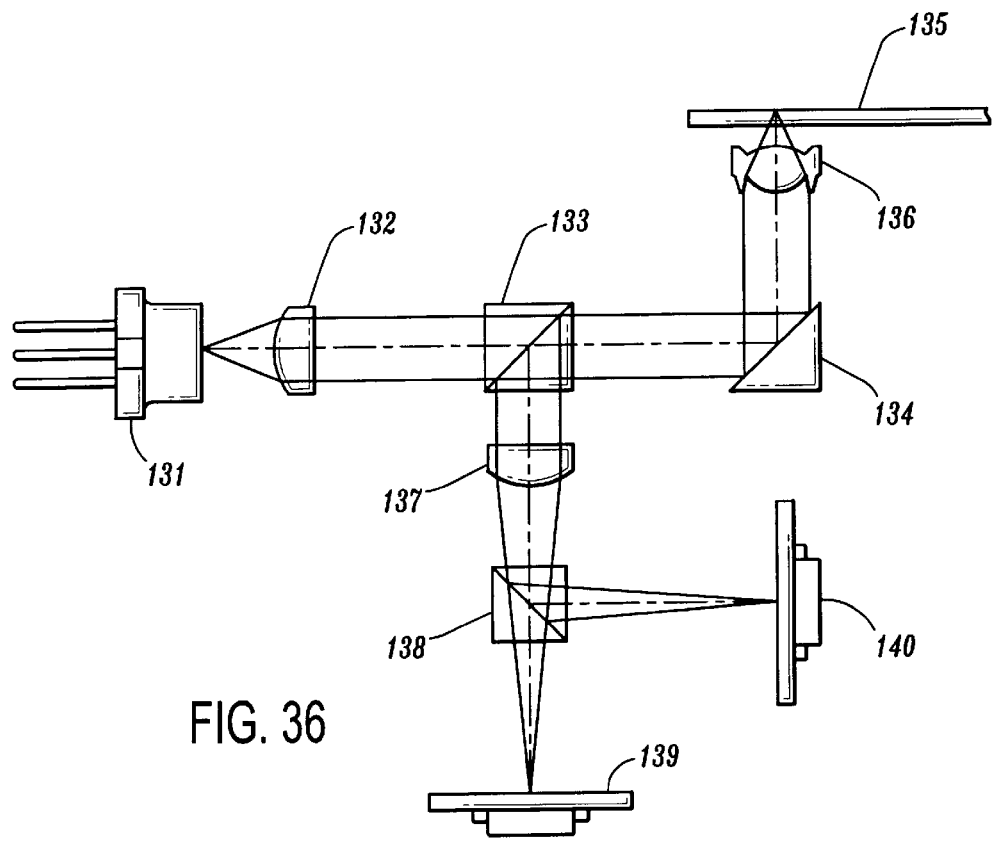
FIG. 36 is a schematic illustration showing a tenth embodiment of the present invention.

FIG. 36 shows a tenth embodiment of the present embodiment, which records, reproduces or deletes data in a recording medium. In this embodiment, a light emitted from a light source 131 is roughly parallelized by a collimating lens 132. After the parallel light passes through a beam splitter 133, the light is deflected toward a recording medium 135 by a deflection prism 134. The deflected light is focused on a recording face of the recording medium 135 of an optical disc by an objective lens 136. In the optical disc, a data truck is formed in a spiral shape or a concentric shape. The optical disc is turned by a spindle motor. The data is recorded as a pit formed on the data track in the recording medium 135 of the optical disc. After a luminous flux reflected by the recording face of the recording medium 135 is parallelized by the objective lens 136, the luminous flux is deflected by the deflection prism 134. After the deflected light is focused by a detection lens 137, a part of the deflected light is reflected by the beam splitter 138 and a remaining portion is transmitted by the beam splitter 138.

Figure 37:
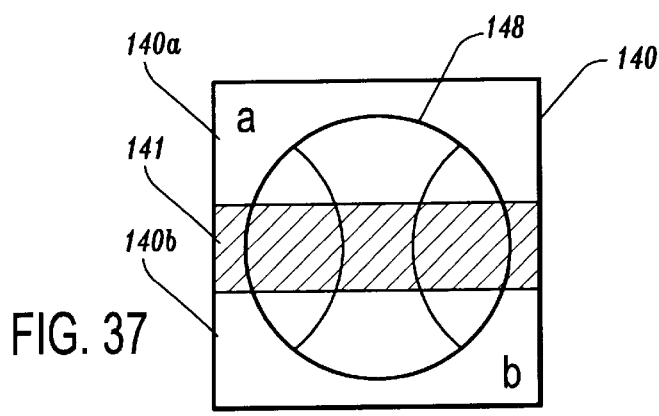
FIG. 37 is a plan view showing a light receiving element of the tenth embodiment of the present invention.

The transmitted light from the beam splitter 138 is focused on a light receiving element 139 to undergo a photoelectric conversion. While, the reflected light (detected light) from the beam splitter 138 is focused on a light receiving element 140 to undergo a photoelectrical conversion. The light receiving element 139 and an operational circuit (not shown) detect the focused light by a conventional manner such as an astigmatism method or a knife-edge method. The light receiving element 140 has, as shown in FIG. 37, a non-sensitive band 141 which is not sensitive to the detected light 148 in a central area. Also, the light receiving element 140 is divided in a jitter direction into two divided parts 140a, 140b. The non-sensitive band 141 of the light receiving element 140 is a shaded area having a mask placed on the light receiving element 140. Detected signals a, b from the divided parts 140a, 140b of the light receiving element 140 are added in an operational circuit (not shown) to obtain Rf signal according to a following formula.

$$Rf\ signal = a + b.$$

In the conventional optical pick-up device, when a diameter of a light spot on the recording medium determined based on NA of the objective lens and the wavelength of the laser light from the semiconductor laser device is constant and a recording density of the recording medium is high, an overlapping area of a zero-order light and a first-order light in a diffraction pattern of the pit is reduced. Therefore, a variation of an amplitude of a 3T signal is reduced due to the interference thereof. However, the overlapping area of the zero-order light and the first-order light of the diffraction pattern of the pit to the 11T signal is not so influenced by the recording density of the recording medium. Accordingly, when the recording density is high, the resolving power thereof is lowered.

In the tenth embodiment of the present invention, a central area of a detected light 148 is shaded by the non-sensitive band 141 and the light of a peripheral portion 148 is received by the light receiving element 140. Therefore, the noise included therein can be reduced without reducing the amplitude of the 3T signal. As a result, S/N ratio of the 3T signal and the resolving power thereof are improved.

Figure 38:
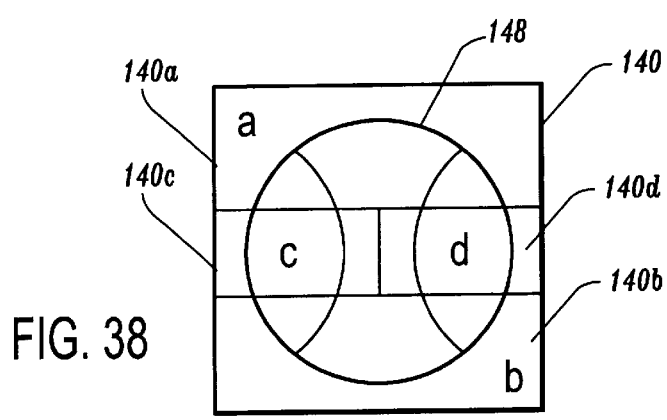
FIG. 38 is a plan view showing a light receiving element of a eleventh embodiment of the present invention.

FIG. 38 shows the light receiving element 140 of the eleventh embodiment of the present invention. In this embodiment, the light receiving element 140 is divided into four parts. The light receiving element 140 is divided into 3 parts in a jitter direction and a central divided part is divided into 2 parts in a radial direction. Detected signals a, b, c, d from the divided parts 140a, 140b, 140c, 140d are operated by an operational circuit (not shown) to obtain the Rf signal and a track signal Tr, according to following formulae.

$$Rf\ signal = a + b$$

$$Tr\ signal = c - d$$

Figure 39:
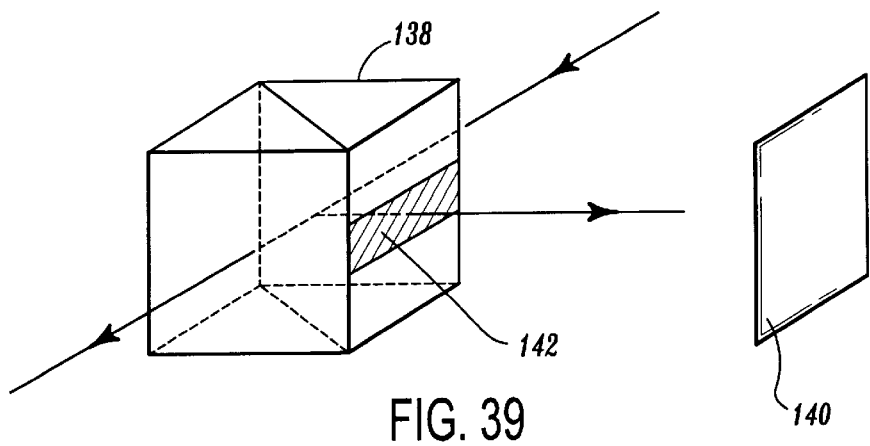
FIG. 39 is a perspective view showing a beam splitter of a twelfth embodiment.

FIG. 39 shows a twelfth embodiment of the present invention. In this embodiment, shading means is provided in a light path to prevent the detected light 148 from being introduced in the shielded area 141 of the light receiving element 140. The shading member includes the shaded area 142 provided in the beam splitter 138, which is made of a light absorbing layer or a non-transparent member.

In the optical pick-up device of the first, second and twelfth embodiment, the light receiving means 140, 142 are provided to detect a part of the reflected light divided in a data track direction from the recording medium 135. When a central luminous flux is blocked, S/N ratio of the amplitude of a 3T signal can be improved and the Rf signal can be detected with a high-resolution in response to the highly-integrated data. Also, compared to the super-resolution of the conventional light spot and the conventional medium, the structure thereof is amplified and a sever adjustment or a special medium is not required.

Also, since the central area of the detected light is shaded, the amplitude of the 11T signal is lowered to obtain a substantial waveform equalization effect. By this feature, a dynamic range of the recording and reproducing circuit, which is conventionally set not to saturate the 11T signal, can be enlarged. Also, the center level of the 3T signal advantageously approaches to the center level of the 11T signal. Thus, when the modulation code which is not DC-free is used, conventionally it was difficult to set the slice level when the two-value was set. However, the present embodiment improved this point.

FIGS. 51A and 51B show the 3T signal and the 11T signal. In this case, the detected light 148 from the beam splitter 138 to the light receiving element 140 is received by the divided parts 140a, 140b, 140c of the light receiving element shown in FIG. 52. The summing signal, a+b+c, is calculated based on the signals a, b, c from the divided parts 140a, 140b, 140c, 140d by the operational circuit. FIG. 51C and 51D show 3T signal and the 11T signal. In this case, the summing signal, a+c, is calculated based on the signals a, c from the divided parts 140a, 140c of the light receiving element 140. In FIGS. 51A–51D, solid lines are used when a short axis of an elliptical-shape light spot on the light receiving element 140 is in the jitter direction and dotted lines are used when a long axis of an elliptical light spot on the light receiving element 140 is in the jitter direction.

FIG. 53 shows a cross-talk, the signal p—p and the noise p—p when the short axis of the elliptical light spot of the detected light 148 on the light receiving element 140 is in the jitter direction. 3T/11T is 0.365 when the light is received by a part of the surface, as shown in FIGS. 51C and 51D. 3T/11T is 1.463 when the light is received by the whole surface, as shown in FIGS. 51A and 51B. FIG. 54 shows the cross-talk, the signal and the noise when the long axis of the elliptical light spot of the detected light 148 on the light receiving element 140 is in the jitter direction. 3T/11T is 0.215 when the light is received by a part of the surface, as shown in FIGS. 51C and 51D. 3T/11T is 1.298 when the light is received by the whole surface, as shown in FIGS. 51A and 51B. The cross-talk is calculated as 20 log (noise/signal). In this case, the signal is the one read from the 11T bit recorded on (n) track of the recording medium 135. The noise is the one read from the (n+1) track adjacent to the n track of the recording medium 135. When either the short axis or long axis of the elliptical light spot of the detected light 148 is in the jitter direction, the influence to the stroke is lower in the partial light receiving than in the whole light receiving. When the light is received by the part of the surface, the waveform equalization can be observed as a result of a calculation.

Figure 40:
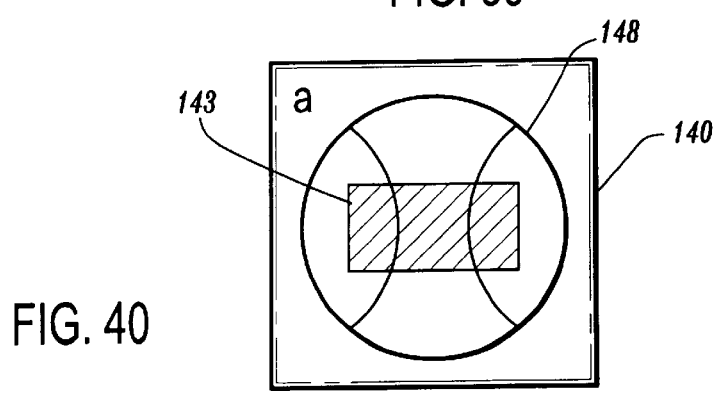
FIG. 40 is a plan view showing a light receiving element of a thirteenth embodiment of the present invention.

FIG. 40 shows a light receiving element 140 of a thirteenth embodiment of the present invention. In this embodiment, the light receiving element has a shading area 143 of a square shape in the center. In this light receiving element 140, a peripheral portion is a light receiving area for receiving the Rf signal, which receives the reflected light from the beam splitter 138. An upper part and an lower part of the light receiving area of the light receiving element 140 receive the reflected light 148 from the beam splitter 138. The detected signals a, b from the upper part and the lower part is summed to obtain the Rf signal based on a following formula.

Rf signal=a+b

Figure 41:
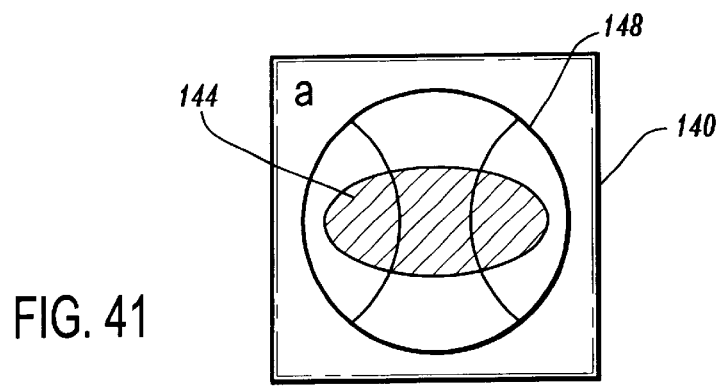
FIG. 41 is a plan view showing a light receiving element of a fourteenth embodiment of the present invention.

FIG. 41 shows the light receiving element 140 of a fourteenth embodiment of the present invention. In this embodiment, the light receiving element 140 has a shading area 144 of an elliptic shape.

Figure 42:
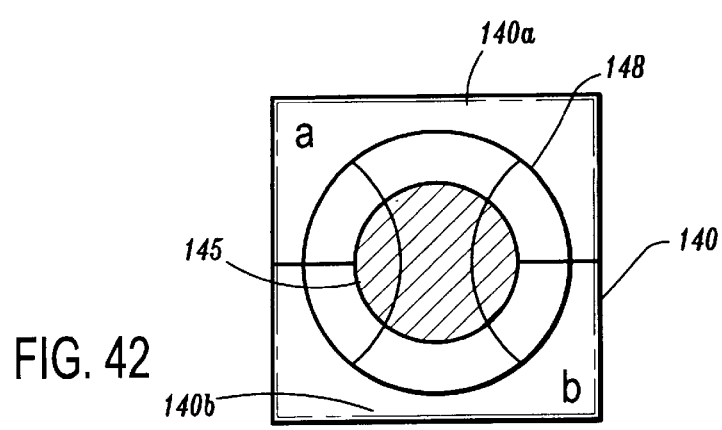
FIG. 42 is a plan view showing a light receiving element of a fifteenth embodiment of the present invention.

FIG. 42 shows a light receiving element in a fifteenth embodiment of the present invention. In this embodiment of the present invention, the light receiving element 140 has a shading area of a circular shape in the center and a peripheral portion which is divided into two parts in a jitter direction. The detected signals a, b from divided parts 140a, 140b of the light receiving element 140 are operated by an operational circuit (not shown) to obtain Rf signal and a monitor signal based on following formulae.

Rf signal=a+

Monitor signal=c−d

When the adjustment is conducted, the reflected light 148 from the beam splitter 138 is adjusted by the adjusting mechanism based on the monitor signal so as to be divided into two by a dividing line of the light receiving element 140 in the jitter direction.

The shading areas 143–145 of the light receiving element 140 may have different shapes. In the thirteenth, fourteenth and fifteenth embodiment of the present invention, since the light receiving means 140 is provided to detect the luminous flux in the periphery of the reflected light 148 from the recording medium, the resolving power can be much improved, compared to the tenth, the eleventh and the twelfth embodiment. Also, theoretically, it becomes stronger against the stroke.

Figure 50:
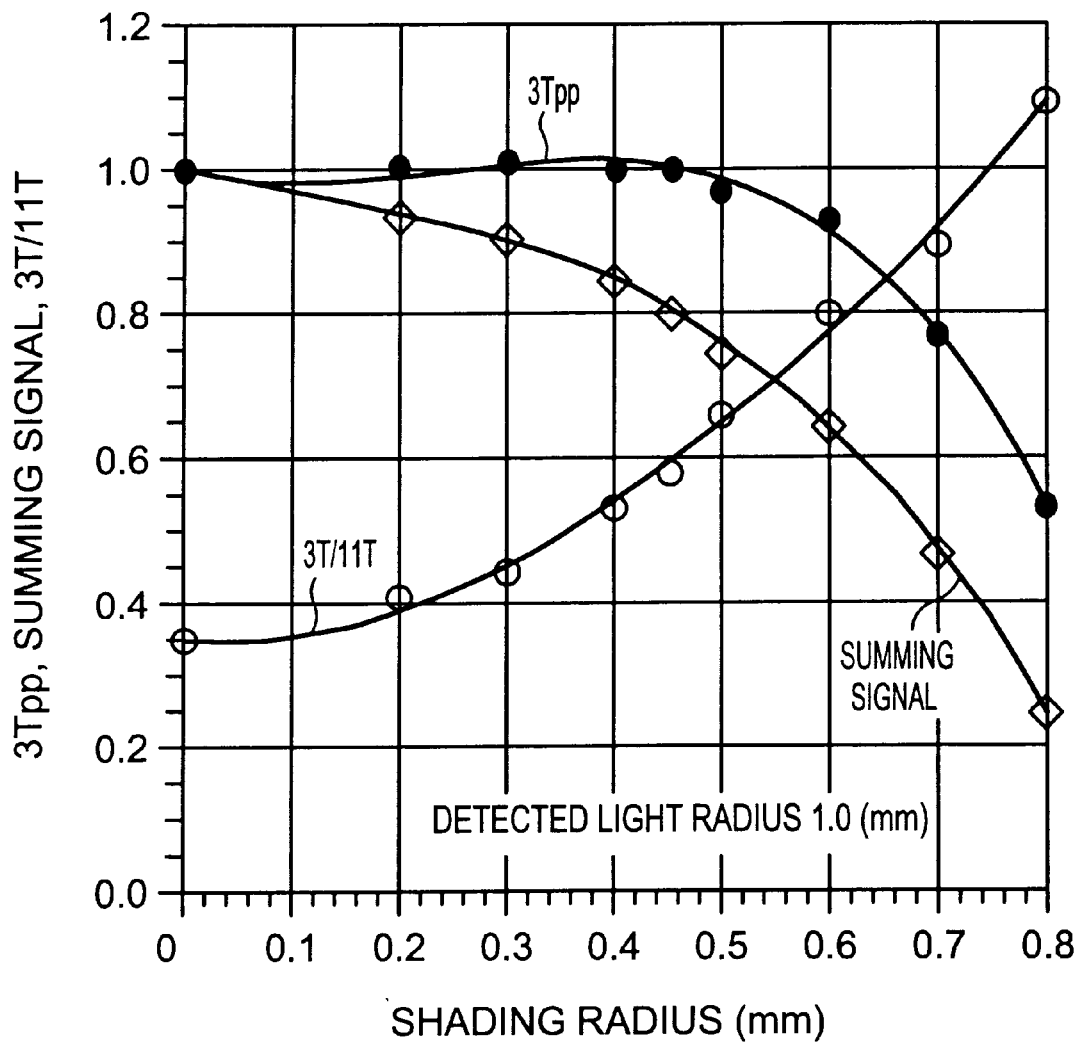
FIG. 50 is a graph showing an amplitude of a 3T signal, a summing signal and a 3T/11T signal in the fifteenth embodiment.

FIG. 50 shows a variation of the amplitude of the 3T signal (3 Tpp), summing signal (a+b) and 3T/11T in the fifteenth embodiment. In this case, the detected light 148 of 1 mm in radius from the beam splitter 138 to the light receiving element 140 is shaded concentrically by the shading area 145. The peripheral portion of the detected light 148 is received by the light receiving element 140. In this example, the amplitude of the 3T signal is not reduced until the shading radius of the shading area gets to 0.45 mm. When the shading radius of the shading area 145 is 0.45 mm, 20% of the summing signal is reduced. Since the noise is in proportion of the light amount, when the noise is reduced and the amplitude of the signal is constant, the S/N ratio of the signal is improved to the extent of the reduced amount of the summing signal.

The present invention may be influenced by various noises. However, the noises based on the light include a noise based on the semiconductor laser device 131 (LD noise), a noise based on the light receiving element 140 (PD noise) and a noise based on the recording medium 135 (medium noise). Relationships between these noises and a light amount of the added signal, which is represented by $I_{CD}$ are expressed by following formulae.

LD noise $I_{DC}$

PD noise $\sqrt{I_{DC}}$ medium noise $I_{DC}$

When LD noise=medium noise>>PD noise, a noise reduction effect is calculated by the following formula when the radius of the shading area is 0.45 mm.

20 $\log_{10}$ {$\sqrt{(0.8^2+0.8^2)}/\sqrt{2}$}=−1.94 (dB)

This is relatively a large amount of the noise reduction effect.

Figure 43:
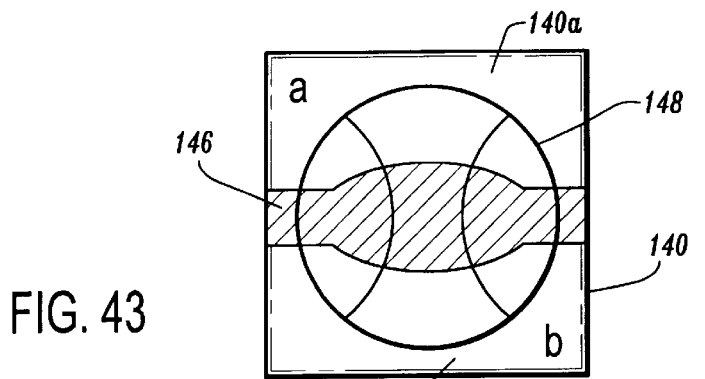
FIG. 43 is a plan view showing a light receiving element of a sixteenth embodiment of the present invention.

FIG. 43 shows a light receiving element 140 in a sixteenth embodiment. In the sixteenth embodiment, the light receiving element 140 is divided into two parts in the jitter direction. The central portion thereof in the jitter direction is a shading area 146. In the light receiving element 140, the light receiving area is limited to peripheral portions 140a, 140b and a center of an elliptic portion and the peripheral portion of the radial direction are non-sensitive portions 146 which is not sensitive to the detected light 148.

Figure 44:
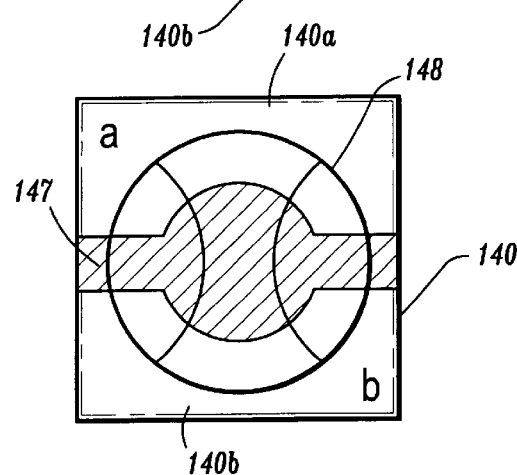
FIG. 44 is a plan view showing a light receiving element of a seventeenth embodiment of the present invention.

FIG. 44 shows a light receiving element 140 of an seventeenth embodiment of the present invention. In this embodiment, the light receiving element 140 is divided into two parts in the jitter direction. The central portion of circular shape and peripheral portion of the radial direction is a non-sensitive band 147 which is not sensitive to the light.

Figure 45:
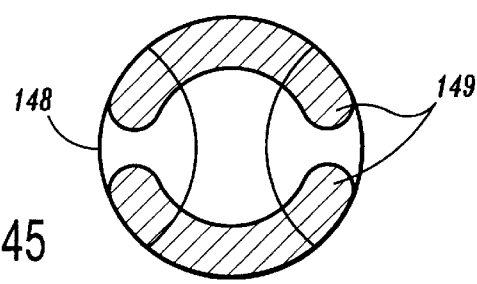
FIG. 45 is a sectional view showing a detected luminous flux in the seventeenth embodiment of the present invention.

In FIG. 45, a part of the light receiving element in which the 3T signal component appears is hatched. At both ends in the radial direction, the 3T signal does not appear. Thus, in the sixteenth and the seventeenth embodiment, the resolving power can be improved and the deterioration of the amplitude of the shortest 3T signal can be prevented.

In the seventh and the seventeenth embodiments of the present invention, since the optical pick-up device has the light receiving means 140 to detect only the periphery light of the reflected light 148 from the recording medium, the amount of light detected is reduced and the noise-reduction effect is improved. This is because the 3T signal appears in the peripheral portion of the detected light 148 in the jitter direction, as shown in FIG. 45. Thus, when the peripheral portion of the detected light 148 in the jitter direction is shaded, the amplitude of the 3T signal is not reduced, but the noise is reduced in response to the shading of light in the periphery of the detected light 148 in a radial direction. In the thirteenth, the fourteenth and the fifteenth embodiments of the present invention, the light receiving means 140, 142 receive a light of a peripheral portion of the detected light 148 in the jitter direction.

In the present invention, the recording medium in which data is recorded as a phase pit may be used. The tenth through seventeenth embodiments of the present invention utilize a variation of the light amount (light distribution) based on the phase-contrast of the reflected light between the pit portion and the non-pit portion of the recording medium 135. When the pit of the recording medium 135 is highly integrated (the pit length is shorter), an analytic angle of the analytic light becomes wider and the interference territory between the zero-order light and the one-order light moves to the zero-order side. Since the interference territory is a signal territory, the signal of a short pit can be detected efficiently by a detection of the light amount of the interference territory. This means that the amplitude based on the pit against the total amount of light of detected Rf signal is large, but the amplitude itself is not amplified dramatically. By the total decreased amount of the detected Rf signal, the light noise is decreased proportionally but the amplitude itself is not decreased. Consequently, S/N ratio of the pit signal is improved. Therefore, though the longer pit decreases more of the amplitude, the long pit is not influenced since the long pit has a large amplitude. On the contrary, the difference in the amplitude from a short pit and in the center level is reduced. Accordingly, in the high-density recording medium, a high resolution power is provided.

FIG. 55 shows ab eighteenth embodiment of the present invention. In this embodiment, dividing means for dividing the detected light 148 in the jitter direction is provided between the beam splitter 138 and the light receiving element 140. The dividing means shades a central portion of the detected light 148 with a shading band. This dividing means has an aperture member to shade the central portion of the detected light by the shading band 152 provided in the central portion of the aperture 151 through which the detected light 148 of the beam splitter 138 passes, as shown in FIG. 56. The light receiving element 140 receives the detected light 148 from the beam splitter 138 through the aperture 151 of the aperture member 150 at an upper portion and a lower portion. The Rf signal is calculated based on the detected signals a, b of the upper and the lower parts of the light receiving element 140, according to the following formula.

$$Rf\ \text{signal} = a + b$$

The light receiving element may be either a non-divided light receiving element or a light receiving element divided into two parts in the jitter direction.

The eighteenth embodiment of the present invention has a dividing means 150 for dividing the reflected light 148 from the recording medium 135 into a plurality of portions in a far field in the jitter direction. The reflected light divided by the dividing means 150 is received by the light receiving means 140. Therefore, the detected light 148 is received by the light receiving means at a small area adjacent to a focussing point. Also, the light receiving means 140 can be reduced in size and the band area can be enlarged. That is, according to the present invention, data can be read at a high resolving power at a high speed.

FIGS. 57A and 57B show dividing means in a nineteenth embodiment of the present invention. In the nineteenth embodiment, a prism is used as the dividing means in order to divide the detected light 148 from the beam splitter 138 into an upper part A, a central part and a lower part B. Also, two light receiving elements are provided in order to receive the upper part A and the lower part of the reflected light. The detected light 148 from the beam splitter 138 is divided into an upper part A, a central part and a lower part B in the jitter direction by the prism 150. The upper part A and the lower part B are received by a light receiving element 140. The detected signals a, b, each of which corresponds to the upper part A and the lower part B, are summed in the operational circuit to obtain a Rf signal, according to the following formula.

$$Rf\ \text{signal} = a + b$$

In the nineteenth embodiment of the present invention, since the dividing means is the prism 150, the light receiving means can be reduced in size and the receiving band can be enlarged. Also, the separative direction of the detected light can be set relatively freely, a flexibility of the design of the device, such as a position of the light receiving means, can be improved.

FIGS. 58A and 58B show an twentieth embodiment of the present invention. In the twentieth embodiment, a hologram is used as a dividing means in order to divide the detected light 148 into an upper part A, a central part and a lower part B in jitter direction. The detected light 148 from the beam splitter 138 is divided into the upper part A, the central part and the lower part B in the jitter direction. The upper part A and the lower part B is received by the light receiving element 140. The Rf signal is calculated based on the detected signal a, b of the upper and the lower part of the light receiving element 140, according to the following formula.

$$Rf\ \text{signal} = a + b$$

In the eleventh twentieth of the present invention, since the dividing means is a hologram, the same effect as that of nineteenth embodiment can be obtained. Also, since the hologram is suitable for a mass-production, the production cost for the device can be reduced. The hologram 150 of a single-plate structure can perform a similar function to a prism of a complex shape. The dividing means 150 can form the shape of the shading band which shades the central part of the detected light. The dividing means 150 can be provided independently or attached to the beam splitter 138 or formed integrally.

Figure 60A:
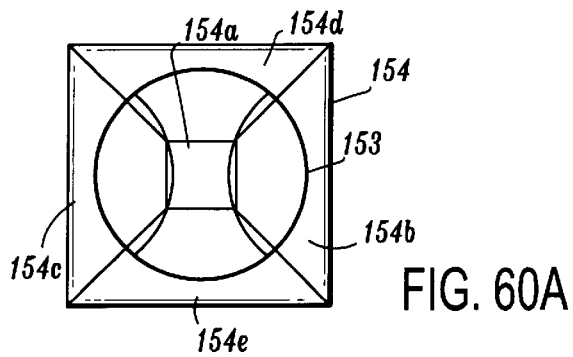
FIG. 60A is a is a plan view showing a prism of the twenty-second embodiment of the present invention.
Figure 60B:
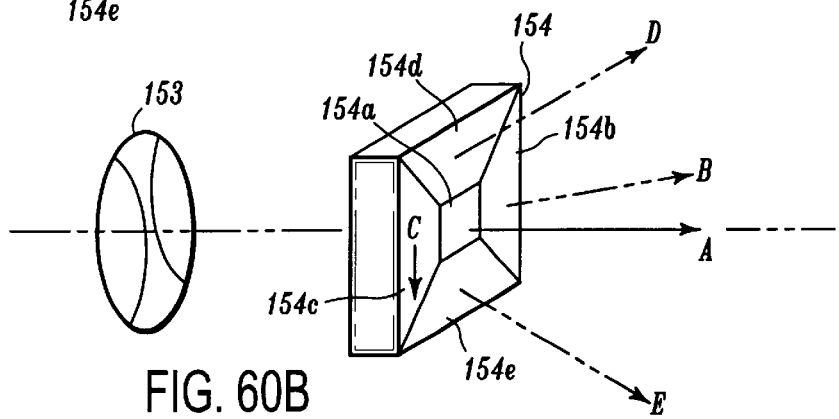
FIG. 60B is a perspective view showing a prism of the twenty-first embodiment of the present invention.

FIG. 59 shows a twenty-first embodiment of the present invention. In this embodiment, the beam splitter 138 in the tenth and the twentieth embodiment of the present invention is replaced by a prism 154. The prism has five luminous flux separation territories 154a–154d for dividing the detected light 153 from the detection lens 137 into a central portion A, a right portion B, a left portion C, an upper portion D and a lower portion E, as shown in FIG. 60A and 60B. Also, the light receiving element 139, 140 of the above embodiment is replaced by light receiving means 158 having a three-divided light receiving element 155 for receiving a luminous flux A from the prism 154, light receiving elements 156, 157 for receiving luminous fluxes B, C from the prism 154 and light receiving elements (not shown) for receiving luminous fluxes D, E from the prism 154.

The detected light 153 from the detection lens 137 is divided into a central portion A, a right portion B, a left portion C, an upper portion D and a lower portion E by the prism 154. The central part A is received by a three-divided light receiving element 155 and detected signals from each of the divided parts of the three-divided light receiving element 155 are operated by a beam size method in an operational circuit (not shown) to obtain the focus signal. This operation is conducted in a manner that a sum of the detected signal from the both side divided parts of the three-divided light receiving element 155 is reduced by the detected signal from the central part of the three-divided light receiving element 155. The luminous fluxes B, C from the prism 154 are received by the light receiving elements 156, 157. The difference between the light receiving elements 156, 157 is operated by an operational circuit to obtain a track signal. Further, the luminous fluxes D, E are received by the light receiving elements (not shown) arranged in the data track direction. The summing signals from the light receiving element are operated by the operational circuit to obtain the Rf signal.

Figure 61:
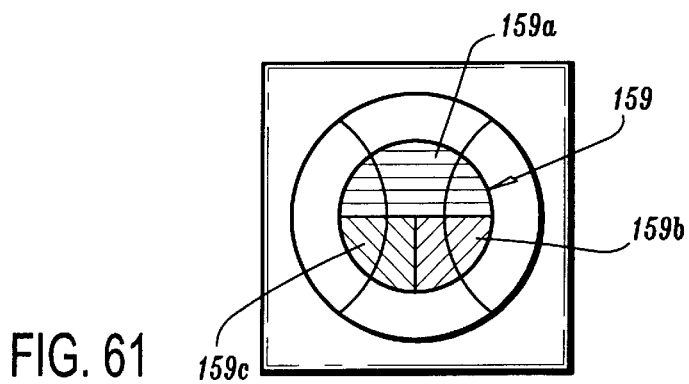
FIG. 61 is a plan view showing a part of a twenty-second embodiment of the present invention.

FIG. 61 shows a twenty-second embodiment of the present invention. In this embodiment, the prism 154 in the twenty-first embodiment is replaced by a hologram 159 having three luminous flux dividing territories 159a–159c. The detected light 153 is diffracted and divided into an upper part A, a right lower part B and a left lower part C, all of which are adjacent to the central part, by the three luminous flux dividing territories 159a–159c. The detected light 153 is diffracted and divided into the upper part A, the right lower part B and the left lower part C by the three luminous flux dividing territories 159a–159c and is received by the light receiving means 158.

A light receiving means 158 (not shown) receives the upper part of the detected light 153 from the hologram 159 with the 2-divided light receiving element. The difference between the detected signals from the divided parts of the two-divided light receiving element is operated by the knife-edge-method to obtain a focus single. Also, the light receiving means 158 receives a right lower part B and a left lower part C of the detected light from the hologram 159, both of which are adjacent to the central part of the detected light. The difference between the signals from the light receiving element is operated by an operational circuit (not shown) to obtain the track signal. Further, a peripheral portion D of the detected light 153 from the detection lens 137 is directly received by the light receiving element not via the hologram 159 and the detected signal from the light receiving element is identified to the Rf signal.

In the twenty-first and twenty-second embodiments of the present invention, the luminous flux dividing territories 154a–154c, 159a–159c for obtaining the focus signal and the track signal used for the control of the light spot on the recording medium 135 are provided in the dividing means. Therefore, the device can be reduced in size and in production cost. Also, the dividing means may have luminous flux separation territories to obtain a signal for controlling the power of the light spot on the recording medium 135.

Figure 62:
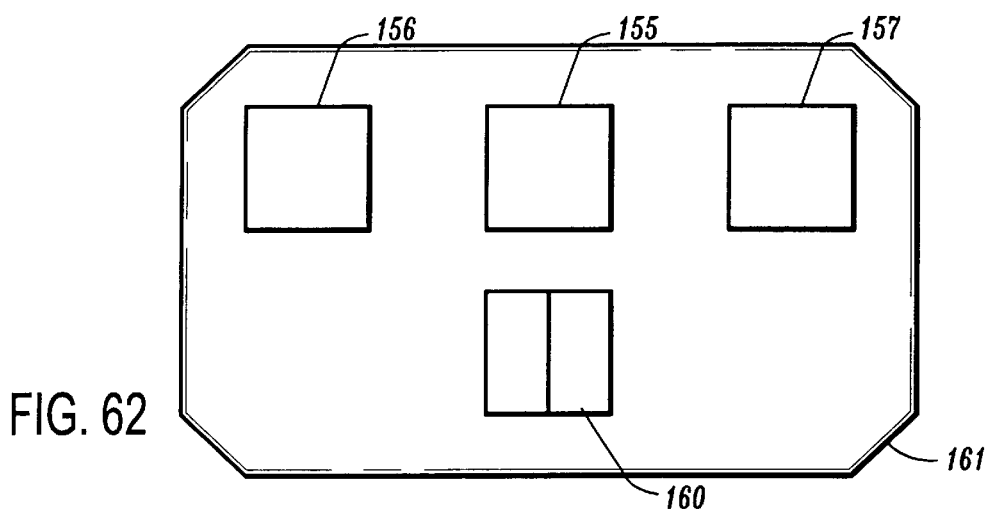
FIG. 62 is a plan view showing a twenty-third embodiment of the present invention.

FIG. 62 is a twenty-third embodiment of the present invention. In this embodiment, the light receiving elements 155–157, 160 (light receiving element 160 is a two-divided light receiving element which received the luminous flux from the luminous flux separation territory 159a of the hologram) are arranged on one substrate, for example, a silicone substrate 161. In order to reduce the noise, a primary amplifier which amplifies the Rf signal may be provided on the substrate 161.

In the twenty-third embodiment of the present invention, since the light receiving elements 15–157, 160 of the light receiving means 158 are arranged on the substrate 161, the number of parts, size and the production cost can be reduced. Also in the tenth through twentieth embodiments, the light receiving elements can be arranged on a single substrate.

Figure 63:
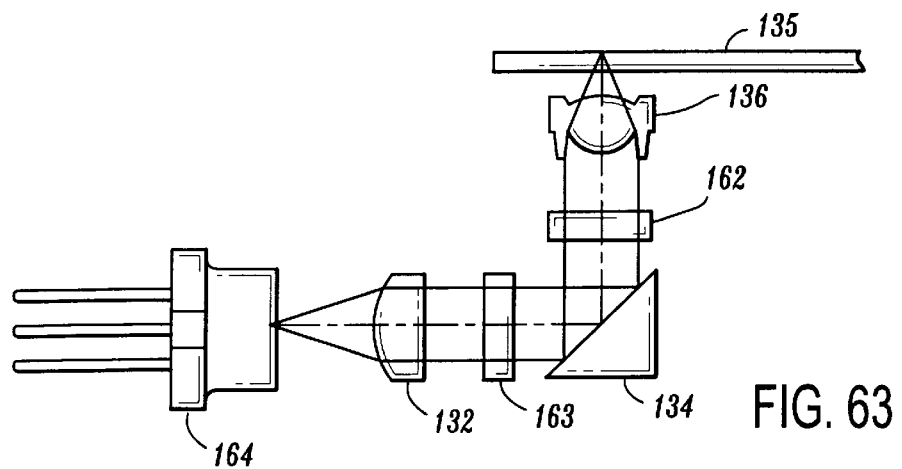
FIG. 63 is a schematic illustration showing a twenty-fourth embodiment of the present invention.
Figure 64:
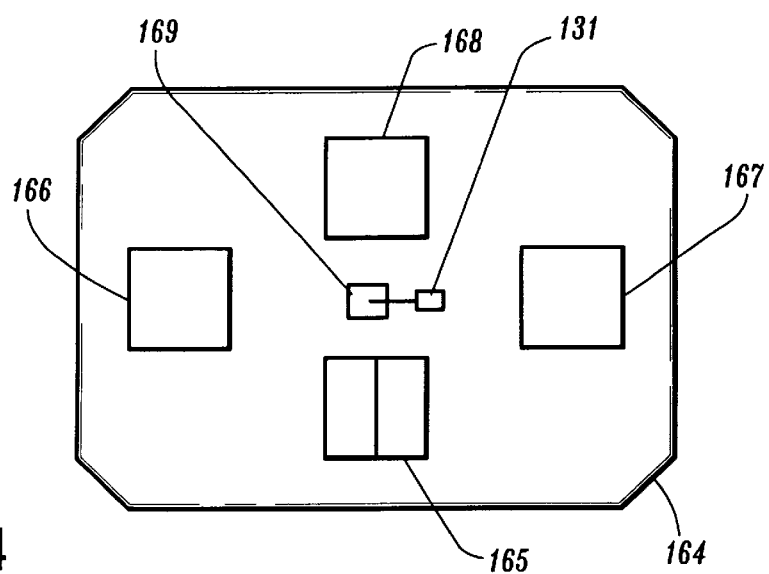
FIG. 64 is a is a plan view showing the twenty-fourth embodiment of the present invention.

FIGS. 63 and 64 show a twenty-fourth embodiment of the present invention, which is a non-order optical pick-up device. In the twenty-fourth embodiment of the present invention, a quarter-wavelength plate 162 is provided between the deflection prism 134 and the objective lens 136 to conduct an isolation. In this embodiment, the beam splitters 133, 138 and the detection lens 137 are omitted. A polarizing hologram, for example, a hologram 163 which diffracts P polarizing light and transmits S polarizing light, is provided between the collimating lens and the deflection prism 134. Also, the semiconductor laser 131 and the light receiving means 158 are provided in a single unit 164. By this feature, the light to the optical disc and the reflected light from the optical disc has the same light path.

That is, the emitted light emitted from the semiconductor laser 131 in the unit 164 passes through the mirror portion 169 and is parallelized by the collimating lens 132. The light passes through the polarizing hologram 163 and deflected by the deflection prism. After that, the light passes through a quarter-wavelength plate 162 and is focused on the recording surface of the recording medium 135 by the objective lens 136. The reflected light from the recording medium 135 is focused by the objective lens 136 and passes through the quarter-wavelength plate 162. Through these, the reflected light is converted to the linear polarizing light whose polarizing angles are 90° different from the luminous light to the recording medium 135. This light is diffracted by the polarizing hologram 163 and received by the light receiving means in the unit 164.

The light receiving means 158 has a two-divided light receiving element 165 for receiving an upper part A of the detected light 153 from the polarizing hologram 163 adjacent to the central part thereof, the light receiving element 166 for receiving a right lower portion B and a left lower portion C, both of which are adjacent to the central portion of the detected light 153 from the polarizing hologram 163, and the light receiving element 168 for receiving a periphery of the detected light from the polarizing hologram 163.

In the above embodiments except the twenty-second embodiment, the light source 131 and the light receiving element can be installed unitarily so that the luminous light to the optical disc has the same light path as that of the reflected light from the optical disc.

Figure 65:
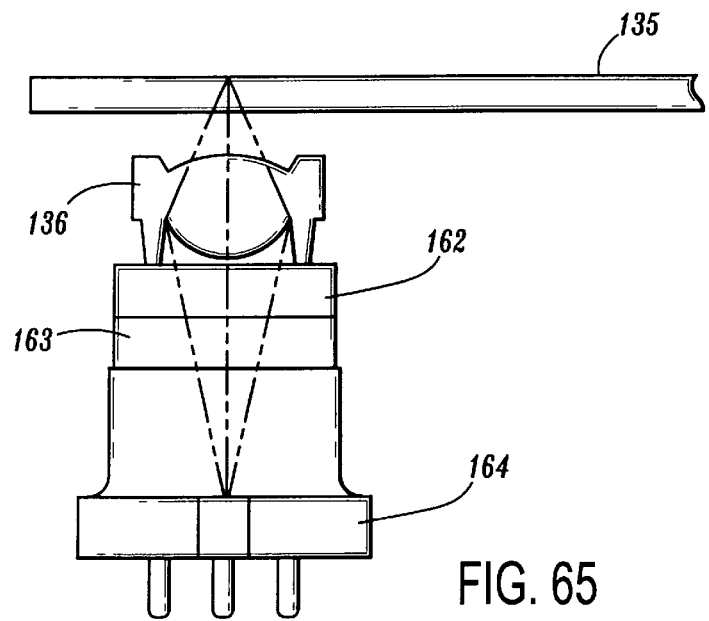
FIG. 65 is a schematic illustration showing a twenty-fifth embodiment of the present invention.

FIG. 65 shows a twenty-fifth embodiment of the present invention. The twenty-fifth embodiment of the present invention is a limited-order optical pick-up device, in which the collimating lens 132 and the deflection prism 134 of the above twenty-fourth embodiment are omitted. In the above embodiments except the twenty-second embodiment, the light source 131 and the light receiving element can be installed unitarily so that luminous light to the optical disc has the same light path as that of the reflected light from the optical disc.

In the fifteenth and twenty-fifth embodiments of the present invention, since the light source 131 and the light receiving element are installed unitarily, the device can be reduced in size.

Figure 46:
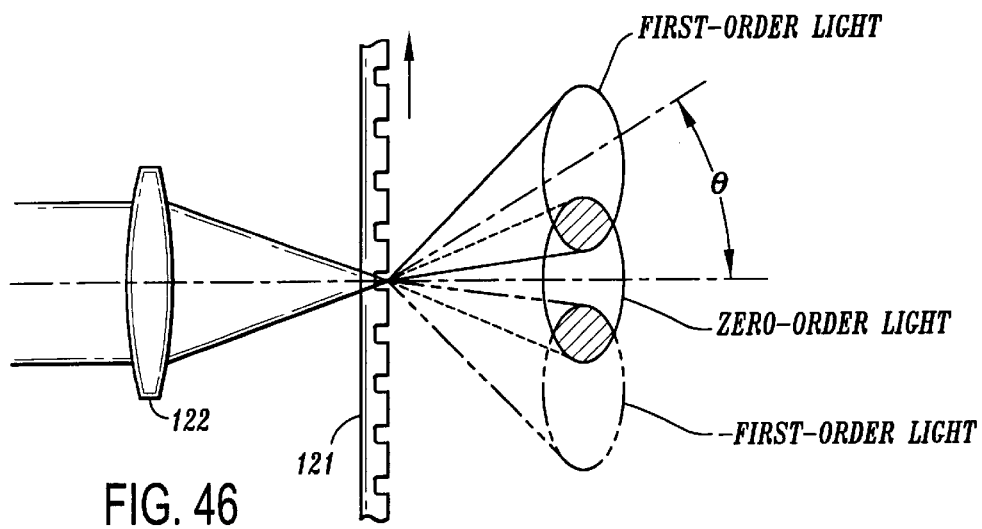
FIG. 46 is a schematic illustration showing a optical pick-up device.
Figure 47:
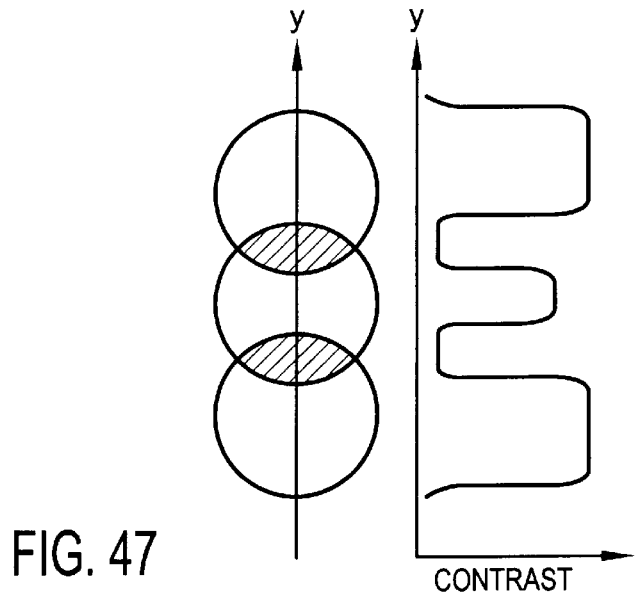
FIG. 47 is a schematic illustration showing a light intensity distribution on a light receiving element of the optical pick-up device.
Figure 48:
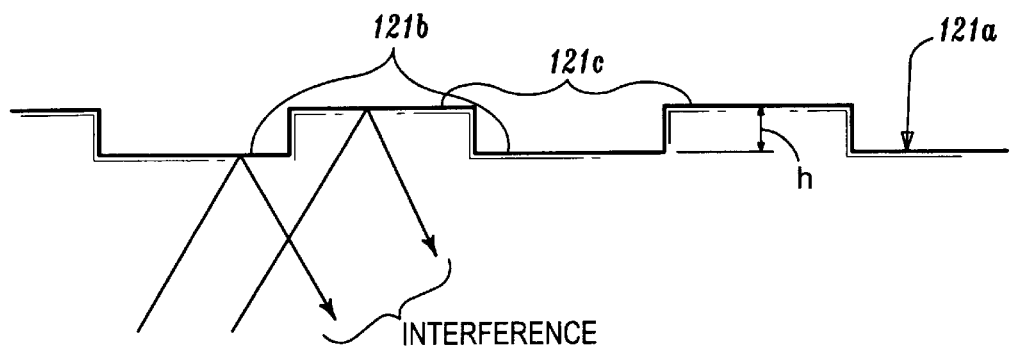
FIG. 48 is a schematic illustration showing an example of a recording medium.
Figure 49:
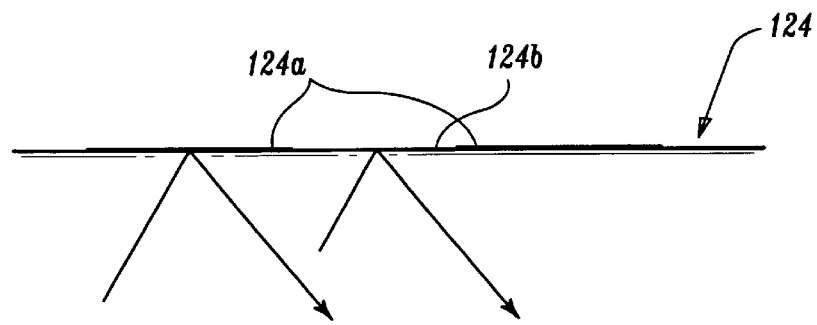
FIG. 49 is a schematic illustration showing another example of the recording medium.
Figure 66A:
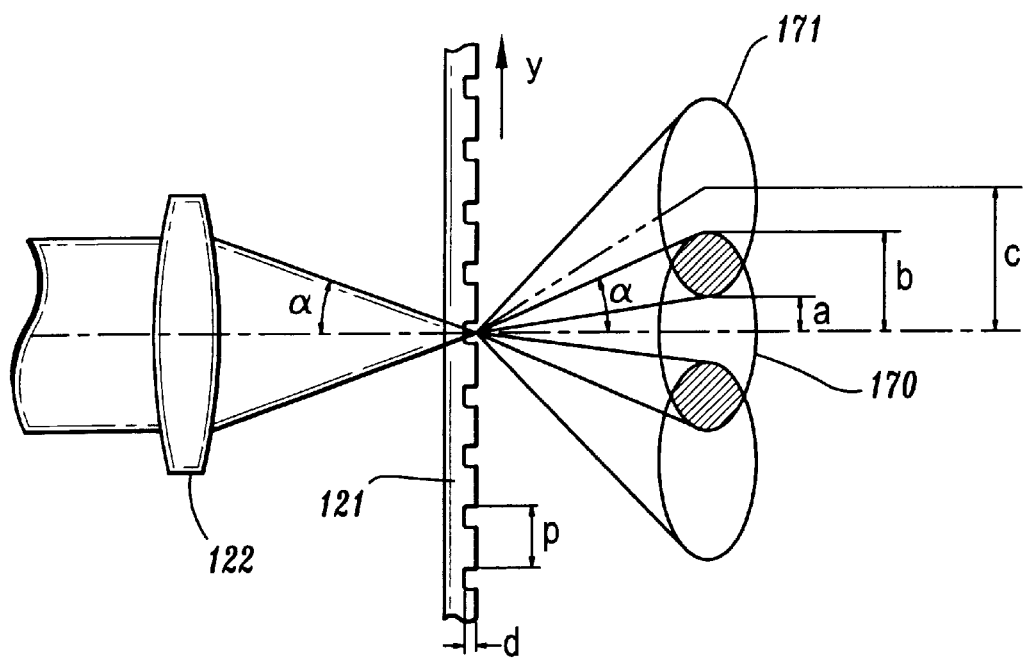
FIG. 66A is a schematic illustration showing a optical pick-up device.
Figure 66B:
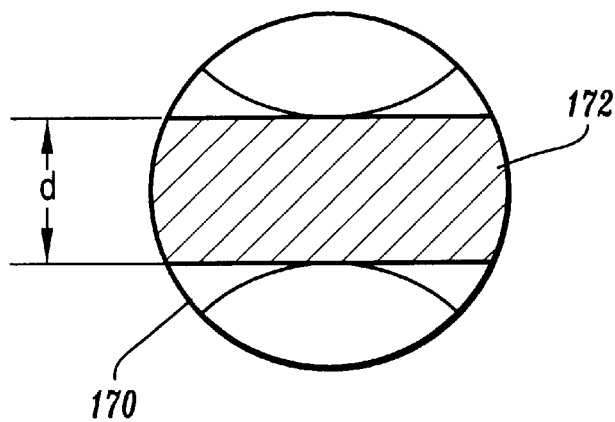
FIG. 66B is a schematic illustration showing a part of the optical pick-up device.

The luminous flux focused by the objective lens 122 is reflected and diffracted at a mark on the recording surface of the optical disc 121, as shown in FIG. 66A and 66B. The pit on the optical disc and the dot having different reflectivity from the mirror surface is referred to as the mark herein. The luminous flux from the objective lens 122 is reflected and diffracted on the optical disc 121 in the way as described in FIG. 46. However, in FIG. 66, the luminous flux from the objective lens 122 is drawn to transmit through the optical disc 121, for a better description of the invention.

The diffraction angle θ of the first-order light is expressed in the following formula, wherein the spacial frequency of the shortest mark (reciprocal of the period) is represented by ν and a wavelength of the light spot formed on the optical disc 121 by the luminous flux from the objective lens is represented by λ.

$$\sin(\theta) = \nu\lambda$$

When the zero-order light and the first-order light of the reflected and diffracted light are not overlapped, the signal is not generated, as described above. That is, the overlapping portion of the first-order light 171 and the zero-order light 170 is a signal component. FIG. 70 shows a light intensity distribution of the reflected light when the light spot is on the mark. FIG. 70 shows a light intensity distribution of the reflected light when the light spot is between the marks. FIG. 71 shows the difference between the data shown in FIG. 69 and the data shown in FIG. 70. That is, the bright portions in FIG. 71 are portions whose intensity is varied after passing the marks, which are portions where the signals of the reflected light of the optical disc exist. Therefore, if a band portion 172 of the central portion of the reflected light is shaded, the amplitude of the signal is not varied. On the contrary, when the reflected light is shaded, the total amount of the light received is reduced and the light noise is reduced.

A width d of the band portion 172 in the central portion where the reflected light is shaded is expressed by the following formula, wherein a focal length of the objective lens 122 is represented by f and a numerical aperture thereof is represented by NA.

$$d = 2f(\nu\lambda - NA)$$

When the aperture of the objective lens is represented by b and NA is sin (α), as shown in FIG. 66, the following formulae are presented.

$$b = f\sin(\alpha) = fNA$$

$$c = f\sin(\theta) = f\nu\lambda$$

$$a = c - b = f(\nu\lambda - NA)$$

$$d = 2a = f(\nu\lambda - NA)$$

Figure 67:
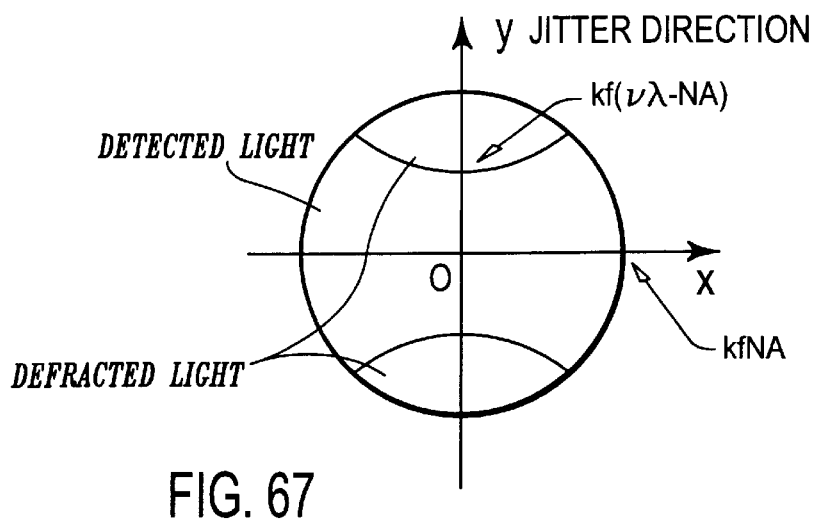
FIG. 67 is a schematic illustration showing a detected light of a twenty-sixth embodiment of the present invention.

The shaded portion from the reflected light is expressed in the following formulae, in which k represents a proportional constant, the center of the reflected light on the face crossing at a right angle to the optical axis of the reflected light is an origin, a data track direction on the recording face of the optical disc 121 is the y-axis, and an axis crossing to the right angle to the y-axis is the x-axis, as shown in FIG. 67.

$$x^2 + y^2 \geq (k \cdot f \cdot NA)^2$$

$$y \leq k \cdot f(\nu\lambda - NA)$$

$$y \geq -k \cdot f(\nu\lambda - NA)$$

In the above formulae, k represents a constant defining a diameter of the shaded portion 172, which is in proportion to the diameter of the luminous flux.

Figure 68:
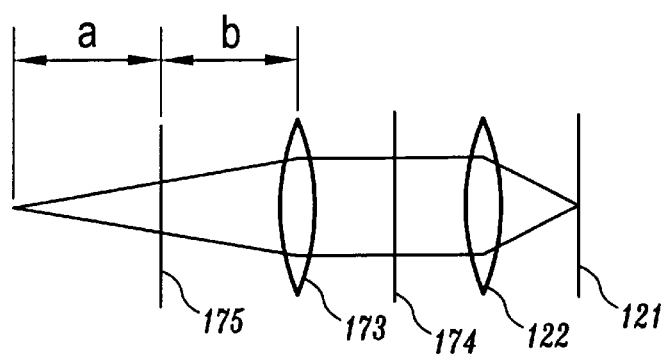
FIG. 68 is a schematic illustration showing a proportional constant of the twenty-sixth embodiment of the present invention.

When the shading band for obtaining the shading portion 172 by shading the reflected light from the optical disc 121 is located between the objective lens 122 and the focussing lens 173 and the reflected light is a parallel light, as shown in FIG. 68, k is equal to 1. In this case, a diameter of the luminous flux shaded by the shading band is equal to the diameter of the aperture of the objective lens 122. When the shading band is located between the focussing lens 173 for focusing the luminous flux from the objective lens 122 and the light receiving element for detecting data from the luminous flux from the focus lens 173, k is expressed in the following formula, wherein a represents a distance between the shading band and the light receiving element, and b represents a distance between the shading band and the focus lens 173.

$$k = a/(a+b)$$

Figure 69:
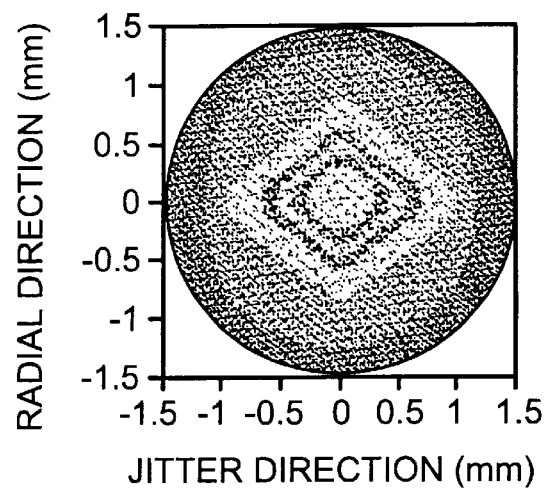
FIG. 69 is a schematic illustration showing a reflected light intensity distribution when a light spot is on a marking in the twenty-sixth embodiment of the present invention.
Figure 70:
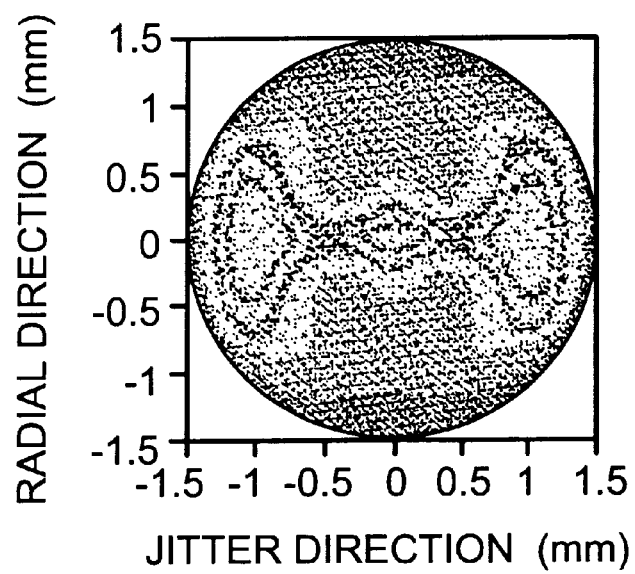
FIG. 70 is a schematic illustration showing a reflected light intensity distribution when a light spot is between the markings in the twenty-sixth embodiment of the present invention.
Figure 71:
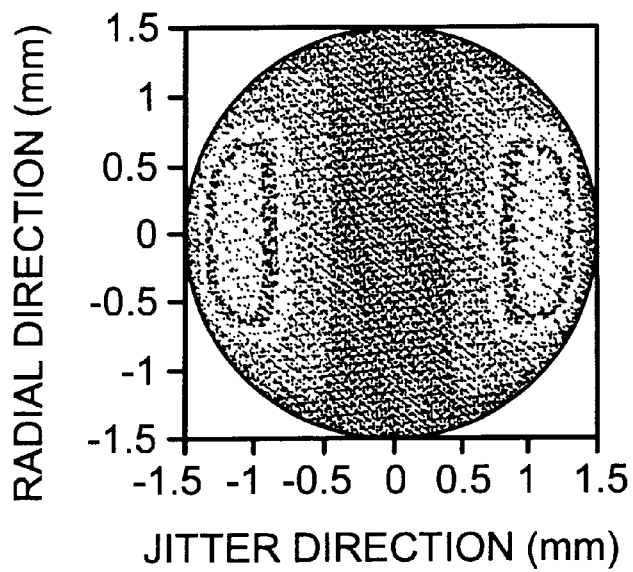
FIG. 71 is a schematic illustration showing a difference in the reflected light intensity distribution between FIGS. 69 and 70.

When following figures are put in the above formulae, the results shown in FIGS. 69–71 are obtained.

$$\nu = 1.082 \times 10^6 \text{ (reciprocal of m) } (0.924 \,\mu m \text{ in period})$$

$$\lambda = 680 \text{ (nm)}$$

$$f = 2.73 \text{ (mm)}$$

$$NA = 0.55$$

By the above calculation, d is obtained as follows.

$$d = 1.02 \text{ (mm)}$$

This correspond to a width of the portion in which the signal is not changed (black portion).

Figure 72:
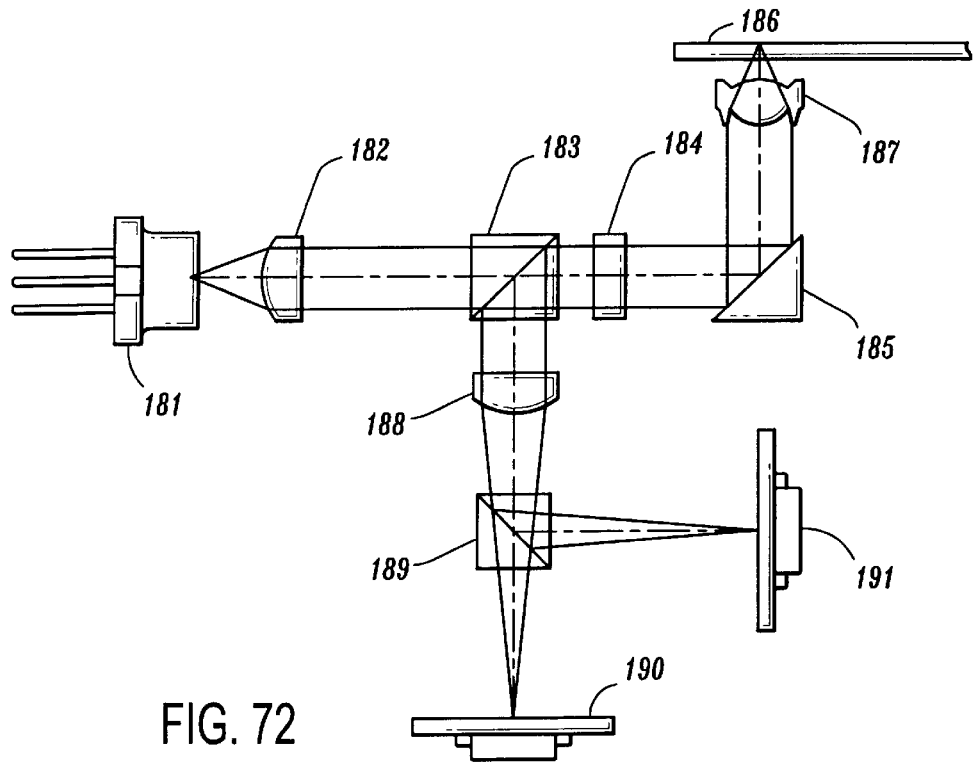
FIG. 72 is a schematic illustration showing the twenty-sixth embodiment of the present invention.
Figure 73:
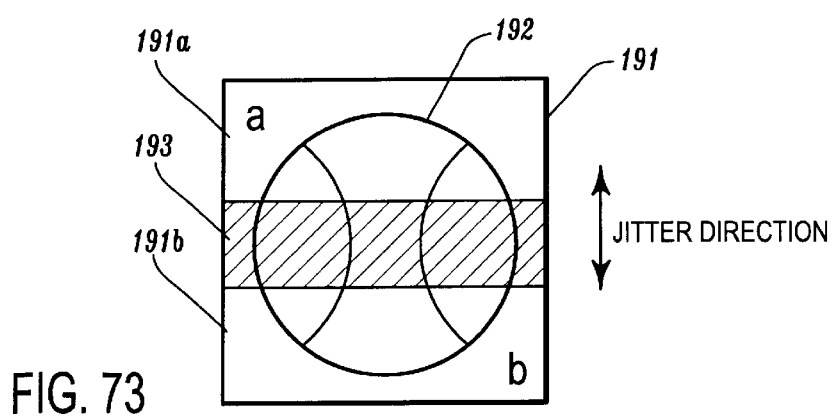
FIG. 73 is a plan view showing a light receiving element of the twenty-sixth embodiment of the present invention.
Figure 74:
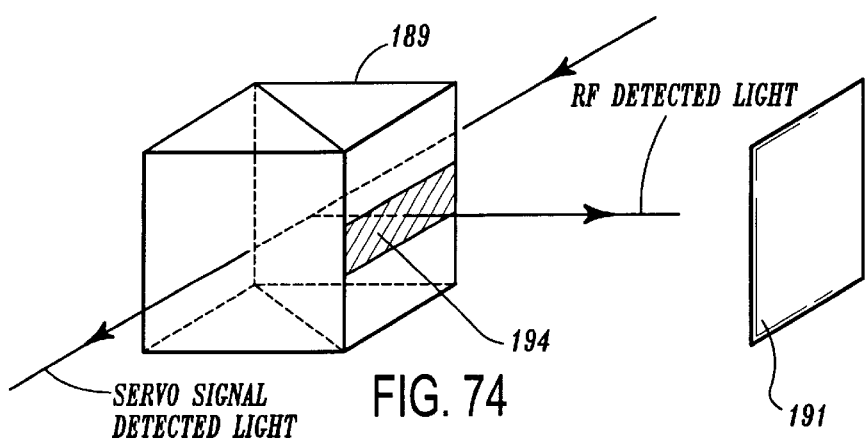
FIG. 74 is a perspective view showing the twenty-sixth embodiment.

FIGS. 72, 73 and 74 show a twenty-sixth embodiment of the present invention, in which data is recorded and/or reproduced and/or deleted in a recording medium. A linear polarized light emitted from a light source 181 of a semiconductor laser is parallelized by a collimating lens 182. After the parallelized light is transmitted to a polarized beam splitter 183, the light is converted to the circular polarized light by a quarter-wavelength plate 184. Next, after the light is polarized towards the recording medium 186 of an optical-disc by the deflection prism 185, the light is focused on a recording face of a recording medium 186. In the recording medium 186 of the optical disc, a data track is formed in a spiral shape or a concentric shape. The recording medium is turned by a spindle motor. In the recording medium 186 of the optical disc, the data is recorded by a pit formed in the data track. After the luminous flux reflected by the recording surface of the recording medium 186 is parallelized by the objective lens 187, the luminous flux is deflected by the deflection prism 185 so that the luminous flux is converted by a quarter-wavelength plate into the linear polarized light in which the deflection angle is 90° different from the luminous flux from the light source 181. The reflected light from the polarized beam splitter 183 is focused by a detection lens 188. The part of the reflected light is reflected by the beam splitter 189 and the remaining portion is transmitted by the beam splitter 189.

For example, the transmitted light from the beam splitter 189 is focused on the light receiving element 190 to undergo a photoelectric conversion. The reflected light (detected light) from the beam splitter 189 is focused on the light receiving element 191 to undergo a photoelectric conversion. The light receiving element 190 and an operational circuit (not shown) detect the focussing by a conventional detecting method such as the astigmatism method or the knife edge method. The light receiving element 191 has a light receiving element divided into 2 parts 191a, 191b in a jitter direction, which has a non-sensitive band 193 which is not sensitive to the detected light 192 in the central portion in the jitter direction, as shown in FIG. 73. The detected signals a, b from the divided parts 191a, 191b of the light receiving element 191 are added in an operational circuit (not shown) to obtain the Rf signal, according to the following formula.

Rf signal=a+b

In the luminous flux dividing means provided between the beam splitter 189 and the recording medium, which is, for example, a beam splitter 189, a polarized light separation layer 194 to shade a central portion of the light receiving element 191 in a jitter direction, as shown in FIG. 74. It is not necessary for the light receiving element 191 to have the non-sensitive band 193. A mask may be placed on the light receiving element 191 to shade a central portion of the jitter direction 191.

The twenty-sixth embodiment of the present invention is an optical pick-up device for at least one of recording, reproducing and deleting data on a recording medium including a light source 181 emitting a light, an objective lens 187 focusing the light from the light source 181 at a predetermined position of a data track of a recording face of the recording medium 186, a light receiving element 190, 191 detecting a reflected light from the recording face, a non-sensitive sensitive band 193 as luminous flux dividing means for dividing the reflected light from the recording face into a luminous flux of a peripheral portion in a data track direction and a remaining portion, a light receiving element 191 as data signal detecting means for detecting a data signal from the luminous flux of the peripheral portion in a data track direction, a beam splitter 189 as an element having a polarized light separation layer 194 provided between a position of dividing the reflected light and the recording medium, and a quarter-wavelength plate.

According to the above embodiment, an optical system is provided in which a light utilization efficiency is not lowered except the polarizing hologram. Also, the polarizing hologram prevents a reduction of the light utilization efficiency due to the transition of the light and deterioration of the transmitting wave face. Therefore, in both a lighting system for lighting the recording medium and a detecting system in which a data signal is detected by the reflected light from the recording medium, the light utilization efficiency may be improved. When a higher power light spot is required, for example, for a rewriting on the recording face of the recording medium, a lower power semiconductor laser device may be used as the light source. Therefore, the production cost of the optical pick-up device may be reduced. Due to isolation by the quarter-wavelength plate and the polarized separation layer, influence of a returning light, such as a variation of the semiconductor laser output, is prevented.

Figure 75:
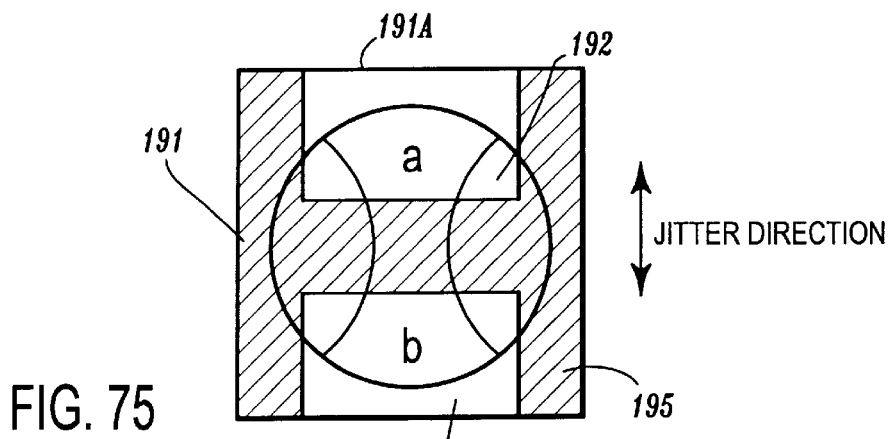
FIG. 75 is a plan view showing a light receiving element of an twenty-seventh embodiment of the present invention.

In an twenty-seventh embodiment of the present invention, a light receiving element 191 shown in FIG. 75 is used. As can be seen from a variation of distribution of the reflected light intensity shown in FIGS. 69–71, the reflected light from the optical disc does not influence the signal even in the end portions in the radial direction. Thus, the light receiving element 191 has a non-sensitive band 195 (hatched portions in the drawings) which is not sensitive to the detected light 192 from the beam splitter 189 in the central portion in the jitter direction and the end portion in the radial direction. The shaded area of the light receiving element 191 by the non-sensitive band 195 may be formed by a mask placed on the light receiving element 191.

The shaded area of the light receiving element 191 formed by the non-sensitive band 195 is defined by the following formulae.

$x^2+y^2 \leq (k \cdot NA)^2$ $y \geq k \cdot f(v\lambda - NA)$ $y \leq -k \cdot f(v\lambda - NA)$ $x \geq m$ $x \leq -m (0 \leq m \leq fNA)$ When the following figures are put in the above formulae, m is equal to 1.2.

$v=1.082 \times 10^6$ (reciprocal of m) (0.924 μm in period)

$\lambda=680$ (nm)

$f=2.73$ (mm)

$NA=0.55$

Therefore, in the light receiving element 191, the reflected light is a circle shown by a following formula.

$x^2+y^2=(k \cdot f \cdot NA)^2$

The part of the reflected light expressed by the following formulae is separated by the non-sensitive light and received by a light receiving element 191.

$x^2+y^2 \leq (k \cdot f \cdot NA)^2$ $y \geq k \cdot f(v\lambda - NA)$ $y \leq k \cdot f(v\lambda - NA)$ The polarized separation layer 194 is formed so that the central portion in the jitter direction of the reflected light to the light receiving element 191 and the end portions of the non-sensitive band 195 is shaded by the shading area of the non-sensitive band 195.

In the twenty-seventh embodiment of the present invention, the reflected light is a circle expressed by the following formula in which f represents focal length, NA represents a numerical aperture of the objective lens 187, v represents a spacial frequency of the shortest mark recorded on the recording surface, λ represents a wavelength of the emitted light of the light source 181, k represents a constant in proportion to a radius of the luminous flux, a center of the reflected light on the surface crossing at right angle to the light axis of the reflected light is an origin, the y-axis is in the data track direction and the x-axis crosses at the right angle to the y-axis.

$x^2+y^2=(k \cdot f \cdot NA)^2$

Also, the present embodiment has the light receiving element 191 for separating a part of the reflected light expressed by the following formulae.

$x^2+y^2 \leq (k \cdot f \cdot NA)^2$ $y \geq k \cdot f(v\lambda - NA)$ $y \leq k \cdot f(v\lambda - NA)$ Therefore, a noise reduction effect can be improved.

Figure 76:
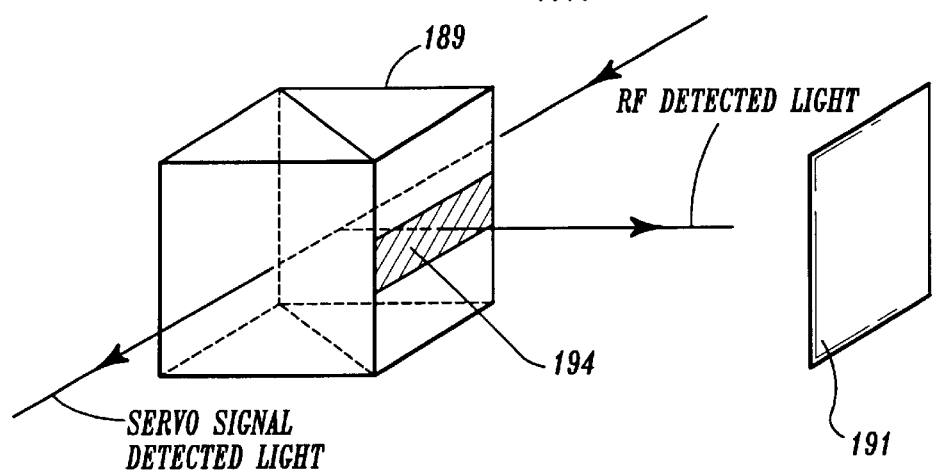
FIG. 76 is a plan view showing a light receiving element of a twenty-eighth embodiment of the present invention.
Figure 77:
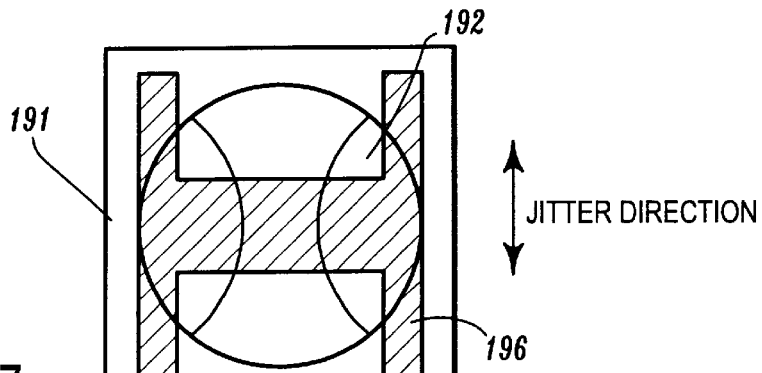
FIG. 77 is a plan view showing a light receiving element of a twenty-ninth embodiment of the present invention.

In a twenty-eighth embodiment of the present invention, a non-divided light receiving element is used, as shown in FIG. 76. Since a non-signal part of the detected light 192 from the beam splitter 189 has already been shaded by the polarized separation layer 194, the light receiving element 191 used therein can be the non-divided light receiving element having simple square shape. The polarized separation layer 194 separates the part of the reflected light expressed by following formulae by shading the central portion in the jitter direction of the reflected light, as described above.

$$x^2+y^2 \leq (k \cdot f \cdot NA)^2$$

$$y \geq k \cdot f(\nu\lambda - NA)$$

$$y \leq \leq k \cdot f(\nu\lambda - NA)$$

$$x \geq m, \; x \leq -m \; (0 \leq m \leq f \cdot NA)$$

When the light receiving element 191 is placed in the focused reflected light and the light receiving face is made as small as possible, the response speed of the light receiving element 191 can be improved.

In a twenty-ninth embodiment of the present invention, a non-divided light receiving element 191 is used. The polarized separation layer 194 used in the above embodiment is omitted so that the non-signal part of the detected light 192 from the beam splitter 189 is not shaded by the polarized separation layer 194. The light receiving element 191 has a non-sensitive band 196 (hatched portion) which is not sensitive to the detected light from the beam splitter 189 in the central portion in the jitter direction and end portions in the radial direction. The light receiving element detects a part of the detected light 192 from the beam splitter 189 expressed by the following formulae.

$$y \leq -k \cdot f(\nu\lambda - NA)$$

$$x \geq m, \; x \leq -m (0 \leq m \leq f \cdot NA)$$

A nineteenth or a twenty-ninth embodiment of the present invention is an optical pick-up device for at least one of recording, reproducing and deleting data on a recording medium including a light source 181 emitting a light, an objective lens 187 focusing the light from the light source 181 at a predetermined position of a data track of a recording face of the recording medium 186, a light receiving element 190, 191 detecting reflected light from the recording face 186, a light receiving element 191 as data signal detecting means for dividing the reflected light from the recording face into a luminous flux of a peripheral portion in a data track direction and a remaining portion and for detecting a data signal from the luminous flux of the peripheral portion in a data track direction, and a polarized light separation layer 194 or a light receiving element 191 dividing means for dividing a part of the reflected light defined by the following formulae.

$$x^2+y^2 \leq (k \cdot f \cdot NA)^2$$

$$y \geq k \cdot f(\nu\lambda - NA)$$

$$y \leq -k \cdot f(\nu\lambda - NA)$$

$$x \geq m, \; x \leq -m, \; (0 \leq m \leq f \cdot NA)$$

According to the invention, a noise reduction effect may be further improved.

FIG. 78 shows a thirtieth embodiment of the present invention and FIG. 79 shows a part of the thirtieth embodiment. In this embodiment, the beam splitter 189 in the twenty-sixth embodiment is replaced by a prism 197 as the luminous flux separation means (dividing means) for separating the luminous flux from the detection lens 188. The prism 197 separates the luminous flux into both end portions A, B in the jitter direction which are signal elements and a central portion C in the jitter direction which does not contribute the signal. The luminous fluxes of both side A, B are received by the divided parts 191a, 191b of the light receiving element 191, which are divided in the jitter direction. The detection signal a, b from the divided parts 191a, 191b are summed to obtain the Rf signal, according to the following formula.

$$Rf \; \text{signal} = a+b$$

The luminous flux C from the prism 197 is received by the light receiving element 190. The light receiving element 190 and an operational circuit (not shown) detect the focus signal by the conventional method such as the astigmatism method or the knife edge method.

In the thirtieth embodiment of the present invention, since the dividing means is the prism 197, it is not necessary to separate the luminous flux from the detection lens 188 by the beam splitter and the whole device can be reduced in size and simplified. That is, the illumination light and the reflected light may have almost the same light path. When the luminous flux for the servo detection is separated by the beam splitter in the conventional manner, the amplitude of the Rf signal is reduced since the non-signal element and signal element are separated. However, when shaded area which can not be received by the light receiving element 191 is received by the light receiving element 190 in the thirtieth embodiment, the servo signal (focus detection signal) is obtained without a reduction of the 3T signal.

FIG. 80 shows a thirty-first embodiment of the present invention. In this embodiment, the beam splitter is replaced by a hologram 198, as the luminous flux separation means for separating the luminous flux from the detection lens 188. The hologram 198 divides the luminous flux from the detected lens 188 into both side portions A, B which are the signal portion and the central portion C which does not contribute the signal. The luminous flux of both sides A, B is received by the two-divided parts 191a, 191b of the light receiving element 191, which are divided in the jitter direction. The detected signals a, b from the divided portion 191a, 191b are summed in an operational circuit (not shown) to obtain the Rf signal, according to a following formula.

$$Rf \; \text{signal} = a+b$$

The hologram 198 can be produced more efficiently and economically than prism.

Figure 85:
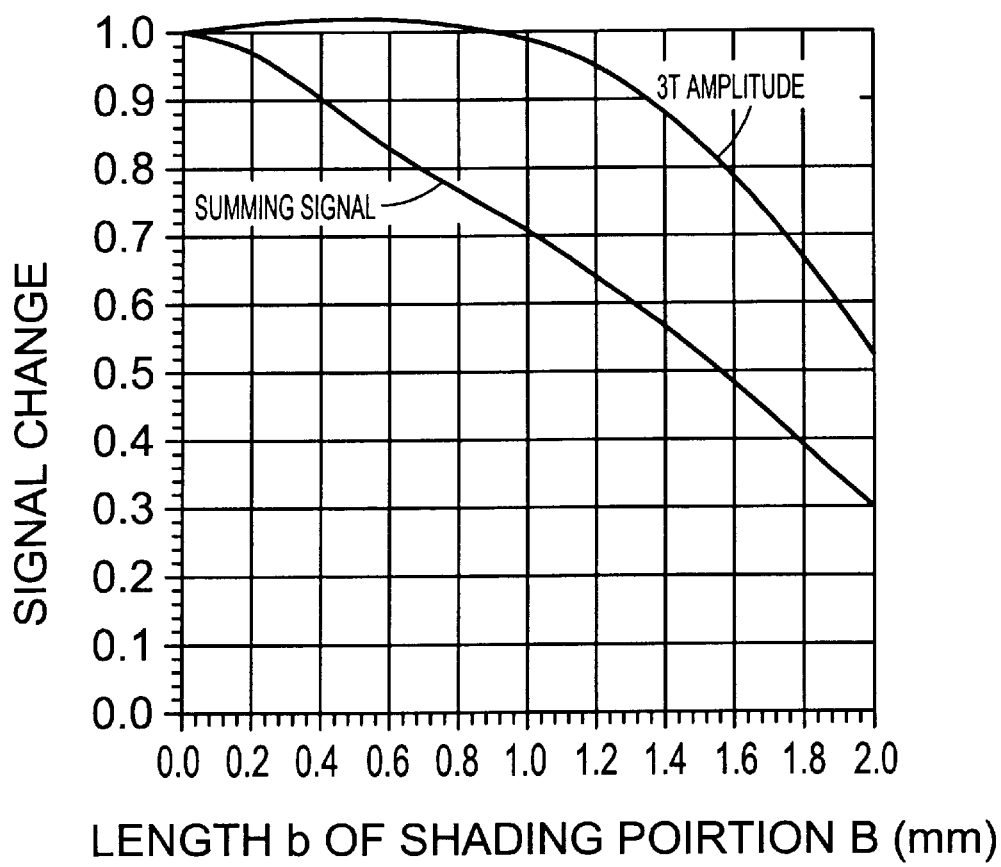
FIG. 85 is a graph showing a graph showing a summing signal and a 3T signal.
Figure 86:
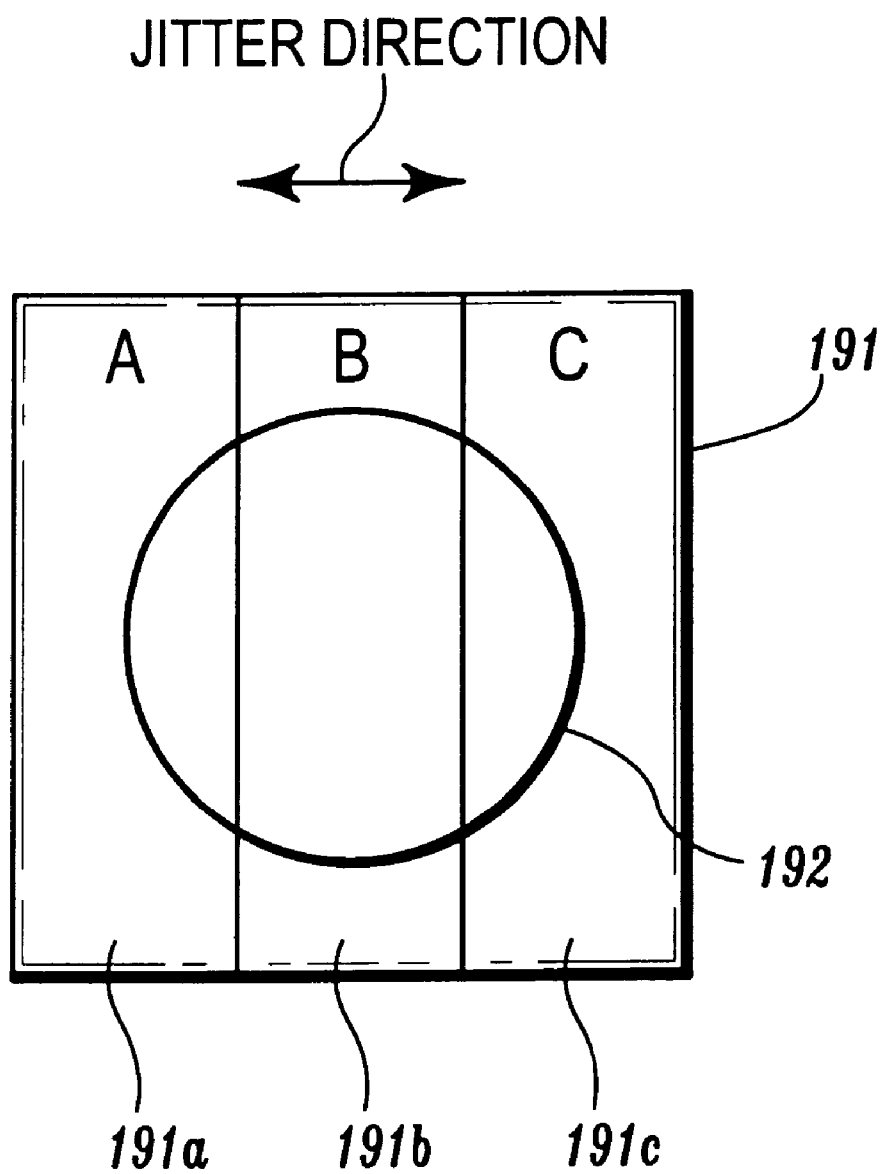
FIG. 86 is a plan view showing a light receiving element of the twenty-sixth embodiment of the present invention.

In the twenty-seventh embodiment of the present invention, a light amount of the luminous flux C shaded by the reflected light is approximately 30% of that of the whole reflected light, as shown in FIG. 85. In the thirty-first embodiment of the present invention, a servo signal is detected by the luminous flux C. The luminous flux C from the hologram 198 is received by the light receiving element 190. The light receiving element 190 and an operational circuit (not shown) detect the focus signal, the track signal, both the focus signal and the track signal or a signal adjusting a position of the objective lens by a conventional detecting method, such as the astigmatism method or the knife-edge method.

In the thirty-first embodiment of the present invention, since the dividing means is the hologram 198, the whole device can be produced economically and efficiently. The hologram equivalent in function to the prism, of complicated shape, can be formed in a plate economically with a simple structure.

Figure 81:
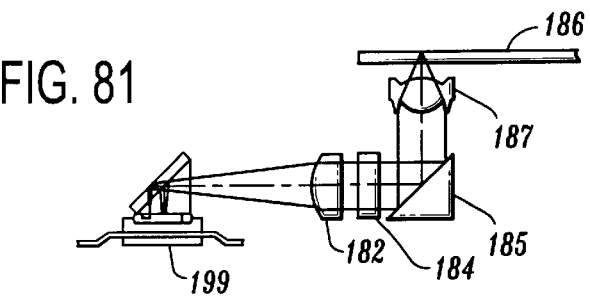
FIG. 81 is a schematic illustration showing a thirty-second embodiment of the present invention.
Figure 82:
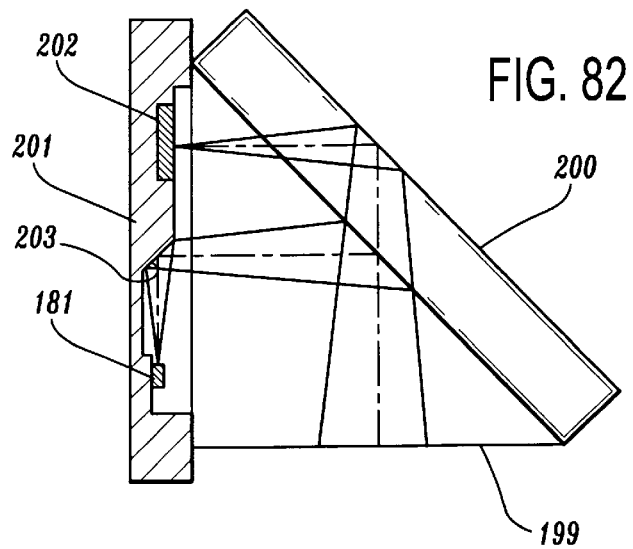
FIG. 82 is a sectional view showing a power source—light receiving element unit of the thirty-second embodiment of the present invention.
Figure 83:
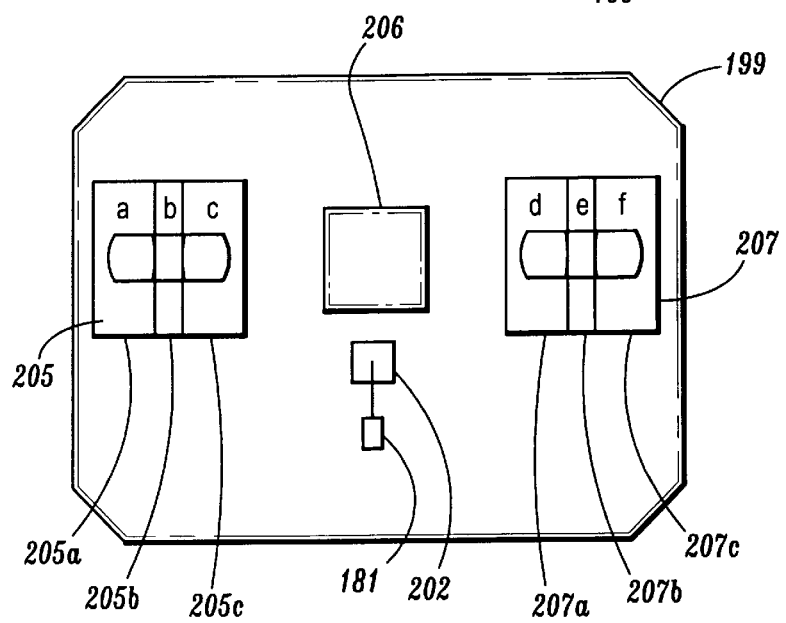
FIG. 83 is a plan view showing a board for the power source—light receiving element unit.

FIG. 81 shows a thirty-second embodiment of the present invention, and FIGS. 82 and 83 show a power source—light receiving element unit thereof. This embodiment is different from the twenty-fifth embodiment in that the isolation of the luminous light to the optical disc and the reflected light from the optical disc is conducted by the quarter-wavelength plate and a polarized light separation element. In this embodiment, the luminous light to the optical disc has the same light path as the reflected light from the optical disc. Also, the light source such as the semiconductor laser and the light receiving element are closely arranged in a single unit.

Figure 84:
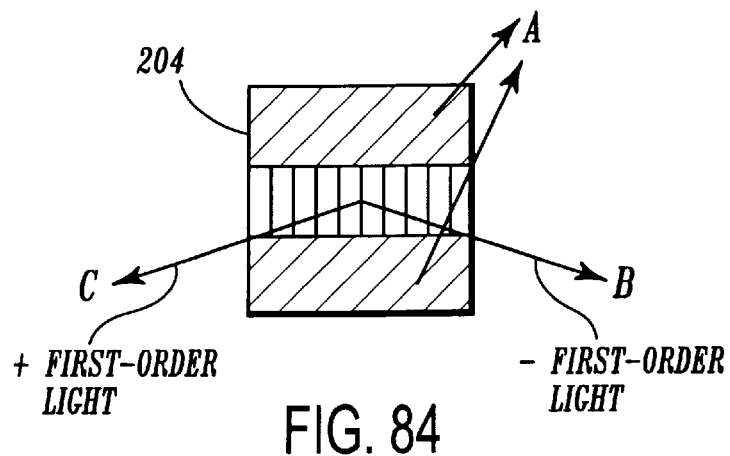
FIG. 84 is a rear view showing a reflective hologram of the thirty-second embodiment of the present invention.

In a package where the power source—light receiving element unit 199 is provided, a complex prism 200 including a triangle prism and a parallel plate, a substrate 201, a light source 181 including a semiconductor laser provided on the substrate and light receiving means 202 are provided. On the border face between the triangle prism and one face of the parallel plate, a polarized light separation layer as a polarized light separation element is provided. On the other face of the parallel plate, a reflective hologram 204 is provided as the luminous flux separation means (dividing means), as shown in FIG. 84. After the luminous flux emitted from the semiconductor laser 181 is deflected at a right angle to the paper by a mirror portion 203 of the substrate 201, the luminous flux is emitted from a window of the power source—light receiving element unit 199. After the luminous flux emitted from the window of the power source—light receiving element unit 199 is roughly parallelized by the focussing lens 182, the light is converted to the circular polarized light by the quarter-wavelength plate 184. The circular polarized light is deflected by the deflection prism 185. The deflected light is focused on the recording face of the recording medium 186 by the objective lens 187.

After the reflected light from the recording medium 186 is focused by the reflective lens 187, the light is deflected by the deflection prism 185. The light is converted to the linear polarized light whose deflection angle is 90° different from that of the luminous light to the recording medium 186 by the quarter-wavelength plate 184. After the linear polarized light passes through the focussing lens 182, the light is received by a power source—light receiving element unit 199. The light passes through the polarized light separation layer. After the luminous flux passing through the polarized light separation layer is reflected and diffracted by the reflective hologram 204 so that the luminous flux is divided into a luminous flux A at both ends in the jitter direction and luminous fluxes B, C at the central portion, which are received by the light receiving means 202, as shown in FIG. 84. The reflective hologram 204 has a luminous flux dividing pattern to provide advantages similar to that of the twenty-sixth embodiment. The light receiving means 202 has three light receiving elements 205–207. The luminous flux A of the both sides in the jitter direction is photoelectrically converted to the Rf signal by the light receiving element 206.

The luminous flux (first-order light) B, C of the central portion in the jitter direction from the reflective hologram 204 is received by the light receiving element 205, 207. The focus signal and the track signal are detected by a beam size method using an output signal of the light receiving elements 205, 207. That is, output signals a–c from the divided parts 205a–205c of the light receiving element 205 and output signals d–f from the divided parts 207d–207f of the light receiving element 207 is operated by an operational circuit (not shown) to obtain focus signals {(a+c+e)−(b+d+f)} and track signals (a−c), (d−f) or {(a+f)−(c+d)}.

In the twenty-sixth embodiment described above, the amount of the luminous flux to detect the Rf signal is reduced and the amplitude of the Rf signal is reduced. However, in the thirty-second embodiment of the present invention, the Rf signal is the same amplitude as that detected when the Rf signal is detected from all of the reflected light. Also, the noise can be reduced. Further, when a primary amplifier handling the Rf signal is provided on the substrate on which the light receiving element is provided, the noise of the circuit can be reduced.

In the thirty-second embodiment of the present invention, since the light receiving element 205–207 and the light source 181 are arranged in the same package, the device can be reduced in size, production cost and the number of the parts thereof. The relationship between the light receiving elements 205–207, the light source 181 and the reflective hologram 204 can be maintained. Therefore, the quality of the signal can be maintained against the variation of time and temperature.

In the twenty-sixth embodiment of the present invention, a light receiving element 191 has a non-sensitive band 193 which functions as a light receiving area 191c which receives the central portion of the detected light 192. The operational circuit (not shown) operates each of the divided parts of the light receiving element to obtain the reproductive signal {(a+b)−c}.

In this embodiment of the present invention, the light receiving element 191 and the operational circuit as data signal detecting means detects a data signal as a differential between the luminous flux of the peripheral portion and the luminous flux of the central portion. Thus, the difference in light amount between the luminous flux at peripheral portion in which the 3T signal is concentrated and the central portion in which little 3T signal is included. Also, the noise reduction effect and S/N ratio of the reproductive signal can be improved.

Further, the present invention is not limited to these embodiments, but various variations and modifications may be made without departing from the scope of the present invention.

What is claimed is:

1. An optical pick-up device comprising:
    a laser light source for emitting a laser light;
    an objective lens focusing said laser light from said laser light source on a track of an optical data recording medium, said optical pick-up device reproducing data recorded on said optical data recording medium by detecting a unitary reflected light from said optical data recording medium;
    an optical divider for dividing a luminous flux of the unitary reflected light from said optical data recording medium into three parts in a track direction; and
    data signal reproducing means for reproducing said data from a difference between a first optical area and a second optical area in said reflected light, said first optical area being both side portions of the divided luminous flux and said second optical area being a central portion between said both side portions.

2. The optical pick-up device according to claim 1, wherein said data signal reproducing means includes light receiving means receiving said divided reflected lights separately.

3. The optical pick-up device according to claim 2, wherein said optical divider is a prism.

4. The optical pick-up device according to claim 2, wherein said optical divider is a hologram.

5. The optical pick-up device according to claim 2, wherein said optical divider has a plurality of luminous flux dividing areas.

6. The optical pick-up device according to claim 2, further comprising a plurality of light receiving elements, each of which receives said reflected light separately, said plurality of light receiving elements being provided on a single substrate.

7. The optical pick-up device according to claim 6, wherein said laser light source and said light receiving elements are unitarily provided.

8. An optical pick-up device comprising:

a laser light source for emitting a laser light;

an objective lens focusing said laser light from said laser light source on a track of an optical data recording medium, said optical pick-up device reproducing data recorded on said optical data recording medium by detecting a unitary reflected light from said optical data recording medium;

an optical divider for dividing a luminous flux of the unitary reflected light from said optical data recording medium into three parts in a track direction; and data signal reproducing means for reproducing said data from a difference between a first optical area and a second optical area in said reflected light, said first optical area being a peripheral portion of the divided luminous flux, said second optical area being a luminous flux from which said first optical area is excluded.

9. The optical pick-up device according to claim 8, wherein said data signal reproducing means includes light receiving means receiving said divided reflected lights separately.

10. The optical pick-up device according to claim 9, wherein said optical divider is a prism.

11. The optical pick-up device according to claim 9, wherein said optical divider is a hologram.

12. The optical pick-up device according to claim 9, wherein said optical divider has a plurality of luminous flux dividing areas.

13. The optical pick-up device according to claim 8, further comprising a plurality of light receiving elements, each of which receives said reflected light separately, said plurality of light receiving elements being provided on a single substrate.

14. The optical pick-up device according to claim 13, wherein said laser light source and said light receiving element are unitarily provided.

15. An optical pick-up device comprising:

a laser light source for emitting a laser light;

an objective lens focusing said laser light from said laser light source on a pit of a track of an optical data recording medium, said optical pick-up device reproducing data recorded on said optical data recording medium by detecting a unitary reflected light from said optical data recording medium;

an optical divider for dividing a luminous flux of the unitary reflected light from said optical data recording medium into three parts in a track direction; and data signal reproducing device for reproducing said data from a difference between a first optical area and a second optical area in said reflected light, said first optical area being both side portions of the divided luminous flux and said second optical area being a central portion between said both side portions.

16. The optical pick-up device according to claim 15, wherein said data signal reproducing device includes at least one receiver receiving said divided reflected lights separately.

17. The optical pick-up device according to claim 16, wherein said optical divider is a prism.

18. The optical pick-up device according to claim 16, wherein said optical divider is a hologram.

19. The optical pick-up device according to claim 16, wherein said optical divider has a plurality of luminous flux dividing areas.

20. The optical pick-up device according to claim 16, further comprising a plurality of light receiving elements, each of which receives said reflected light separately, said plurality of light receiving elements being provided on a single substrate.

21. The optical pick-up device according to claim 20, wherein said laser light source and said light receiving elements are unitarily provided.

22. An optical pick-up device comprising:

a laser light source for emitting a laser light;

an objective lens focusing said laser light from said laser light source on a pit of a track of an optical data recording medium, said optical pick-up device reproducing data recorded on said optical data recording medium by detecting a unitary reflected light from said optical data recording medium;

an optical divider for dividing a luminous flux of the unitary reflected light from said optical data recording medium into three parts in a track direction; and data signal reproducing device for reproducing said data from a difference between a first optical area and a second optical area in said reflected light, said first optical area being a peripheral portion of the divided luminous flux, said second optical area being a luminous flux from which said first optical area is excluded.

23. The optical pick-up device according to claim 22, wherein said data signal reproducing device includes at least one receiver receiving said divided reflected lights separately.

24. The optical pick-up device according to claim 23, wherein said optical divider is a prism.

25. The optical pick-up device according to claim 23, wherein said optical divider is a hologram.

26. The optical pick-up device according to claim 23, wherein said optical divider has a plurality of luminous flux dividing areas.

27. The optical pick-up device according to claim 22, further comprising a plurality of light receiving elements, each of which receives said reflected light separately, said plurality of light receiving elements being provided on a single substrate.

28. The optical pick-up device according to claim 27, wherein said laser light source and said light receiving element are unitarily provided.

* * * * *